US012503559B2

(12) United States Patent
Alsberg et al.

(10) Patent No.: US 12,503,559 B2
(45) Date of Patent: Dec. 23, 2025

(54) ELASTOMERIC NANOCOMPOSITE HYDROGELS

(71) Applicant: CASE WESTERN RESERVE UNIVERSITY, Cleveland, OH (US)

(72) Inventors: Eben Alsberg, Cleveland, OH (US); Oju Jeon, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 198 days.

(21) Appl. No.: 16/218,051

(22) Filed: Dec. 12, 2018

(65) Prior Publication Data

US 2019/0112434 A1   Apr. 18, 2019

Related U.S. Application Data

(63) Continuation-in-part of application No. 16/107,708, filed on Aug. 21, 2018, now Pat. No. 11,759,549.

(60) Provisional application No. 62/597,803, filed on Dec. 12, 2017, provisional application No. 62/548,243, filed on Aug. 21, 2017.

(51) Int. Cl.

| | |
|---|---|
| C08J 3/075 | (2006.01) |
| A61L 27/22 | (2006.01) |
| A61L 27/36 | (2006.01) |
| A61L 27/38 | (2006.01) |
| A61L 27/46 | (2006.01) |
| A61L 27/52 | (2006.01) |
| A61L 27/54 | (2006.01) |
| A61L 27/58 | (2006.01) |
| C08B 37/00 | (2006.01) |
| C08H 1/06 | (2006.01) |
| C08J 3/24 | (2006.01) |
| C08K 3/32 | (2006.01) |
| C08L 5/04 | (2006.01) |
| C08L 89/00 | (2006.01) |
| C08L 89/06 | (2006.01) |
| B82Y 5/00 | (2011.01) |
| B82Y 30/00 | (2011.01) |
| B82Y 40/00 | (2011.01) |

(52) U.S. Cl.
CPC ............ *C08J 3/075* (2013.01); *A61L 27/222* (2013.01); *A61L 27/3633* (2013.01); *A61L 27/3834* (2013.01); *A61L 27/3847* (2013.01); *A61L 27/46* (2013.01); *A61L 27/52* (2013.01); *A61L 27/54* (2013.01); *A61L 27/58* (2013.01); *C08B 37/0084* (2013.01); *C08H 1/06* (2013.01); *C08J 3/24* (2013.01); *C08K 3/32* (2013.01); *C08L 5/04* (2013.01); *C08L 89/00* (2013.01); *C08L 89/06* (2013.01); *A61L 2400/12* (2013.01); *B82Y 5/00* (2013.01); *B82Y 30/00* (2013.01); *B82Y 40/00* (2013.01); *C08J 2305/04* (2013.01); *C08J 2333/08* (2013.01); *C08J 2333/12* (2013.01); *C08J 2393/00* (2013.01); *C08K 2003/325* (2013.01); *C08L 2203/02* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 8,388,948 | B2 | 3/2013 | Basu et al. |
| 9,370,606 | B2 | 6/2016 | Nakamura et al. |
| 9,642,914 | B2 | 5/2017 | Alsberg et al. |
| 2008/0226692 | A1 | 9/2008 | Sato et al. |
| 2016/0279868 | A1 | 9/2016 | Burdick et al. |
| 2017/0327813 | A1 | 11/2017 | Cattolico et al. |

FOREIGN PATENT DOCUMENTS

| | | | |
|---|---|---|---|
| KR | 101196365 | * | 11/2012 |
| WO | 90/10454 | A1 | 9/1990 |

OTHER PUBLICATIONS

Sarker et al. (International Journal of Biological Macromolecules 81 (2015) 898-911) HAp granules encapsulated oxidized alginate-gelatin-biphasic calcium . . . .*
Kadri et al. (RSC Adv., 2016, 6, 27879-27884) Preparation and characterization of nanofunctionalized alginate/methacrylated gelatin hybrid hydrogels.*
Zhang et al. (Birth Defects Res C Embryo Today. Mar. 2012 ; 96(1)) 63-81) Using Polymeric Materials to Control Stem Cell Behavior for Tissue Regeneration.*
Applicant: Case Western Reserve University, et al.; European Patent Application No. 17879074.7, Filing Date: Dec. 11, 2017; Communication pursuant to Article 94(3) EPC; Date: Jul. 20, 2020; 10 pgs.
Chelsea S. Bahney, et al., "Stem Cell-Derived Endochondral Cartilage Stimulates Bone Healing by Tissue Transformation", Journal of Bone and Mineral Research, vol. 29, No. 5, Apr. 22, 2014, pp. 1269-1282.
Chelsea S. Bahney, et al., "The Multifaceted Role of the Vasculature in Endochondral Fracture Repair", Frontiers in Endocrinology, vol. 6, Feb. 5, 2015 (Feb. 5, 2015), p. 4.
Dazai S, et al., "Leukemia inhibitory factor enhances bone formation in calvarial bone defect", The Journal of Craniofacial Surgery, Nov. 2000, vol. 11, No. 6, Nov. 2000, pp. 513-520.
Guihard P, et al., "Induction of osteogenesis in mesenchymal stem cells by activated monocytes/macrophages depends on Oncostatin M signaling", vol. 50, May 2012.
Italian Patent Office, Document No. 102011902009885A1, (Bionest Ltd), Jul. 1, 2013 (Jul. 1, 2013).

(Continued)

*Primary Examiner* — Tigabu Kassa
(74) *Attorney, Agent, or Firm* — Tarolli, Sundheim, Covell & Tummino LLP

(57) ABSTRACT

An elastomeric nanocomposite hydrogel includes first natural polymer macromers covalently crosslinked with second natural polymer macromer and physically crosslinked with a plurality of inorganic nanoparticles. The elastomeric nanocomposite hydrogel is cytocompatible, and, upon degradation, produce substantially non-toxic products.

18 Claims, 39 Drawing Sheets

(56) References Cited

OTHER PUBLICATIONS

L. Yang, et al., "Hypertrophic chondrocytes can become osteoblasts and osteocytes in endochondral bone formation", Proceedings of the National Academy of Sciences, vol. 111, No. 33, Aug. 19, 2014, pp. 12097-12102.
Rachelle W. Johnson, et al., "Glycoprotein130 (Gp130)/interleukin-6 (IL-6) signalling in osteoclasts promotes bone formation in periosteal and trabecular bone", Bone, vol. 81, Aug. 7, 2015, pp. 343-351.
Rozen, et al., "Fracture repair: Modulation of fracture-callus and mechanical properties by sequential application of IL-6 following PTH 1-34 or PTH 28-48, IL-6 following PTH 1-34 or PTH 28-48", Bone, Pergamon Press., Oxford, GB, vol. 41, No. 3, Aug. 8, 2007, pp. 437-445.
Xin Zhou, et al., "Chondrocytes Transdifferentiate into Osteoblasts in Endochondral Bone during Development, Postnatal Growth and Fracture Healing in Mice", PLOS Genetics, vol. 10, No. 12, Dec. 4, 2014.
Wang, et al., "Mechanical stimulation orchestrates the osteogenic differentiation of human bone marrow stromal cells by regulating HDAC1", Cell Death and Disease (2016) 7, e2221.
Wu, et al., "Fast degrading elastomer enables rapid remodeling of a cell-free synthetic graft into a neo-artery", Nat Med. Jul. 2012 ; 18(7): 1148-1153.
Wang, et al., "Cell-laden photocrosslinked GelMA-DexMA copolymer hydrogels with tunable mechanical properties for tissue engineering", J Mater Sci: Mater Med (2014) 25:2173-2183.
Wang, et al., "Effect of alginate culture and mechanical stimulation on cartilaginous matrix synthesis of rat dedifferentiated chondrocytes", Biomed Mater Eng. 2008; 18(1 Suppl):S47-54.
Wang, et al., "Programmable mechanical stimulation in a bioreactor system", Biotechnology and Bioengineering / vol. 110, Issue 5, 2013.
Wang, et al., "Cell adhesion and mechanical stimulation in the regulation of mesenchymal stem cell differentiation", J. Cell. Mol. Med. vol. 17, No. 7, 2013 pp. 823-832.
Sun, et al., "Highly stretchable and tough hydrogels", Nature. Sep. 6, 2012; 489(7414): 133-136.
Trappmann, et al., "Extracellular-matrix tethering regulates stem-cell fate", Nature Materials, 2012.
Shittichokechaiwut, et al., "Short Bouts of Mechanical Loading are as Effective as Dexamethasone at Inducing Matrix Production by Human Bone Marrow Mesenchymal Stem Cells", European Cells and Materials, vol. 20, 2010, pp. 45-57.
Steinmetz, et al., "Mechanical loading regulates human MSC differentiation in a multilayer hydrogel for osteochondral tissue engineering", Acta Biomater. Jul. 2015;21:142-53.
Sakai, et al., "Effect of swelling and deswelling on the elasticity of polymer networks in the dilute to semi-dilute region", Soft matter, Issue 9, 2012.
Shin, et al., "Cell-laden Microengineered and Mechanically Tunable Hybrid Hydrogels of Gelatin and Graphene oxide", Adv Mater. Nov. 26, 2013; 25(44): 6385-6391.
Purcell, et al., "Injectable and bioresponsive hydrogels for on-demand matrix metalloproteinase inhibition", Nat Mater. Jun. 2014 ; 13(6): 653-661.
Rowley, et al., "Alginate hydrogels as synthetic extracellular matrix materials", Biomaterials 20 (1999) 45-53.
Pereira, et al., "A highly tunable biocompatible and multifunctional biodegradable elastomer", Adv Mater. Feb. 25, 2013; 25(8): 1209-1215.
Pescosolido, et al., In situ forming IPN hydrogels of calcium alginate and dextran-HEMA for biomedical applications, Acta Biomaterialia 7 (2011) 1627-1633.
Partlow, et al., "Highly tunable elastomeric silk biomaterials", Adv Funct Mater. Aug. 6, 2014; 24(29): 4615-4624.
Nicodemus, et al., "Cell Encapsulation in Biodegradable Hydrogels for Tissue Engineering Applications", Tissue Engineering: Part B, vol. 14, No. 2, 2008.

Palomares, et al., "Mechanical Stimulation Alters Tissue Differentiation and Molecular Expression during Bone Healing", Journal of Orthopaedic Research Sep. 2009.
Mckinnon, et al., "Biophysically Defined and Cytocompatible Covalently Adaptable Networks as Viscoelastic 3D Cell Culture Systems", Adv Mater. Feb. 12, 2014; 26(6): 865-872.
Nguyen, et al., "Sustained localized presentation of RNA interfering molecules from in situ forming hydrogels to guide stem cell osteogenic differentiation", Biomaterials. Aug. 2014 ; 35(24): 6278-6286.
Luu, et al., "Mechanical Stimulation of Mesenchymal Stem Cell Proliferation and Differentiation Promotes Osteogenesis While Preventing Dietary-Induced Obesity", Journal of Bone and Mineral Research vol. 24, No. 1, 2009.
Maul, et al., "Mechanical stimuli differentially control stem cell behavior: morphology, proliferation, and differentiation", Biomech Model Mechanobiol. Dec. 2011 ; 10(6): 939-953.
Lin, et al., "Stretchable Hydrogel Electronics and Devices", Adv Mater. Jun. 2016 ; 28(22): 4497-4505.
Lee, et al., "Alginate: properties and biomedical applications", Prog Polym Sci. Jan. 2012 ; 37(1): 106-126.
Koetting, et al., "Stimulus-responsive hydrogels: Theory, modern advances, and applications", Mater Sci Eng R Rep. Jul. 2015 ; 93: 1-49.
Jeon, et al., "In situ forming growth factor-loaded coacervate microparticle-embedded hydrogel for directing encapsulated stem cell fate", Adv Mater. Apr. 2015 ; 27(13): 2216-2223.
Kloxin, et al., "Photodegradable hydrogels for dynamic tuning of physical and chemical properties", Science. Apr. 3, 2009; 324(5923): 59-63.
Jeon, et al., "The effect of oxidation on the degradation of photocrosslinkable alginate hydrogels", Biomaterials. May 2012 ; 33(13): 3503-3514.
Jay, et al., "Shining light on a new class of hydrogels", Nature Biotechnology vol. 27, No. 6, Jun. 2009.
Jeon, et al., "Regulation of Stem Cell Fate in a Three-Dimensional Micropatterned Dual-Crosslinked Hydrogel System", Adv Funct Mater. Oct. 11, 2013; 23(38): 4765-4775.
Huang, et al., "A Novel Hydrogel with High Mechanical Strength:A Macromolecular Microsphere Composite Hydrogel", Adv. Mater. 2007, 19, 1622-1626.
Jagodzinski, et al., "Influence of perfusion and cyclic compression on proliferation and differentiation of bone marrow stromal cells in 3-dimensional culture", J Biomech. 2008;41(9):1885-91.
Gaharwar, et al., "Highly Extensible, Tough, and Elastomeric Nanocomposite Hydrogels from Poly(ethylene glycol) and Hydroxyapatite Nanoparticles", Biomacromolecules 2011, 12, 1641-1650.
Hong, et al., "3D Printing of Highly Stretchable and Tough Hydrogels into Complex, Cellularized Structures", Adv Mater. Jul. 15, 2015; 27(27): 4035-4040.
Duan, et al., "Ultra-Stretchable and Force-Sensitive Hydrogels Reinforced with Chitosan Microspheres Embedded in Polymer Networks", Advanced Materials / vol. 28, Issue 36, Jul. 2016.
Dado, et al., "Mechanical control of stem cell differentiation", Regen. Med. (2012) 7(1), 101-116.
Doroski, et al., "Cyclic Tensile Culture Promotes Fibroblastic Differentiation of Marrow Stromal Cells Encapsulated in Poly(Ethylene Glycol)-Based Hydrogels", Tissue Engineering: Part A vol. 16, No. 11, 2010.
Choi, et al., "Mechanical Stimulation by Ultrasound Enhances Chondrogenic Differentiation of Mesenchymal Stem Cells in a Fibrin-Hyaluronic Acid Hydrogel", Artificial Organs, vol. 37, Issue 7, Mar. 2013.
Cohen et al., "Mechanical control of stem cell differentiation", Steambook, 2008.
Bryant, et al., "Photo-patterning of Porous Hydrogels for Tissue Engineering", Biomaterials. Jul. 2007 ; 28(19): 2978-2986.
Chen, et al., "Mechanically induced osteogenic lineage commitment of stem cells", Chen and Jacobs Stem Cell Research & Therapy 2013, 4:107.
Bao, et al., "Cell and molecular mechanics of biological materials", nature materials, vol. 2, Nov. 2003.

(56) References Cited

OTHER PUBLICATIONS

Imran, et al. "Recent advances in hydrogels in terms of fast stimuli responsiveness and superior mechanical performance", Polymer Journal (2010) 42, 839-851.
Annabi, et al., "Highly elastic and conductive human-based protein hybrid hydrogels", Adv Mater. Jan. 6, 2016; 28(1): 40-49.
Adamo, et al. "Biomechanical forces promote embryonic haematopoiesis", Nature. Jun. 25, 2009; 459(7250): 1131-1135.
Zustiak, et al., "Hydrolytically degradable poly(ethylene glycol) hydrogel scaffolds with tunable degradation and mechanical properties", Biomacromolecules. May 10, 2010; 11(5): 1348-1357.
First Named Inventor: Eben Alsberg; U.S. Appl. No. 16/107,756, filed Aug. 21, 2018; NonFinal Office Action; dated Aug. 26, 2020; 16 pgs.
First Named Inventor: Eben Alsberg; U.S. Appl. No. 16/107,774, filed Aug. 21, 2018; NonFinal Office Action; dated Sep. 17, 2020; 16 pgs.
First Named Inventor: Eben Alsberg; U.S. Appl. No. 16/726,375, filed Dec. 24, 2019; NonFinal Office Action; dated Oct. 5, 2020.
Applicant: Case Western Reserve University; PCT International Application No. PCT/US19/26678; International Filing Date: Apr. 9, 2019; PCT International Search Report and Written Opinion; Authorized Officer: Lee W. Young; Date of Completion: Jun. 11, 2019; 11 pgs.
First Named Inventor: Eben Alsberg; U.S. Appl. No. 12/191,034, filed Aug. 13, 2008; NonFinal Office Action; dated Oct. 4, 2022; 28 pgs.
First Named Inventor: Eben Alsberg; U.S. Appl. No. 16/107,756, filed Aug. 21, 2018; NonFinal Office Action; dated Nov. 17, 2022; 33 pgs.
Gomez, et al. (Carbohydrate Polymers 67 (2007) 296-304) (Year: 2007).
First Named Inventor: Eben Alsberg; U.S. Appl. No. 16/107,708, filed Aug. 21, 2018; NonFinal Office Action; dated Mar. 3, 2022; 17 pgs.
Kadri, R., et al. "Preparation and characterization of nanofunctionalized alginate/methacrylated gelatin hybrid hydrogels." RSC advances 6.33 (2016): 27879-27884.
First Named Inventor: Eben Alsberg; U.S. Appl. No. 16/044,182, filed Jul. 24, 2018; Non-Final Office Action dated Jun. 24, 2022; 18 pgs.
First Named Inventor: Eben Alsberg; U.S. Appl. No. 16/153,138, filed Oct. 5, 2018; NonFinal Office Action; dated Aug. 12, 2022; 17 pgs.
First Named Inventor: Eben Alsberg; U.S. Appl. No. 17/544,544, filed Dec. 7, 2021; NonFinal Office Action; dated Dec. 8, 2022; 6 pgs.

\* cited by examiner (a)

(b)

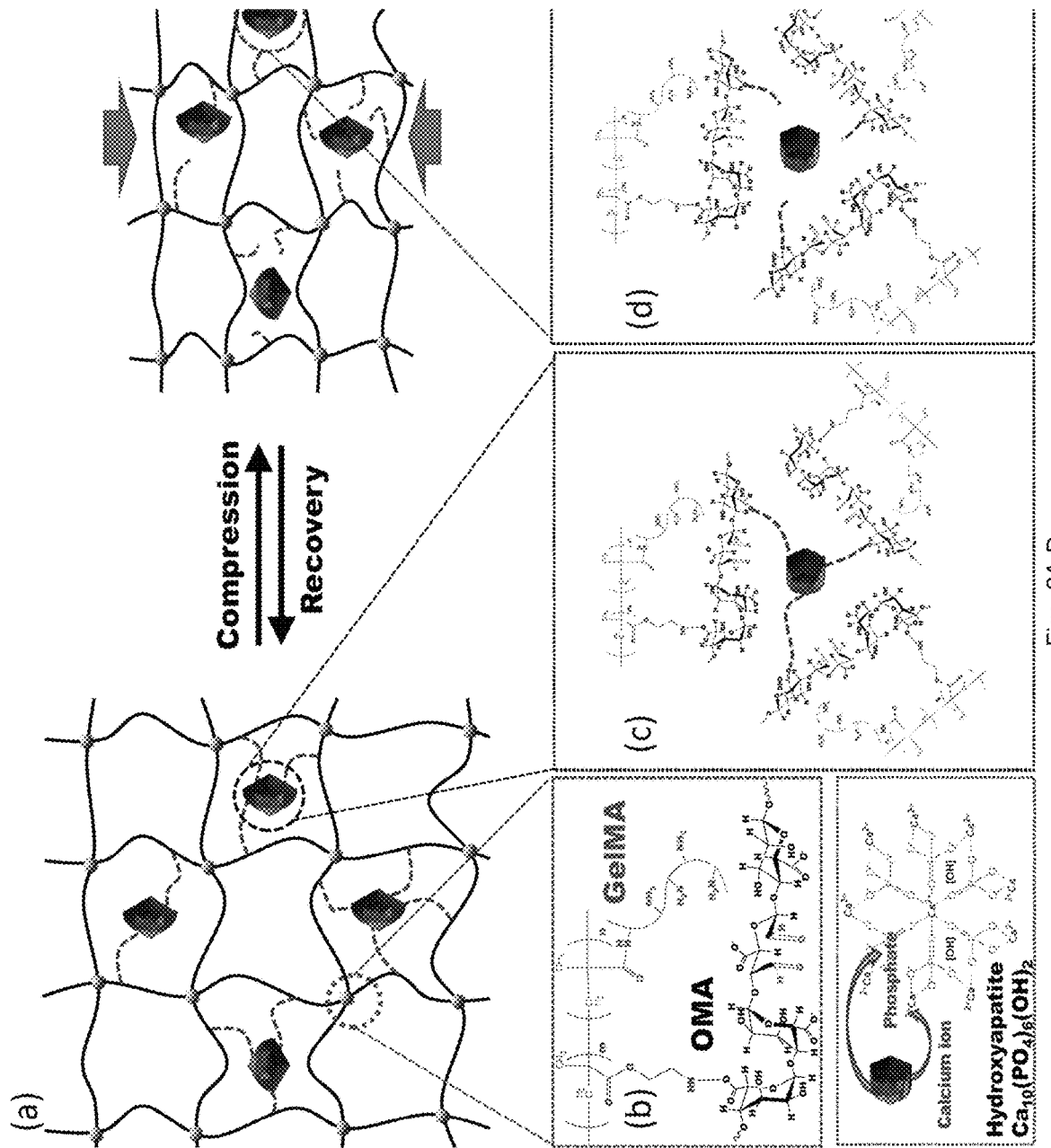
Figs. 2A-D (c)

(d)

ELASTOMERIC NANOCOMPOSITE HYDROGELS

RELATED APPLICATION

This application claims priority from U.S. Provisional Application No. 62/597,803, filed Dec. 12, 2017, this application is a Continuation-in-Part of U.S. Ser. No. 16/107,708, filed Aug. 21, 2018, which claims priority to U.S. Provisional Application Ser. No. 62/548,243, filed Aug. 21, 2017, the subject matter of which are incorporated herein by reference in their entirety.

GOVERNMENT FUNDING

This invention was made with government support under Grant Nos. R01AR069564, R01AR066193, and T32AR007505 awarded by The National Institutes of Health. The United States government has certain rights to the invention.

BACKGROUND

Hydrogels are chemically or physically crosslinked three-dimensional (3D) polymeric networks that can mimic the native extracellular matrix. However, hydrogels' utility for biomedical applications are often limited due to their poor mechanical properties, such as low stiffness, toughness and elasticity. To enhance these properties, many crosslinking mechanisms have been proposed, including nanoclay-crosslinked hydrogels, dual-crosslinked hydrogels, supramolecular or topological hydrogels, microsphere-composite hydrogels, and interpenetrating polymer network (IPN) structured hydrogels. Despite recent successes, these approaches still face challenges, such as non-cytocompatible conditions for cell encapsulation and high concentration of crosslinking chemicals to achieve mechanically tough hydrogels. Thus, there is still significant interest in developing advanced strategies to fabricate mechanically strong, elastic, biocompatible and biodegradable hydrogels for tissue engineered constructs.

SUMMARY

Embodiments described herein relate to elastomeric nanocomposite hydrogels, methods of forming the hydrogels, and to their use in regenerative medicine, cell-based technologies, drug delivery, and tissue engineering applications. The elastomeric nanocomposite hydrogels include first natural polymer macromers covalently crosslinked with second natural polymer macromers and physically crosslinked with a plurality of inorganic nanoparticles. Advantageously, the elastomeric nanocomposite hydrogel exhibits highly elastic properties, cytocompatibility, biodegradability, and toughness. For example, the elastomeric nanocomposite hydrogels described herein can fully recover their original thickness from large strains and long-term cyclic strain loading. The physical properties of elastomeric nanocomposite hydrogels can be controllable, and their high elasticity can be preserved during degradation.

In some embodiments, the first natural polymer macromers are photocrosslinked with the second natural polymer macromers.

In some embodiments, the first natural polymer macromers are acrylated and/or methacrylated polysaccharides, which are optionally oxidized, such as oxidized acrylated and/or methacrylated alginates. The first natural polymer macromers can form reversible physical crosslinks with the inorganic nanoparticles.

In other embodiments, the second natural polymer macromers can include acrylated and/or methacrylated gelatin that is photocrosslinkable with the first natural polymer macromers.

In still further embodiments, methacrylate and/or acrylate groups of the optionally oxidized acrylated and/or methacrylated polysaccharides, such as oxidized acrylated and/or methacrylated alginate, can react with methacrylate and/or acrylate groups of the acrylated and/or methacrylated gelatin to form the covalent crosslinks In other embodiments, the elastomeric nanocomposite hydrogel can include a plurality of cells dispersed on and/or within the hydrogel. The cells can be any cells including, for example, undifferentiated stem cells or progenitor cells with a cell lineage potential that corresponds to the desired tissue being engineered and/or differentiated cells. The cells can be unipotent, oligopotent, multipotent, or pluripotent. In some embodiments, the cells are adult stem cells. The cells can be allogeneic or autologous. In particular embodiments, the cells include mesenchymal stem cells (MSCs). The composition can contain a single cell type, such as MSCs. However, in some embodiments, the composition contains two or more different types of cells, i.e., cells of two or more different lineages. The cells can be animal cells, such as human cells.

The elastomeric nanocomposite hydrogel can also include at least one bioactive agent. The bioactive agent can include, for example, at least one of BMP-2 or TGF-β.

BRIEF DESCRIPTION OF THE DRAWINGS

FIGS. 2(A-D) illustrate (A) schematics of the nanocomposite OMA/GelMA hybrid hydrogels under cyclic mechanical stimulation. (B) Photocrosslink formed with methacrylate groups. (C) Physical crosslink between nHA and hydrogel backbone. (D) Broken physical crosslink by compression.

DETAILED DESCRIPTION

Figure 1A:
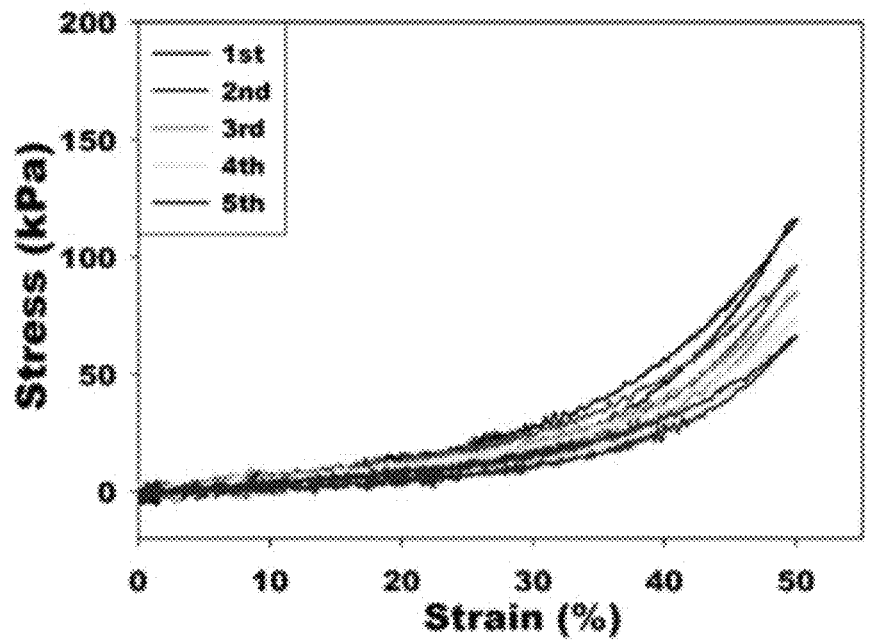
FIGS. 1(A-C) illustrate plots showing the elasticity of the photocrosslinked OMA hydrogels. Stress-strain plots of (A) OMA5, (B) OMA10 and (C) OMA15.

Methods involving conventional molecular biology techniques are described herein. Such techniques are generally known in the art and are described in detail in methodology treatises, such as *Current Protocols in Molecular Biology*, ed. Ausubel et al., Greene Publishing and Wiley-Interscience, New York, 1992 (with periodic updates). Unless otherwise defined, all technical terms used herein have the same meaning as commonly understood by one of ordinary skill in the art to which the present invention pertains. Commonly understood definitions of molecular biology terms can be found in, for example, Rieger et al., *Glossary of Genetics: Classical and Molecular*, 5th Ed., Springer-Verlag: New York, 1991, and Lewin, *Genes V*, Oxford University Press: New York, 1994. The definitions provided herein are to facilitate understanding of certain terms used frequently herein and are not meant to limit the scope of the present invention.

In the context of the present invention, the term "bioactive agent" can refer to any agent capable of promoting tissue growth, inhibition, formation, destruction, and/or targeting a specific disease state. Examples of bioactive agents can include, but are not limited to, chemotactic agents, various proteins (e.g., short term peptides, bone morphogenic proteins, collagen, glycoproteins, and lipoprotein), cell attachment mediators, biologically active ligands, integrin binding sequence, various growth and/or differentiation agents and fragments thereof (e.g., epidermal growth factor (EGF), hepatocyte growth factor (HGF), vascular endothelial growth factors (VEGF), fibroblast growth factors (e.g., bFGF), platelet derived growth factors (PDGF), insulin-like growth factor (e.g., IGF-I, IGF-II) and transforming growth factors (e.g., TGF-β I-III), parathyroid hormone, parathyroid hormone related peptide, bone morphogenic proteins (e.g., BMP-2, BMP-4, BMP-6, BMP-7, BMP-12, BMP-13, BMP-14), transcription factors, such as sonic hedgehog, growth differentiation factors (e.g., GDF5, GDF6, GDF8), recombinant human growth factors (e.g., MP52 and the MP-52 variant rhGDF-5), cartilage-derived morphogenic proteins (CDMP-1, CDMP-2, CDMP-3), small molecules that affect the upregulation of specific growth factors, DNA fragments, DNA plasmids, MMPs, TIMPs, interfering RNA molecules, such as siRNAs, oligonucleotides, proteoglycans, glycoproteins, glycosaminoglycans, and DNA encoding for shRNA.

The terms "biodegradable" and "bioresorbable" may be used interchangeably and refer to the ability of a material (e.g., a natural polymer or macromer) to be fully resorbed in vivo. "Full" can mean that no significant extracellular fragments remain. The resorption process can involve elimination of the original implant material(s) through the action of body fluids, enzymes, cells, and the like.

The term "function and/or characteristic of a cell" can refer to the modulation, growth, and/or proliferation of at least one cell, such as a progenitor cell and/or differentiated cell, the modulation of the state of differentiation of at least one cell, and/or the induction of a pathway in at least one cell, which directs the cell to grow, proliferate, and/or differentiate along a desired pathway, e.g., leading to a desired cell phenotype, cell migration, angiogenesis, apoptosis, etc.

The term "gel" includes gels and hydrogels.

The term "macromer" can refer to any natural polymer or oligomer.

The term "polynucleotide" can refer to oligonucleotides, nucleotides, or to a fragment of any of these, to DNA or RNA (e.g., mRNA, rRNA, siRNA, tRNA) of genomic or synthetic origin which may be single-stranded or double-stranded and may represent a sense or antisense strand, to peptide nucleic acids, or to any DNA-like or RNA-like material, natural or synthetic in origin, including, e.g., iRNA, ribonucleoproteins (e.g., iRNPs). The term can also encompass nucleic acids (i.e., oligonucleotides) containing known analogues of natural nucleotides, as well as nucleic acid-like structures with synthetic backbones.

The term "polypeptide" can refer to an oligopeptide, peptide, polypeptide, or protein sequence, or to a fragment, portion, or subunit of any of these, and to naturally occurring or synthetic molecules. The term "polypeptide" can also include amino acids joined to each other by peptide bonds or modified peptide bonds, i.e., peptide isosteres, and may contain any type of modified amino acids. The term "polypeptide" can also include peptides and polypeptide fragments, motifs and the like, glycosylated polypeptides, and all "mimetic" and "peptidomimetic" polypeptide forms.

The term "cell" can refer to any progenitor cell, such as totipotent stem cells, pluripotent stem cells, and multipotent stem cells, as well as any of their lineage descendant cells, including more differentiated cells. The terms "stem cell" and "progenitor cell" are used interchangeably herein. The cells can derive from embryonic, fetal, or adult tissues. Examples of progenitor cells can include totipotent stem cells, multipotent stem cells, mesenchymal stem cells (MSCs), neuronal stem cells, hematopoietic stem cells, pancreatic stem cells, cardiac stem cells, embryonic stem cells, embryonic germ cells, neural crest stem cells, kidney stem cells, hepatic stem cells, lung stem cells, hemangioblast cells, and endothelial progenitor cells. Additional exemplary progenitor cells can include de-differentiated chondrogenic cells, chondrogenic cells, cord blood stem cells, multi-potent adult progenitor cells, myogenic cells, osteogenic cells, tendogenic cells, ligamentogenic cells, adipogenic cells, and dermatogenic cells.

The term "subject" can refer to any animal, including, but not limited to, humans and non-human animals (e.g., rodents, arthropods, insects, fish (e.g., zebrafish)), non-human primates, ovines, bovines, ruminants, lagomorphs, porcines, caprines, equines, canines, felines, ayes, etc.), which is to be the recipient of a particular treatment. Typically, the terms "patient" and "subject" are used interchangeably herein in reference to a human subject.

The term "tissue" can refer to an aggregate of cells having substantially the same function and/or form in a multicellular organism. "Tissue" is typically an aggregate of cells of the same origin, but may be an aggregate of cells of different origins. The cells can have the substantially same or substantially different function, and may be of the same or different type. "Tissue" can include, but is not limited to, an organ, a part of an organ, bone, cartilage, skin, neuron, axon, blood vessel, cornea, muscle, fascia, brain, prostate, breast, endometrium, lung, pancreas, small intestine, blood, liver, testes, ovaries, cervix, colon, stomach, esophagus, spleen, lymph node, bone marrow, kidney, peripheral blood, embryonic, or ascite tissue.

The terms "inhibit," "silencing," and "attenuating" can refer to a measurable reduction in expression of a target mRNA (or the corresponding polypeptide or protein) as compared with the expression of the target mRNA (or the corresponding polypeptide or protein) in the absence of an interfering RNA molecule of the present invention. The reduction in expression of the target mRNA (or the corresponding polypeptide or protein) is commonly referred to as "knock-down" and is reported relative to levels present following administration or expression of a non-targeting control RNA.

The term "population" can refer to a collection of cells, such as a collection of progenitor and/or differentiated cells.

The term "differentiated" as it relates to the cells can refer to cells that have developed to a point where they are programmed to develop into a specific type of cell and/or lineage of cells. Similarly, "non-differentiated" or "undifferentiated" as it relates to the cells can refer to progenitor cells, i.e., cells having the capacity to develop into various types of cells within a specified lineage.

Embodiments described herein relate to elastomeric nanocomposite hydrogels, methods of forming the hydrogels, and to their use in regenerative medicine, cell-based technologies, drug delivery, and tissue engineering applications. The elastomeric nanocomposite hydrogels include first natural polymer macromers covalently crosslinked with second natural polymer macromer and physically crosslinked with a plurality of inorganic nanoparticles. Advantageously, the elastomeric nanocomposite hydrogel exhibits highly elastic properties, cytocompatibility, biodegradability, and toughness. For example, the elastomeric nanocomposite hydrogels described herein can fully recover their original thickness from large strains and long-term cyclic strain loading. The physical properties of elastomeric nanocomposite hydrogels can be controllable, and their high elasticity can be preserved during degradation.

The elastomeric nanocomposite hydrogel can optionally include a plurality of cells dispersed therein and be biodegradable, and, upon degradation, produce substantially non-toxic products. Advantageously, encapsulated cells, such as hMSCs, can maintain their long-term high viability in the elastomeric nanocomposite hydrogels. Moreover, mechanical stimulation of the elastomeric nanocomposite hydrogel can enhance cells encapsulated in the hydrogel proliferation and differentiation.

The elastomeric nanocomposite described herein can be substantially cytocompatible (i.e., substantially non-cytotoxic) and include controllable physical properties, such as degradation rate, swelling behavior, and mechanical properties. In some embodiments, the first natural polymer macromers can be covalently crosslinked with the second natural polymer macromers.

In some embodiments, the first natural polymer macromers are acrylated and/or methacrylated polysaccharides, which are optionally oxidized so that up to about 50% of the saccharide units therein are converted to aldehyde saccharide units. Control over the degree of oxidation of the natural polymer macromers permits regulation of the gelling time used to form the hydrogel as well as the mechanical properties, which allows for tailoring of these mechanical properties depending on the clinical application.

In other embodiments, the first natural polymer macromers can include methacrylated and/or acrylated alginates, which are optionally oxidized so that up to about 50% of the saccharide units therein are converted to aldehyde saccharide units. Natural source alginates, for example, from seaweed or bacteria, are useful and can be selected to provide side chains with appropriate M (mannuronate) and G (guluronate) units for the ultimate use of the polymer. Alginate materials can be selected with high guluronate content since the guluronate units, as opposed to the mannuronate units, more readily provide sites for oxidation and crosslinking. Isolation of alginate chains from natural sources can be conducted by conventional methods. See Biomaterials: Novel Materials from Biological Sources, ed. Byrum, Alginates chapter (ed. Sutherland), p. 309-331 (1991). Alternatively, synthetically prepared alginates having a selected M and G unit proportion and distribution prepared by synthetic routes, such as those analogous to methods known in the art, can be used. Further, either natural or synthetic source alginates may be modified to provide M and G units with a modified structure. The M and/or G units may also be modified, for example, with polyalkylene oxide units of varied molecular weight such as shown for modification of polysaccharides in U.S. Pat. No. 5,490,978 with other alcohols, such as glycols. Such modification generally will make the polymer more soluble, which generally will result in a less viscous material. Such modifying groups can also enhance the stability of the polymer. Further, modification to provide alkali resistance, for example, as shown by U.S. Pat. No. 2,536,893, can be conducted.

The oxidation of the first natural polymer macromers (e.g., alginate macromers) can be performed using a periodate oxidation agent, such as sodium periodate, to provide at least some of the saccharide units of the natural polymer macromer with aldehyde groups. The degree of oxidation is controllable by the mole equivalent of oxidation agent, e.g., periodate, to saccharide unit. For example, using sodium periodate in an equivalent % of from 2% to 100%, preferably 1% to 50%, a resulting degree of oxidation, i.e., % if saccharide units converted to aldehyde saccharide units, from about 2% to 50% can be obtained. The aldehyde groups provide functional sites for crosslinking and for bonding tissue, cells, prosthetics, grafts, and other material that is desired to be adhered. Further, oxidation of the first natural polymer macromer facilitates their degradation in vivo, even if they are not lowered in molecular weight. Thus, high molecular weight alginates, e.g., of up to 300,000 daltons, may be degradeable in vivo, when sufficiently oxidized, i.e., preferably at least 5% of the saccharide units are oxidized.

The first polymer macromers (e.g., alginate) can be acrylated and/or methacrylated by reacting an acryl group and/or methacryl group with a first natural polymer macromer (e.g., alginate). For example, an optionally oxidized alginate solution can be combined with N-hydroxysuccinimide (NHS) and 1-ethyl-3-(3-dimethylaminopropyl)-carbodiimide hydrochloride (EDC) to activate carboxylic acid groups of the alginate. The alginate can then be reacted with 2-aminoethyl methacrylate (AEMA) to provide a plurality of methacrylate groups on the optionally oxidized alginate.

The degree of acrylation and/or methacrylation can be controlled to control the degree of subsequent crosslinking of the acrylate and methacrylates as well as the mechanical properties, and biodegradation rate of the composition. The degree of acrylation or methacrylation can be about 1% to about 99%, although this ratio can vary more or less depending on the end use of the composition.

The second natural polymer macromers covalently crosslinked with the first natural polymer macromers can include crosslinkable natural polymer macromers that are different than the first polymer macromers and include an acrylate group and/or methacrylate group that can be crosslinked with the acrylate group and/or methacrylate group of the first natural polymer macromers. Advantageously, the crosslinked second polymer macromers should have an elasticity greater than the elasticity of the crosslinked first natural polymer macromers to enhance the elasticity of hydrogel.

In some embodiments, the crosslinked second natural polymer macromers, which can have an elasticity greater than the elasticity of the crosslinked first natural polymer macromers, can include an acrylated and/or methacrylated gelatin. The second natural polymer macromer (e.g., gelatin) can be acrylated and/or methacrylated by reacting an acryl group and/or methacryl with a second natural polymer macromer (e.g., gelatin). For example, bovine type-B gelatin can be dissolved in a phosphate buffered solution and then reacted with methacrylic anhydride to provide a plurality of methacrylate groups on the gelatin.

The degree of acrylation and/or methacrylation can be controlled to control the degree of subsequent crosslinking of the acrylate and methacrylates as well as the mechanical properties, and biodegradation rate of the composition. The degree of acrylation or methacrylation can be about 1% to about 99%, although this ratio can vary more or less depending on the end use of the composition.

In some embodiments, the acrylate or methacrylate groups of the acrylated and/or methacrylated first natural polymer macromer and second natural polymer macromer can be crosslinked by photocrosslinking using UV light in the presence of photoinitiators. For example, acrylated and/or methacrylated natural polymer macromers can be photocrosslinked in an appropriate amount of diH$_2$O or aqueous media (e.g., PBS) containing a desired amount of a photoinitiator.

The photoinitiator can include any photo-initiator that can initiate or induce polymerization of the acrylate or methacrylate macromer. Examples of the photoinitiator can include camphorquinone, benzoin methyl ether, 2-hydroxy-2-methyl-1-phenyl-1-propanone, diphenyl(2,4,6-trimethyl-benzoyl)phosphine oxide, benzoin ethyl ether, benzophenone, 9,10-anthraquinone, ethyl-4-N,N-dimethylaminobenzoate, diphenyliodonium chloride and derivatives thereof.

The acrylated and/or methacrylated first natural polymer macromers and second natural polymer macromers can be exposed to a light source at a wavelength and for a time to promote crosslinking of the acrylate and/or methacrylate groups of the macromers.

The ratio of the acrylated and/or methacrylated first natural polymer macromers and second natural polymer macromers in the elastomeric nanocomposite hydrogels can be about 1:1, about 1:2, about 1:3, about 1:4, about 1:5, about 1:10, about 10:1, about 5:1, about, 4:1, about 3:1, about 2:1, or ratios therebetween.

The first natural polymer macromers can also be crosslinked with a plurality of inorganic nanoparticles that ionically form reversible physical crosslinks with carboxylic groups of the first natural polymer macromers. These physical crosslinks can be broken and healed under mechanical stimulation to enhance the elasticity and toughness of the elastomeric nanocomposite hydrogel.

The inorganic nanoparticles can include any submicron nanoparticle material that can ionically crosslink the first natural polymer macromers. The inorganic nanoparticles can include calcium based nanoparticles, such as hydroxyapatite nanoparticles, that can form reversible physical crosslinks with calcium ions of the nanonoparticles and carboxylic groups, e.g., gluronic acids, of different alginate polymer macromers. The extent of crosslinking can be controlled by the concentration of the inorganic nanoparticles. The higher concentration can correspond to a higher extent of crosslinking. The extent of crosslinking alters the mechanical properties of the hydrogel and can be controlled as desired for the particular application. In general, a higher degree of crosslinking results in a stiffer gel.

In some embodiments, inorganic nanoparticles can be provided in the hydrogel at a concentration of at least about 1 weight/volume %, at least about 5 w/v %, at least about 10 w/v %, at least about 15 w/v %, at least about 20 w/v %, at least about 25 w/v % or more.

The inorganic nanoparticles can have a diameter ranging from about less than 1 nanometer to less than about 1 micron. In some embodiments, the inorganic nanoparticles can have a diameter of about 1 nm to about 100 nm, about 10 nm to about 80 nm, about 25 nm to about 75 nm, or ranges therebetween. It will be appreciated that smaller or larger inorganic nanoparticles may be used. The inorganic nanoparticles can have a generally spherical morphology and be of a substantially uniform size or, alternatively, may be irregular in morphology and have disparate sizes.

In some embodiment, the elastomeric nanocomposite hydrogel can include a plurality of cells dispersed on and/or within the hydrogel. The cells provided in the hydrogel can be autologous, xenogeneic, allogeneic, and/or syngeneic. Where the cells are not autologous, it may be desirable to administer immunosuppressive agents in order to minimize immunorejection. The cells employed may be primary cells, expanded cells, or cell lines, and may be dividing or non-dividing cells. Cells may be expanded ex vivo prior to introduction into or onto the hydrogel. For example, autologous cells can be expanded in this manner if a sufficient number of viable cells cannot be harvested from the host subject. Alternatively or additionally, the cells may be pieces of tissue, including tissue that has some internal structure. The cells may be primary tissue explants and preparations thereof, cell lines (including transformed cells), or host cells.

Generally, cells can be introduced into the elastomeric nanocomposite hydrogels in vitro, although in vivo seeding approaches can optionally or additionally be employed. Cells may be mixed with the macromers used to form the elastomeric nanocomposite hydrogels and cultured in an adequate growth (or storage) medium to ensure cell viability. If the elastomeric nanocomposite hydrogel is to be implanted for use in vivo after in vitro seeding, for example, sufficient growth medium may be supplied to ensure cell viability during in vitro culture prior to in vivo application. Once the elastomeric nanocomposite hydrogels have been implanted, the nutritional requirements of the cells can be met by the circulating fluids of the host subject.

Any available method may be employed to introduce the cells into the elastomeric nanocomposite hydrogels. For example, cells may be injected into the elastomeric nanocomposite hydrogels (e.g., in combination with growth medium) or may be introduced by other means, such as pressure, vacuum, osmosis, or manual mixing. Alternatively or additionally, cells may be layered on the elastomeric nanocomposite hydrogels, or the elastomeric nanocomposite hydrogels may be dipped into a cell suspension and allowed to remain there under conditions and for a time sufficient for the cells to incorporate within or attach to the elastomeric nanocomposite hydrogel. Generally, it is desirable to avoid excessive manual manipulation of the cells in order to minimize cell death during the impregnation procedure. For example, in some situations it may not be desirable to manually mix or knead the cells with the elastomeric nanocomposite hydrogels; however, such an approach may be useful in those cases in which a sufficient number of cells will survive the procedure. Cells can also be introduced into the elastomeric nanocomposite hydrogels in vivo simply by placing the elastomeric nanocomposite hydrogel in the subject adjacent a source of desired cells.

As those of ordinary skill in the art will appreciate, the number of cells to be introduced into the elastomeric nanocomposite hydrogels will vary based on the intended application of the hydrogel and on the type of cell used. Where dividing autologous cells are being introduced by injection or mixing into the hydrogel, for example, a lower number of cells can be used. Alternatively, where non-dividing cells are being introduced by injection or mixing into the hydrogel, a larger number of cells may be required. It should also be appreciated that the elastomeric nanocomposite hydrogel can be in either a hydrated or lyophilized state prior to the addition of cells. For example, the elastomeric nanocomposite hydrogel can be in a lyophilized state before the addition of cells is done to re-hydrate and populate the scaffold with cells.

In other embodiments, the elastomeric nanocomposite hydrogels can include at least one attachment molecule to facilitate attachment of at least one cell thereto. The attachment molecule can include a polypeptide or small molecule, for example, and may be chemically immobilized onto the elastomeric nanocomposite hydrogel to facilitate cell attachment. Examples of attachment molecules can include fibronectin or a portion thereof, collagen or a portion thereof, polypeptides or proteins containing a peptide attachment sequence (e.g., arginine-glycine-aspartate sequence) (or other attachment sequence), enzymatically degradable peptide linkages, cell adhesion ligands, growth factors, degradable amino acid sequences, and/or protein-sequestering peptide sequences.

In other embodiments, the elastomeric nanocomposite hydrogel can include at least one bioactive agent. The at least one bioactive agent can include any agent capable of modulating a function and/or characteristic of a cell that is dispersed on or within the elastomeric nanocomposite hydrogel. Alternatively or additionally, the bioactive agent may be capable of modulating a function and/or characteristic of an endogenous cell surrounding the elastomeric nanocomposite hydrogel implanted in a tissue defect, for example, and guide the cell into the defect.

Examples of bioactive agents include chemotactic agents, various proteins (e.g., short term peptides, bone morphogenic proteins, collagen, glycoproteins, and lipoprotein), cell attachment mediators, biologically active ligands, integrin binding sequence, various growth and/or differentiation agents and fragments thereof (e.g., EGF, HGF, VEGF, fibroblast growth factors (e.g., bFGF), PDGF, insulin-like growth factor (e.g., IGF-I, IGF-II) and transforming growth factors (e.g., TGF-$\beta$ I-III), parathyroid hormone, parathyroid hormone related peptide, bone morphogenic proteins (e.g., BMP-2, BMP-4, BMP-6, BMP-7, BMP-12, BMP-13, BMP-14), sonic hedgehog, growth differentiation factors (e.g., GDF5, GDF6, GDF8), recombinant human growth factors (e.g., MP-52 and the MP-52 variant rhGDF-5), cartilage-derived morphogenic proteins (CDMP-1, CDMP-2, CDMP-3), small molecules that affect the upregulation of specific growth factors, polynucleotides, DNA fragments, DNA plasmids, MMPs, TIMPs, interfering RNA molecules, such as siRNAs, DNA encoding for an shRNA of interest, oligonucleotides, proteoglycans, glycoproteins, and glycosaminoglycans.

The elastomeric nanocomposite hydrogel can be used in a variety of biomedical applications, including tissue engineering, drug delivery applications, and regenerative medicine. In one example, the elastomeric nanocomposite hydrogel can be used to promote tissue growth in a subject. One step of the method can include identifying a target site. The target site can comprise a tissue defect (e.g., cartilage and/or bone defect) in which promotion of new tissue (e.g., cartilage and/or bone) is desired. The target site can also comprise a diseased location (e.g., tumor). Methods for identifying tissue defects and disease locations are known in the art and can include, for example, various imaging modalities, such as CT, MRI, and X-ray.

The tissue defect can include a defect caused by the destruction of bone or cartilage. For example, one type of cartilage defect can include a joint surface defect. Joint surface defects can be the result of a physical injury to one or more joints or, alternatively, a result of genetic or environmental factors. Most frequently, but not exclusively, such a defect will occur in the knee and will be caused by trauma, ligamentous instability, malalignment of the extremity, meniscectomy, failed aci or mosaicplasty procedures, primary osteochondritis dessecans, osteoarthritis (early osteoarthritis or unicompartimental osteochondral defects), or tissue removal (e.g., due to cancer). Examples of bone defects can include any structural and/or functional skeletal abnormalities. Non-limiting examples of bone defects can include those associated with vertebral body or disc injury/destruction, spinal fusion, injured meniscus, avascular necrosis, cranio-facial repair/reconstruction (including dental repair/reconstruction), osteoarthritis, osteosclerosis, osteoporosis, implant fixation, trauma, and other inheritable or acquired bone disorders and diseases.

Tissue defects can also include cartilage defects. Where a tissue defect comprises a cartilage defect, the cartilage defect may also be referred to as an osteochondral defect when there is damage to articular cartilage and underlying (subchondral) bone. Usually, osteochondral defects appear on specific weight-bearing spots at the ends of the thighbone, shinbone, and the back of the kneecap. Cartilage defects in the context of the present invention should also be understood to comprise those conditions where surgical repair of cartilage is required, such as cosmetic surgery (e.g., nose, ear). Thus, cartilage defects can occur anywhere in the body where cartilage formation is disrupted, where cartilage is damaged or non-existent due to a genetic defect, where cartilage is important for the structure or functioning of an organ (e.g., structures such as menisci, the ear, the nose, the larynx, the trachea, the bronchi, structures of the heart valves, part of the costae, synchondroses, enthuses, etc.), and/or where cartilage is removed due to cancer, for example.

After identifying a target site, such as a cranio-facial cartilage defect of the nose, the elastomeric nanocomposite hydrogel can be administered to the target site. The hydrogel can be prepared by mixing a plurality of cells, such as chondrocytes, with a plurality of oxidized acrylated and/or methacrylated alginate macromers, acrylated and/or methacrylated gelatin macromers, inorganic nanoparticle physical crosslinker, and a photoinitiator. Chondrocytes may be obtained from a host subject and then expanded to a desired density ex vivo. The oxidized alginate macromers in solution can then be ionically crosslinked with the inorganic nanoparticles and the acrylated and/or methacrylated macromers can be photocrosslinked.

Next, the elastomeric nanocomposite hydrogel may be loaded into a syringe or other similar device and injected or implanted into the tissue defect. Upon injection or implantation into the tissue defect, the hydrogel be formed into the shape of the tissue defect using tactile means.

After implanting the elastomeric nanocomposite hydrogel into the subject, the chondrocytes can begin to migrate from the hydrogel into the tissue defect, express growth and/or differentiation factors, and/or promote chondroprogenitor cell expansion and differentiation.

Advantageously, the elastomeric nanocomposite hydrogel can fully recover its shape (e.g., thickness) from large strains and long-term cyclic strain loading. The physical properties of elastomeric nanocomposite hydrogels can be controllable, and its high elasticity can be substantially preserved or maintained during degradation when, for example, implanted in a subjected in a subject in need thereof. Moreover, cells, such as hMSCs, encapsulated in the hydrogel can maintain long-term high viability.

The following example is for the purpose of illustration only and is not intended to limit the scope of the claims, which are appended hereto.

EXAMPLE

In this Example, we describe a highly elastomeric, tough, biocompatible and photocrosslinked nanocomposite hydrogels using oxidized, methacrylated alginate (OMA), GelMA and hydroxyapatite nanoparticles (nHA) with controllable mechanical property. The effect of concentrations of OMA, GelMA and nHA on the physical properties, such as elasticity, mechanical properties, swelling and degradation, of nanocomposite hydrogels was evaluated. Finally, cyclic compression was applied on the human bone marrow-derived mesenchymal stem cells (hMSC)-laden nanocomposite hydrogel constructs whether mechanical stimulation could affect the behaviors of encapsulated stem cells.

Methods

Synthesis of OMA) and GelMA

Oxidized alginate (OA) was prepared by reacting sodium alginate with sodium periodate. Sodium alginate (10 g, Protanal LF 20/40, molecular weight=197,000 Da, FMC Biopolymer) was dissolved in ultrapure deionized water (diH$_2$O, 900 ml) overnight. Sodium periodate (1.89 g, Sigma) was dissolved in 100 ml diH$_2$O, added to alginate solution under stirring to achieve 17.5% theoretical alginate oxidation, and allowed to react in the dark at room temperature for 24 hrs. The oxidized, methacrylated alginate (OMA) macromer was prepared by reacting OA with 2-aminoethyl methacrylate (AEMA). To synthesize OMA, 2-morpholinoethanesulfonic acid (MES, 19.52 g, Sigma) and NaCl (17.53 g) were directly added to an OA solution (1 L) and the pH was adjusted to 6.5. N-hydroxysuccinimide (NHS, 2.65 g, Sigma) and 1-ethyl-3-(3-dimethylaminopropyl)-carbodiimide hydrochloride (EDC, 8.75 g, Sigma) were added to the mixture under stirring to activate 45% of the carboxylic acid groups of the alginate. After 5 min, AEMA (3.8 g, Polysciences) (molar ratio of NHS:EDC:AEMA=1:2:1) was added to the solution, and the reaction was maintained in the dark at RT for 24 hrs. The reaction mixture was precipitated into excess of acetone, dried in a fume hood, and rehydrated to a 1% w/v solution in diH$_2$O for further purification. The OMA was purified by dialysis against diH$_2$O using a dialysis membrane (MWCO 3500, Spectrum Laboratories Inc.) for 3 days, treated with activated charcoal (5 g/L, 50-200 mesh, Fisher) for 30 min, filtered (0.22 μm filter) and lyophilized. The actual oxidation was determined by using the Amplite Colorimetric Aldehyde Quantitation Kit (AAT Bioquest Inc.) according to the manufacturer's instructions. To determine the levels of alginate methacrylation, the OMA was dissolved in deuterium oxide (D$_2$O, 2 w/v %), and $^1$H-NMR spectra were recorded on a NMR spectrometer (Varian Inova, Varian Inc, 600 MHz) using 3-(trimethylsilyl)propionic acid-d$_4$ sodium salt (0.05 w/v %) as an internal standard.

The GelMA was synthesized by reaction of type-A gelatin with methacrylic anhydride using a previously described method. Briefly, bovine type-A gelatin (10 g, Sigma) was dissolved in 100 mL Dulbecco's phosphate buffered saline (PBS, Gibco) at 60° C. and stirred until fully dissolved. Methacrylic anhydride (10 mL, purity=94%, Sigma) was added at a rate of 0.5 mL/min to the gelatin solution under vigorous stirring at 50° C., and the reaction was maintained in the dark at RT for 3 hrs. The reaction mixture was precipitated into excess acetone, dried in fume hood and rehydrated to a 10 w/v % solution in $diH_2O$. The GelMA was purified by dialysis against $diH_2O$ (MWCO 12-14 kDa) for 7 days at 40° C. to remove salts, unreacted methacrylic anhydride and byproducts, filtered (0.22 μm filter) and lyophilized. The actual extent of GelMA methacrylation was calculated from the $^1H$-NMR spectra.

Preparation of Nanocomposite OMA, GelMA and OMA/GelMA Hydrogels

To fabricate photocrosslinked nanocomposite hydrogels, OMA (5, 10 and 15 w/v %) and GelMA (10 and 15 w/v %) were dissolved separately in DMEM (Sigma) with a photoinitiator (2-Hydroxy-4'-(2-hydroxyethoxy)-2-methylpropiophenone, 0.05 w/v %, Sigma) at pH 7.4, and then hydroxyapatite nanoparticles (nHA, 5, 10 and 15 w/v %, diamter<40 nm, SkySpring Nanomaterials Inc.) were added into OMA and GelMA solutions. After vigorous mixing, the OMA and GelMA solutions were immediately placed between quartz (top) and glass (bottom) plates separated by 0.75 mm spacers and photocrosslinked with UV light (320-500 nm, EXFO Omnicure® S1000-1B, Lumen Dynamics Group) at ~20 $mW/cm^2$ for 5 min to form nanocomposite hydrogels. To fabricate OMA/GelMA nanocomposite hybrid hydrogels, nHA contained OMA (0.5 ml) and GelMA (0.5 ml) solutions were mixed in an 1.6 ml tube by pipetting and placed between quartz (top) and glass (bottom) plates separated by 0.75 mm spacers and then photocrosslinked with UV light (Lumen Dynamics Group) at ~20 $mW/cm^2$ for 5 min to form nanocomposite hybrid hydrogels.

Cyclic Compression Testing

Unconfined cyclic compression testing (5 cycles) of nanocomposite hydrogels (3 mm diameter and 0.8 mm height) was performed using a constant crosshead speed of 1%/sec on a mechanical testing machine (225 lbs Actuator, TestResources) equipped with a 5 N load cell under constant strain (50% compressive strain). To evaluate the fatigue resistance of nanocomposite hydrogels against compressive loading, the nanocomposite hydrogels were cyclically compressed with 50% compressive strain at a frequency of 0.5 Hz for 20,000 cycles.

Evaluation of Physical Property Changes During Degradation

Nanocomposite hydrogels were prepared as described above. Hydrogel disks were created using a 10 mm diameter biopsy punch. The nanocomposite hydrogel disks were lyophilized and dry weights ($W_d$) were measured. Dried hydrogel samples were immersed in 10 ml of DMEM and incubated at 37° C., and DMEM was replaced every week. At predetermined time points, samples were removed, rinsed with DMEM, and the swollen ($W_s$) hydrogel sample weights were measured. The swelling ratio (Q) was calculated by $Q=W_s/W_i$ (N=3 for each time point). After weighing the swollen hydrogel samples, the samples were lyophilized and weighed ($W_{dt}$). The percent mass loss was calculated by $(W_d-W_{dt})/W_d \times 100$ (N=3 for each time point).

At predetermined time points, the swollen nanocomposite hydrogel disks were punched once again using a 3 mm diameter biopsy punch, and the thickness was measured. To measure the modulus changes of the nanocomposite hydrogels during degradation, unconfined compression test of nanocomposite hydrogels was performed using a constant crosshead speed of 1%/sec on a mechanical testing machine (225 lbs Actuator) equipped with a 5 N load cell under 50% strain. Compressive moduli of nanocomposite hydrogels were determined from the slope of stress vs. strain plots, and limited to the first 5% of strain.

Encapsulation of hMSCs to Examine Cytocompatibility and Cell Growth

To isolate hMSCs, bone marrow aspirates were obtained from the posterior iliac crest of a healthy twenty three-year old male donor under a protocol approved by the University Hospitals of Cleveland Institutional Review Board and processed as previously described. Briefly, the aspirate was washed with low-glucose Dulbecco's Modified Eagle's Medium (DMEM-LG, Sigma) with 10% prescreened fetal bovine serum (FBS, Gibco). Mononuclear cells were isolated by centrifugation in a Percoll (Sigma) density gradient and the isolated cells were plated at $1.8 \times 10^5$ $cells/cm^2$ in DMEM-LG containing 10% FBS and 1% penicillin/streptomycin (P/S, Thermo Fisher Scientific) in an incubator at 37° C. and 5% $CO_2$. After 4 days of incubation, non-adherent cells were removed and adherent cell were maintained in DMEM-LG containing 10% FBS and 1% P/S with media changes every 3 days. After 14 days of culture, the cells were passaged at a density of $5 \times 10^3$ $cells/cm^2$.

OMA (5 w/v %) and GelMAs (5, 10 and 15 w/v %) were dissolved separately in DMEM with a photoinitiator [(2-Hydroxy-4'-(2-hydroxyethoxy)-2-methylpropiophenone, 0.05 w/v %, Sigma)] and nHA (5 w/v %) at pH 7.4, and then hMSCs (passage number 3, $2 \times 10^6$ cells/ml) were suspended in OMA and GelMAs. After OMA (0.5 ml) and GelMA (0.5 ml) solutions were mixed in an 1.6 ml tube by pipetting and placed between quartz (top) and glass (bottom) plates separated by 0.75 mm spacers and then photocrosslinked with UV light (Lumen Dynamics Group) at ~20 $mW/cm^2$ for 5 min to form hMSC encapsulated nanocomposite hybrid hydrogels. Nanocomposite hybrid hydrogel-construct disks were created using an 8 mm diameter biopsy punch, placed in wells of 24-well tissue culture plates with 1 ml DMEM containing 10% FBS and 1% P/S and cultured in a humidified incubator at 37° C. with 5% $CO_2$.

The viability of encapsulated hMSCs in the nanocomposite hybrid hydrogels was investigated using a Live/Dead assay comprised of fluorescein diacetate [FDA, 1.5 mg/ml in dimethyl sulfoxide (Research Organic Inc.), Sigma] and ethidium bromide (EB, 1 mg/ml in PBS, Thermo Fisher Scientific). The staining solution was freshly prepared by mixing 1 ml FDA solution and 0.5 ml EB solution with 0.3 ml PBS (pH 8). Twenty μl of staining solution was added into each well and incubated for 3-5 min at room temperature, and then stained hydrogel-hMSC constructs were imaged using a fluorescence microscope (ECLIPSE TE 300) equipped with a digital camera (Retiga-SRV).

hMSC Osteogenesis Under Mechanical Stimulation

To evaluate the effect of mechanical stimulation on the osteogenic differentiation of encapsulated cell, hMSC-laden hydrogel-cell construct disks were created using an 10 mm diameter biopsy punch hydrogel as described above and placed in wells of 24-well tissue culture plates with 0.5 ml osteogenic media [10 mM β-glycerophosphate (CalBiochem), 50 μM ascorbic acid (Wako), 100 nM dexamethasone (MP Biomedicals) and 100 ng/ml BMP-2] containing 10% fetal bovine serum (FBS, Sigma) and 1% penicillin/streptomycin (P/S, Thermo Fisher Scientific) with media changes every 3 days. The hydrogel constructs were subjected to strain controlled, unconfined, dynamic mechanical compression using a BOSE bioreactor (ElectroForce BioDynamic test instrument, Bose) equipped with a 200 N load cell. Compressive mechanical stimulation was performed using a sine wave with a frequency of 0.5 Hz at 10% strain for 1 hr/day during the entire culture period. To determine whether osteogenic differentiation of hMSCs cultured in nanocomposite elastomeric hybrid hydrogels could be enhanced by mechanical stimulation in vitro, at predetermined time points, each hydrogel-cell construct was removed from the 24-well plates, put in 1 ml ALP lysis buffer (CelLytic™ M, Sigma) and homogenized at 35,000 rpm for 30 s using a TH homogenizer (Omni International). The homogenized solutions were centrifuged at 500 g with a Sorvall Legent RT Plus Centrifuge (Thermo Fisher Scientific). For ALP measurement, supernatant (100 µl) was treated with p-nitrophenylphosphate ALP substrate (pNPP, 100 µl, Sigma) at 37° C. for 30 min, and then 0.1 N NaOH (50 µl) was added to stop the reaction. The absorbance was measured at 405 nm using a plate reader (VersaMax, Molecular Devices) (N=4). DNA content in supernatant (100 µl) was measured using a Picogreen assay kit (Invitrogen) according to the manufacturer's instructions. Fluorescence intensity of the dye-conjugated DNA solution was measured using a fluorescence plate reader (FMAX, Molecular Devices) set at 485 nm excitation and 538 nm emission (N=4). After an equal volume of 1.2 N HCl was added into each lysate solution, the mixed solutions were centrifuged at 500 g with a Sorvall Legent RT Plus Centrifuge. Calcium content of the encapsulated hMSCs was quantified using a calcium assay kit (Pointe Scientific) according to the manufacturer's instructions. Supernatant (4 µl) was mixed with a color and buffer reagent mixture (250 µl) and the absorbance was read at 570 nm on a microplate reader (VersaMax) (N=4). All ALP and calcium content measurements were normalized to DNA content. To evaluate the elastic behavior changes of the nanocomposite hydrogel constructs after osteogenesis, unconfined cyclic compression test (5 cycles) of osteogenically differentiated hMSC-laden nanocomposite hydrogels was performed using a constant crosshead speed of 1%/sec on a mechanical testing machine (225 lbs Actuator) equipped with a 5 N load cell under 50% strain. Compressive moduli osteogenically differentiated hMSC-laden nanocomposite hydrogels were determined from the slope of stress vs. strain plots, and limited to the first 5% of strain.

Results

Figure 1B:
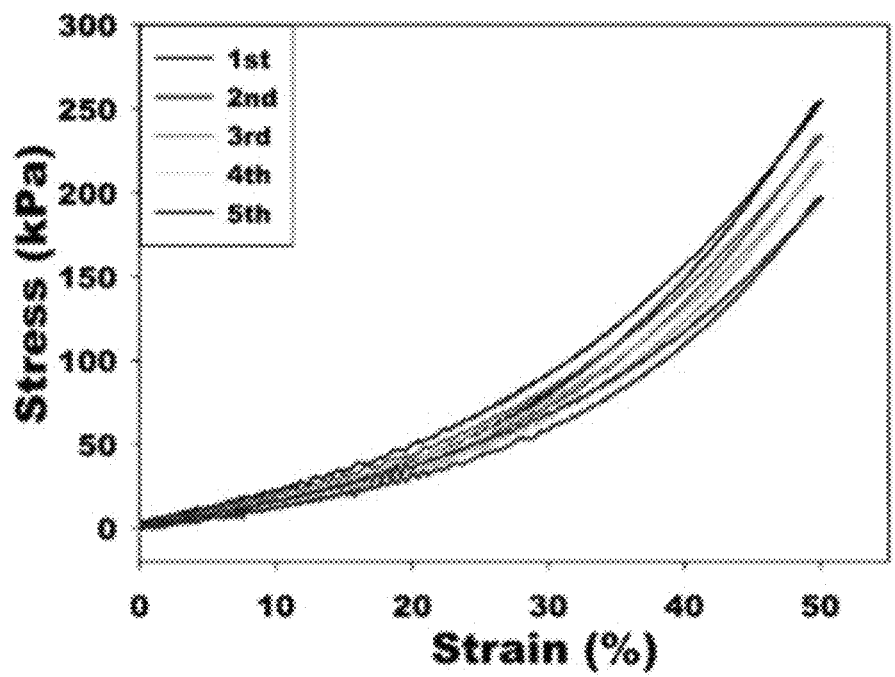
Figure 1C:
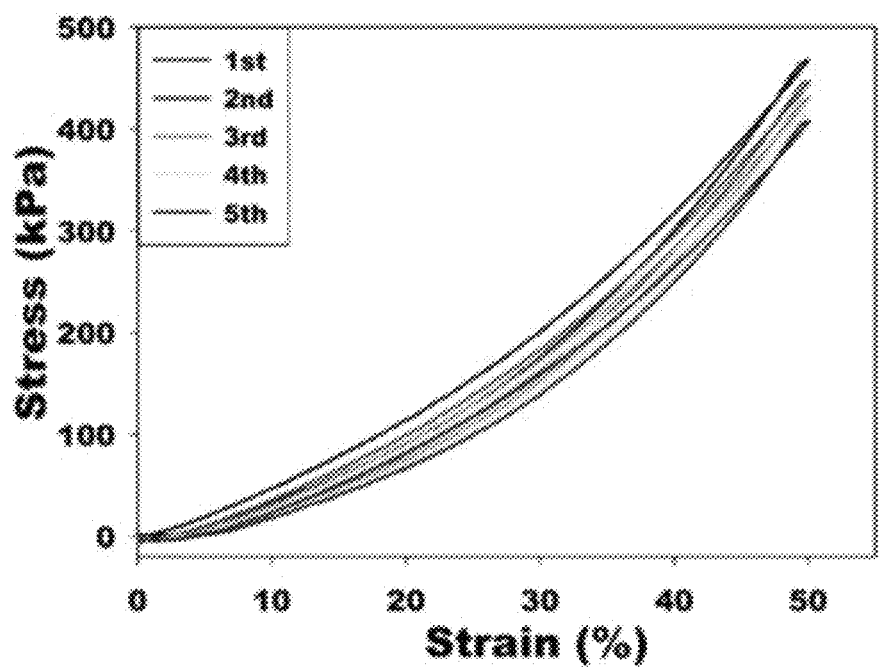
Figure 3A:
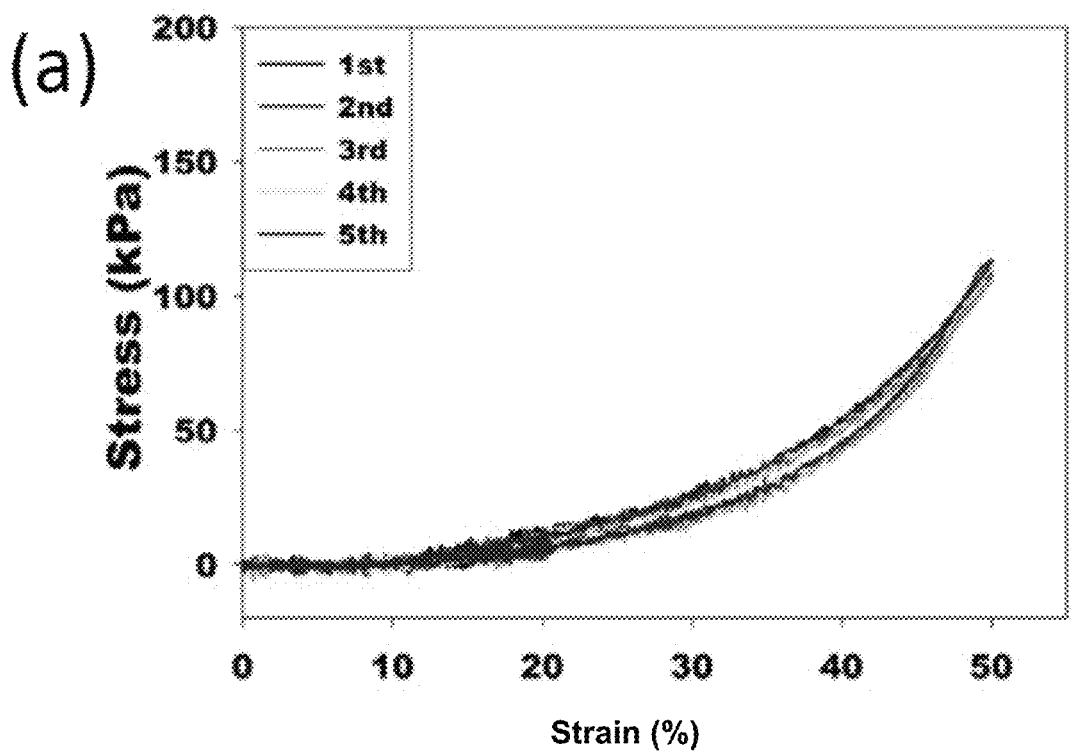
FIGS. 3(A-D) illustrate plots showing the elasticity of nanocomposite OMA hydrogels. (A) Stress-strain plots of nanocomposite (A) OMA55, (B) OMA105 and (C) OMA155 hydrogels under the five cycles of deformation at 50% strain. (D) Fatigue property of the nanocomposite OMA55 hydrogels. Stress/strain plots of the nanocomposite OMA55 hydrogel during the 1st, 10000th and, 20000th cycle of loading and unloading to a strain magnitude of 50%.
Figure 3B:
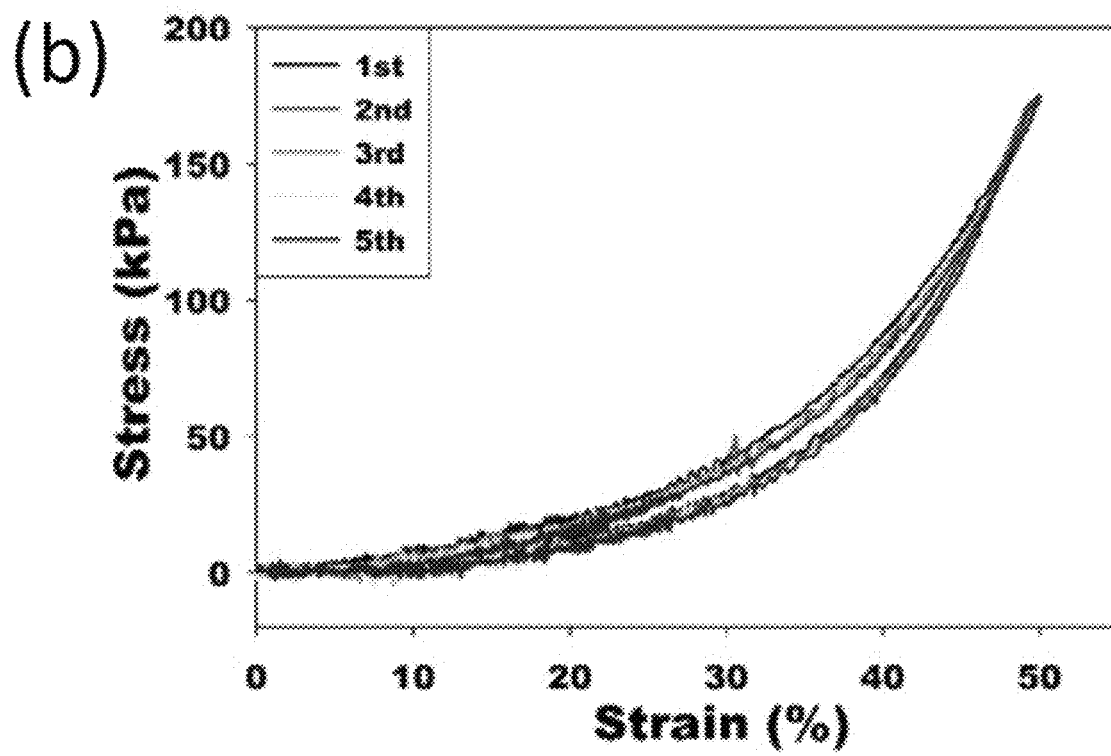
Figure 3C:
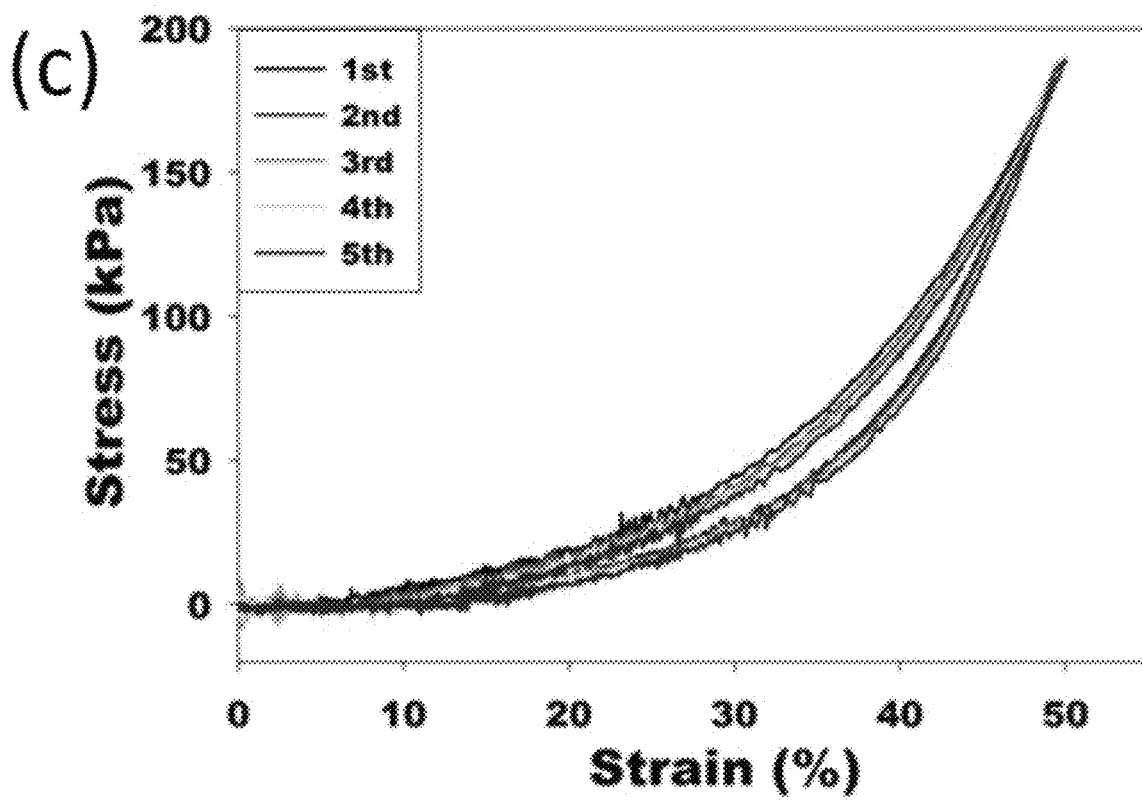
Figure 3D:
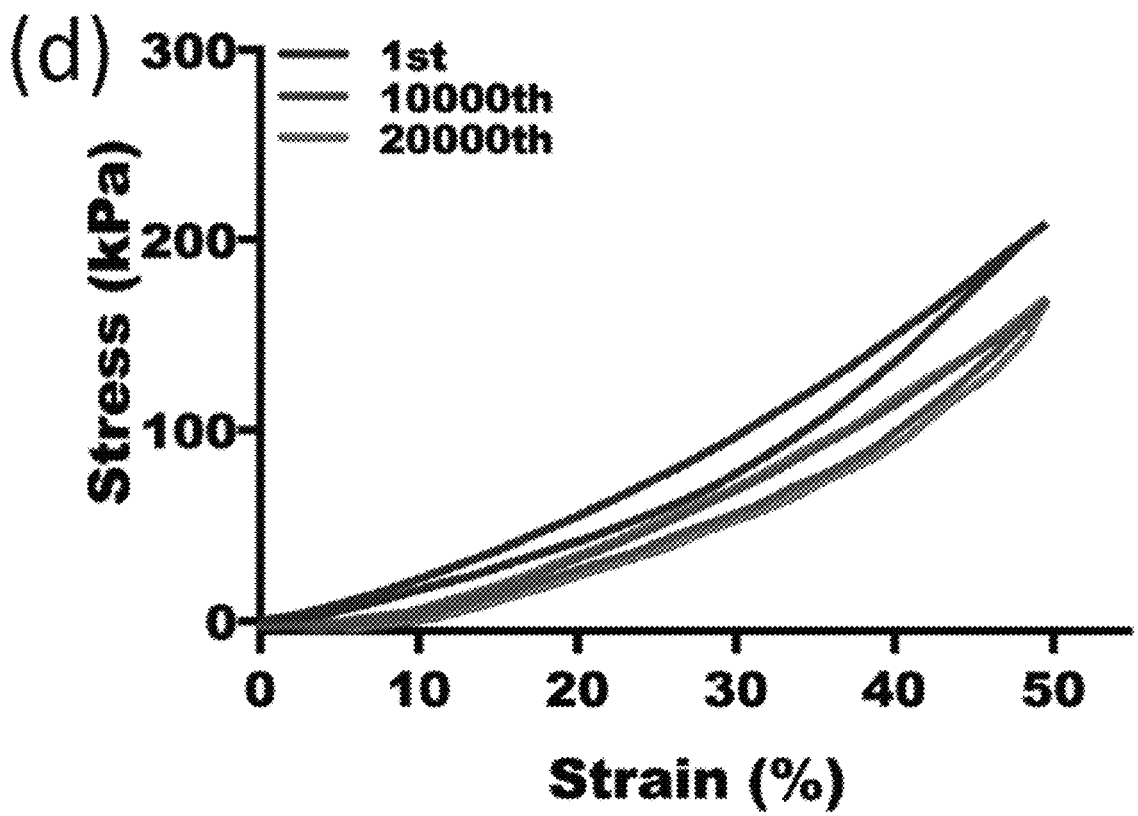
Figure 4A:
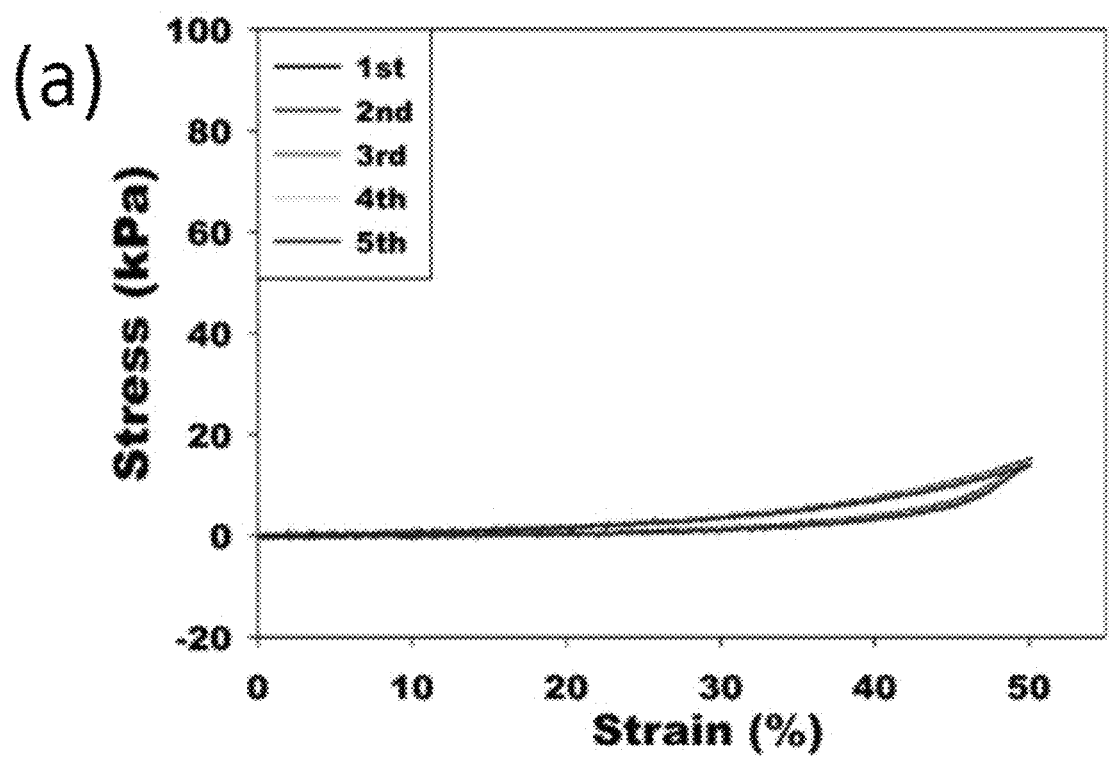
FIGS. 4(A-H) illustrate plots showing the elasticity of GelMA hydrogels. Stress-strain plots of photocrosslinked (A) GelMA10 and (B) GelMA15. Stress-strain plots of nanocomposite (C) GelMA105, (D) GelMA1010, (E) GelMA1015, (F) GelMA155, (G) GelMA1510 and (h) GelMA1515 hydrogels under the five cycles of deformation at 50% strain.
Figure 4B:
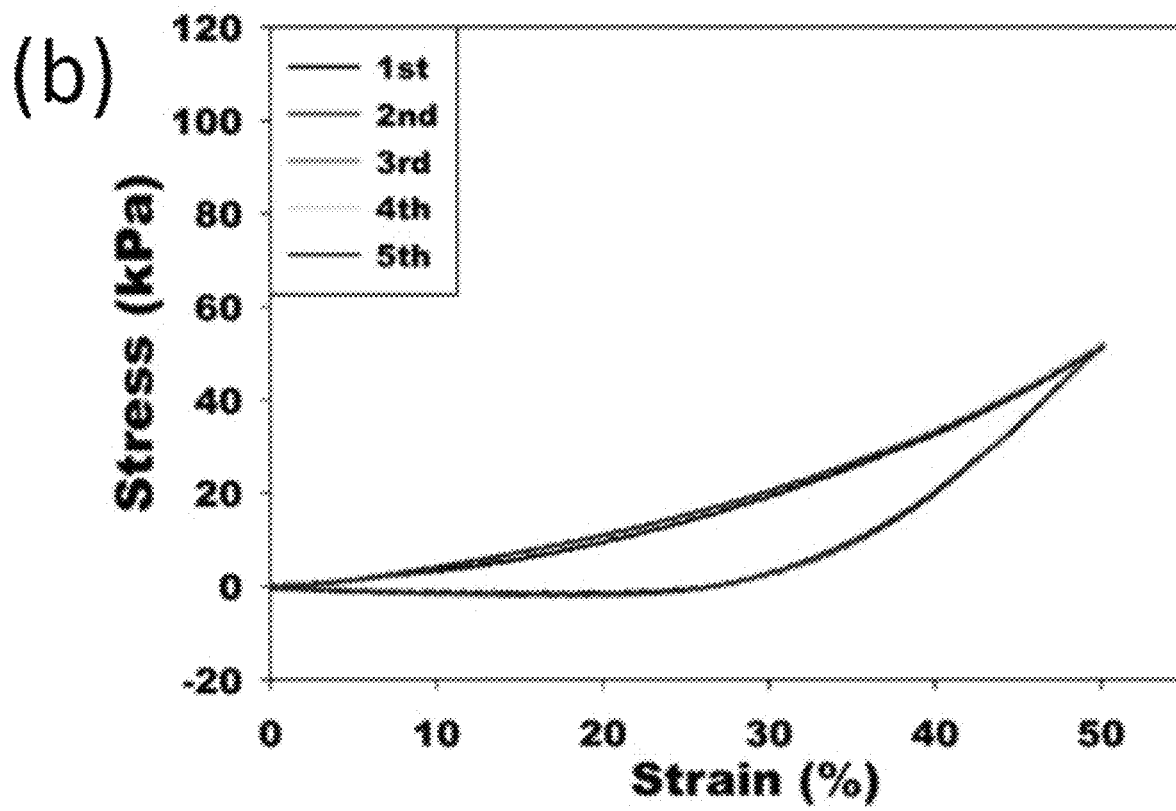
Figure 4C:
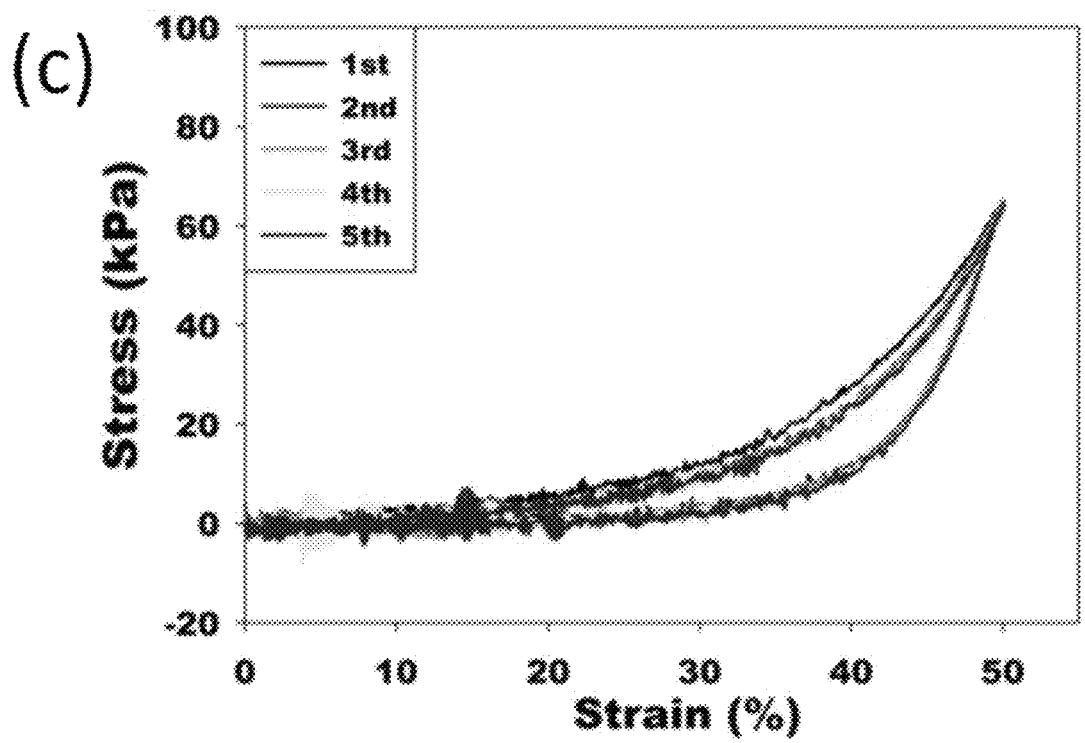
Figure 4D:
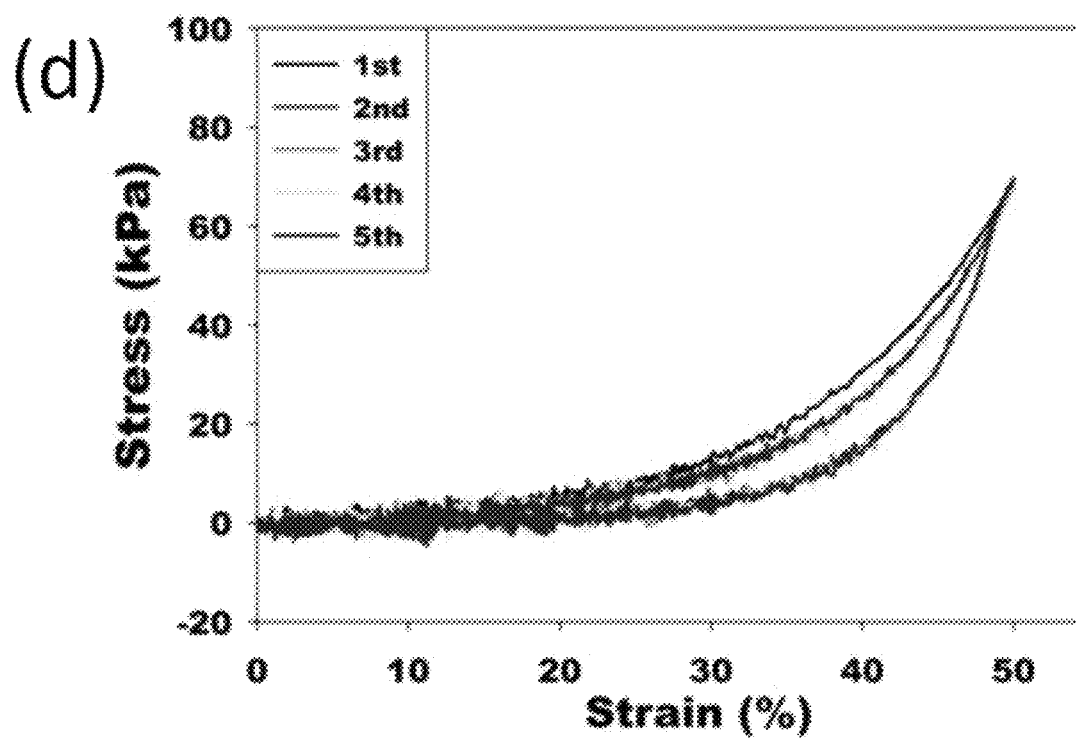
Figure 4E:
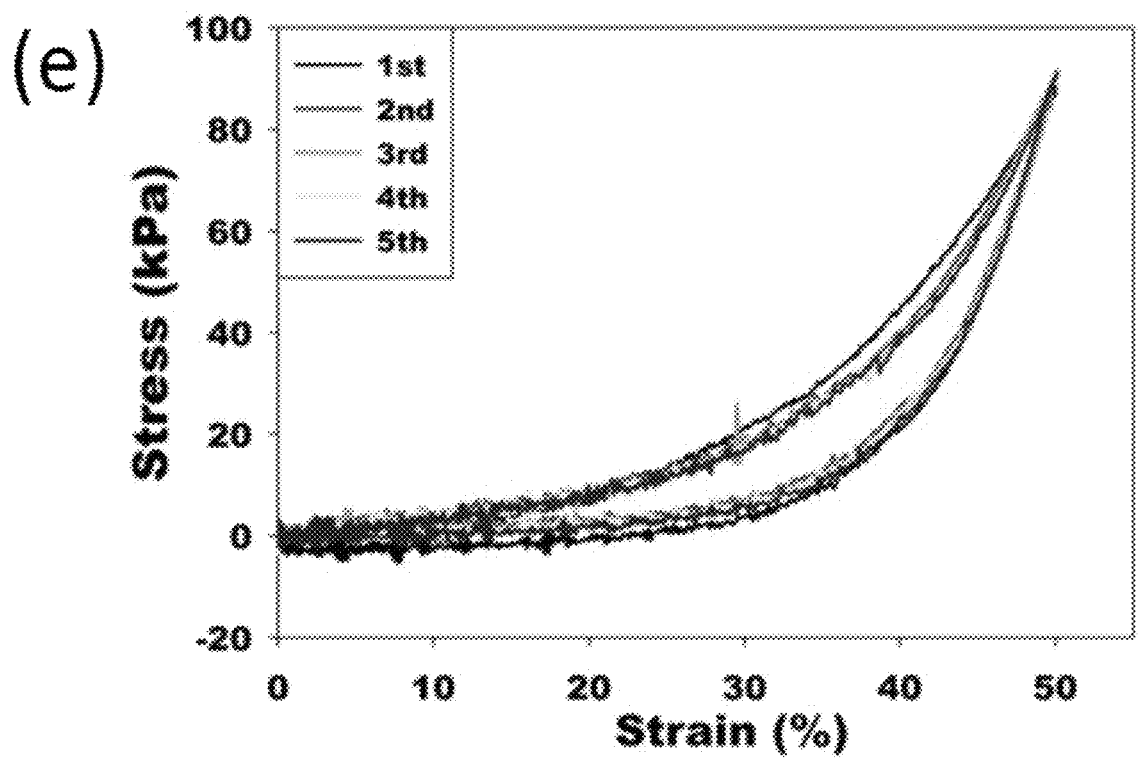
Figure 4F:
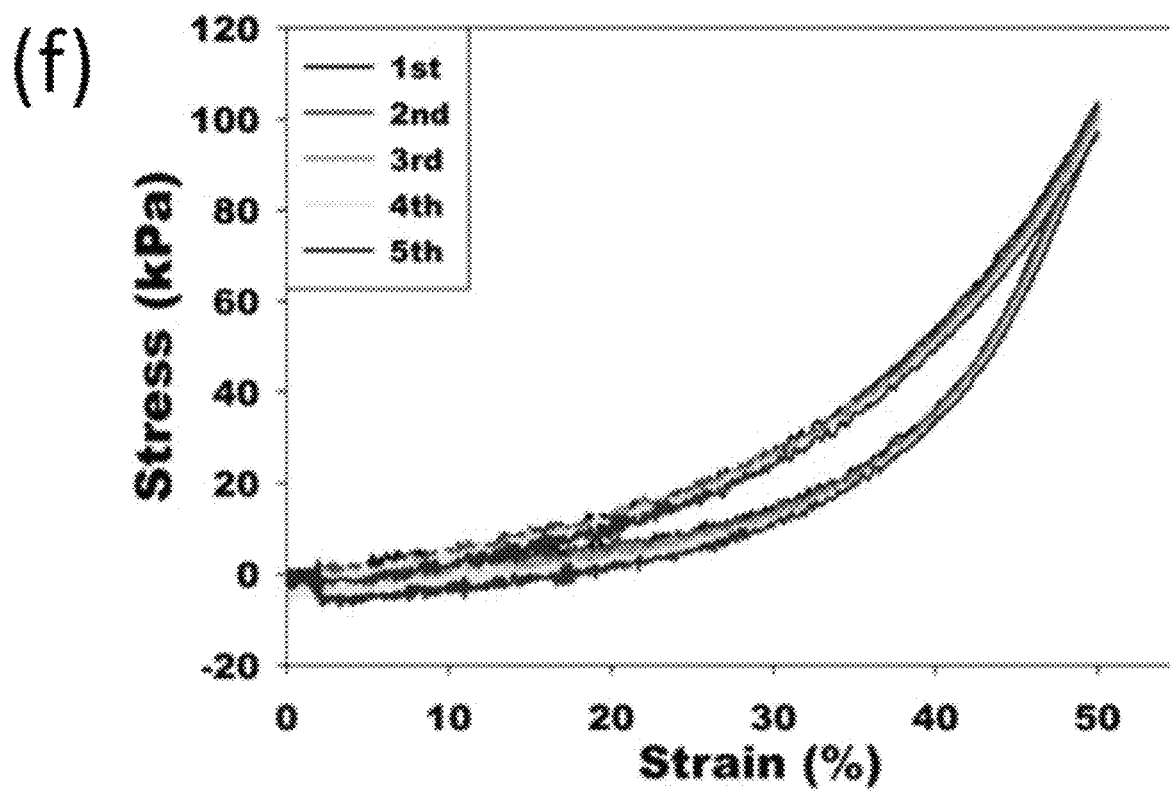
Figure 4G:
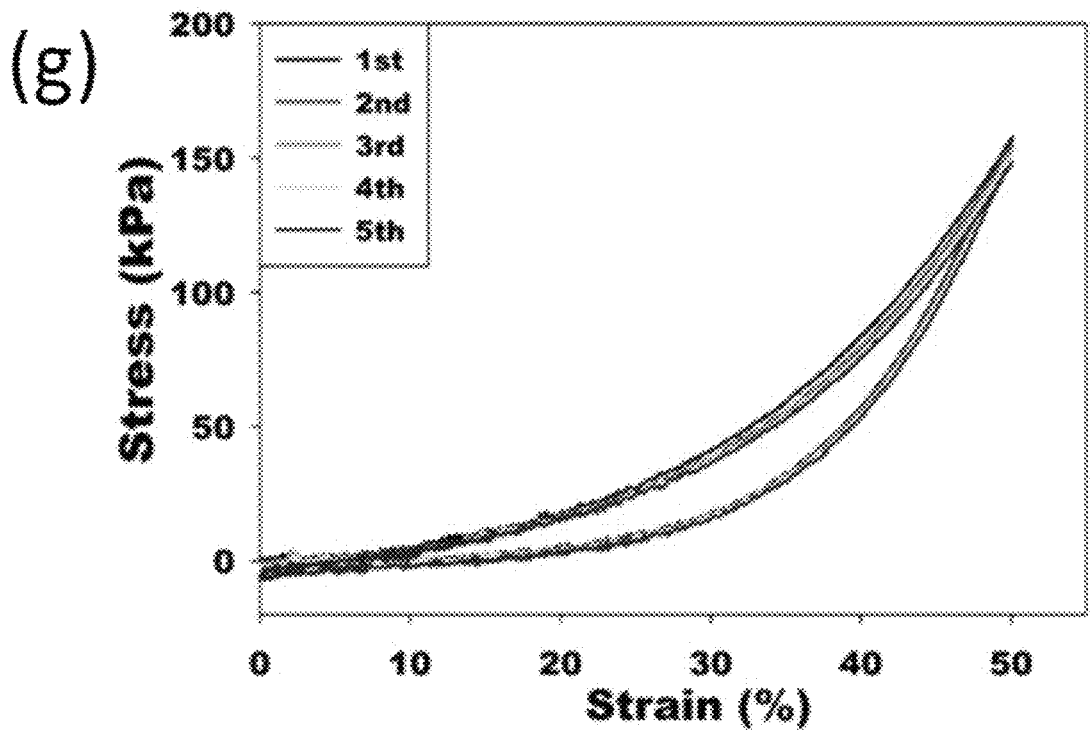
Figure 4H:
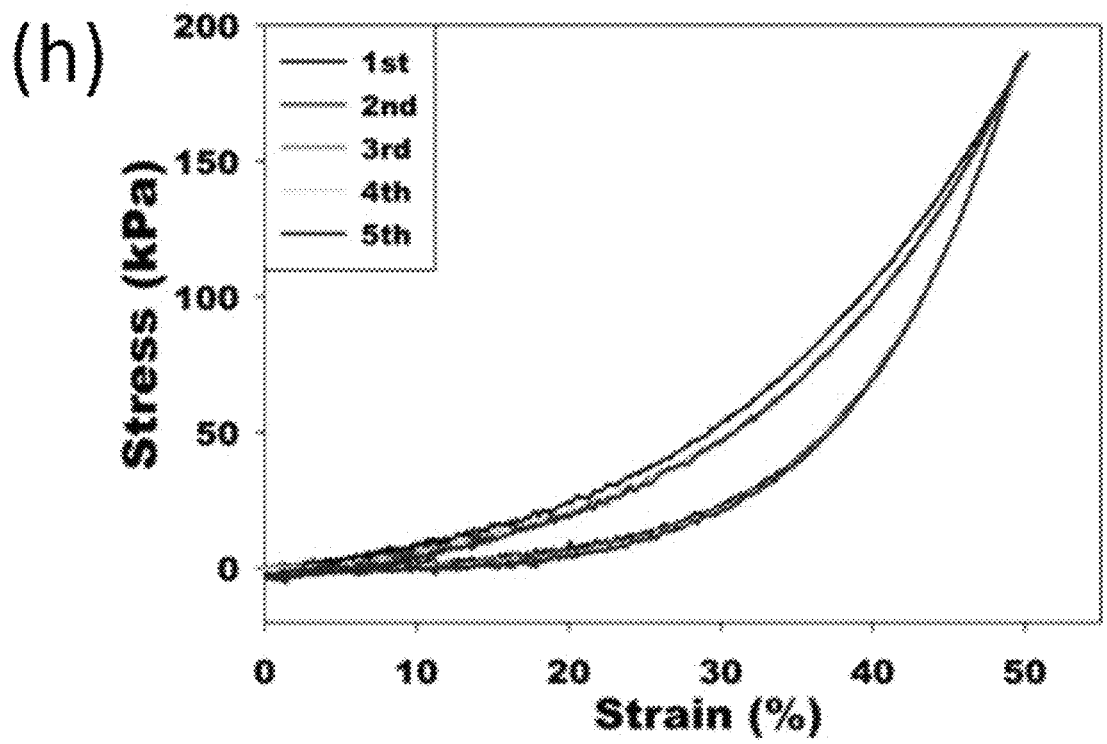
Figure 5A:
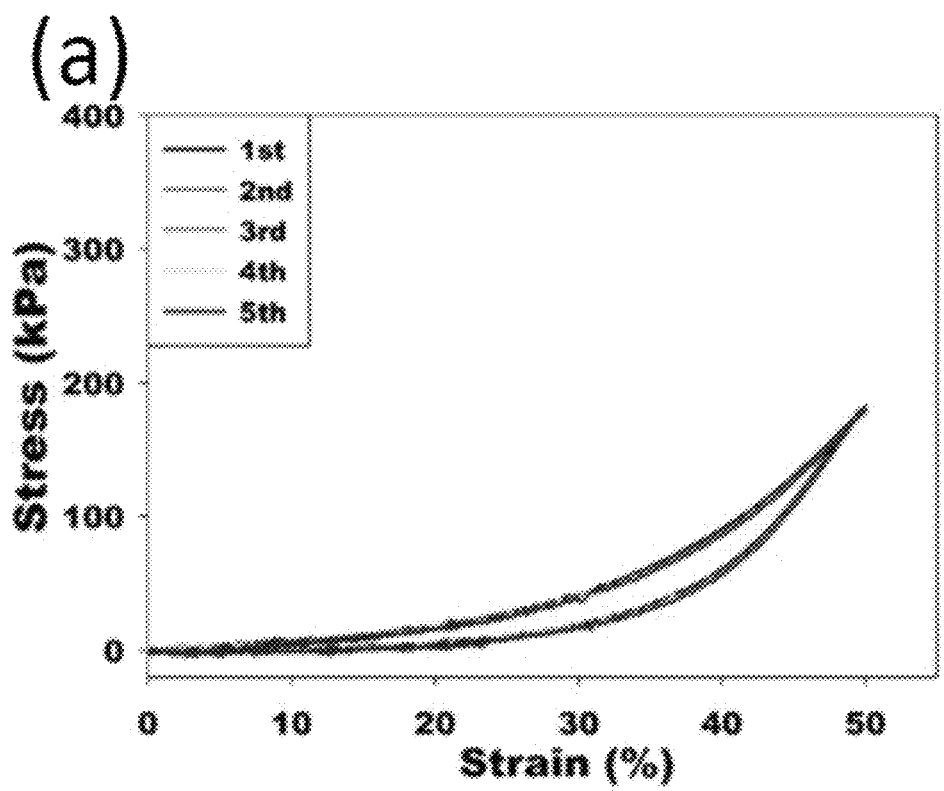
FIGS. 5(A-I) illustrate plots showing the elasticity of nanocomposite OMA/GelMA hybrid hydrogels. Stress-strain plots of photocrosslinked (A) OMA55GelMA55, (B) OMA55GelMA105, (C) OMA55GelMA155, (D) OMA105GelMA55, (E) OMA105GelMA105, (F) OMA105GelMA155, (G) OMA155GelMA55, (H) OMA155GelMA105 and (I) OMA155GelMA155 hydrogels under the five cycles of deformation at 50% strain.
Figure 5B:
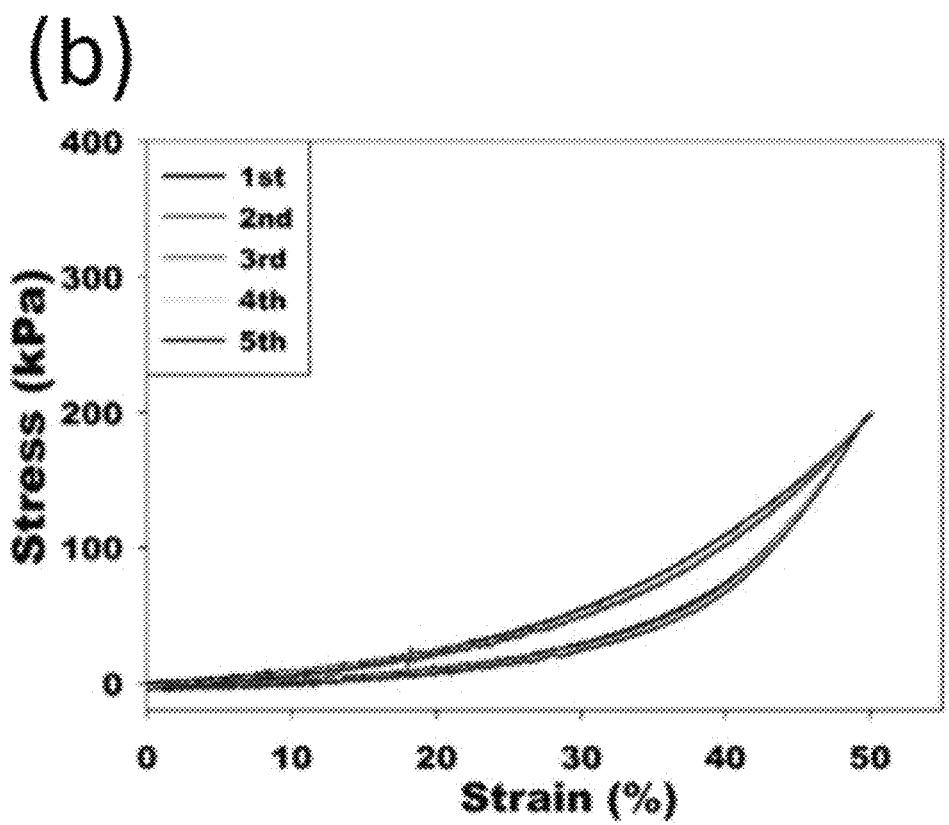
Figure 5C:
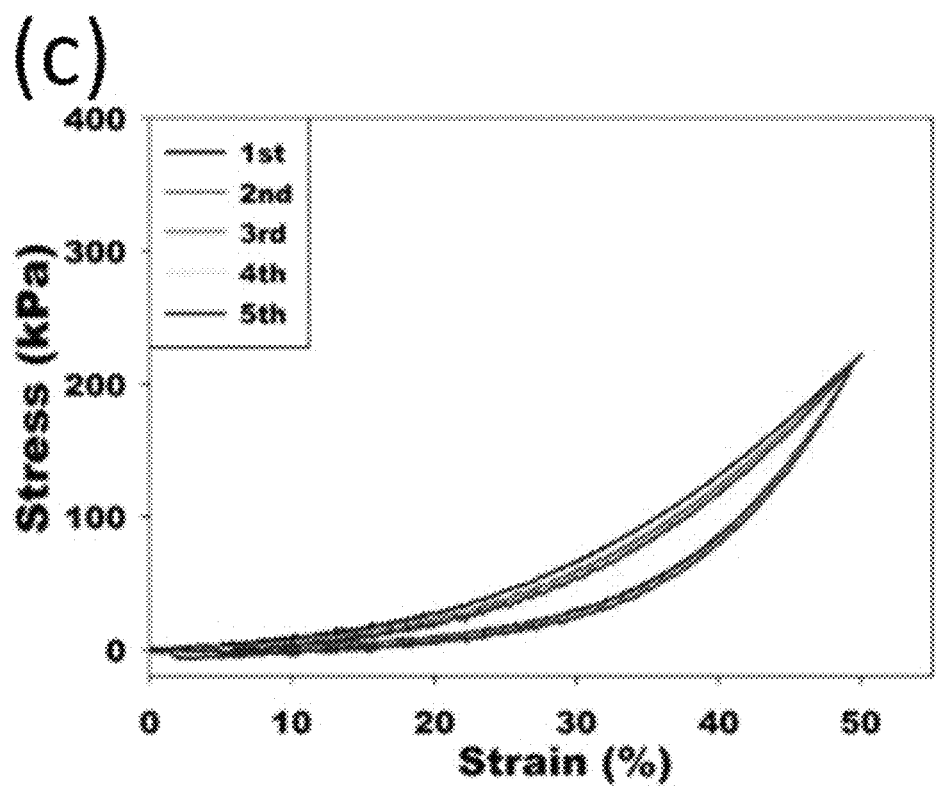
Figure 5D:
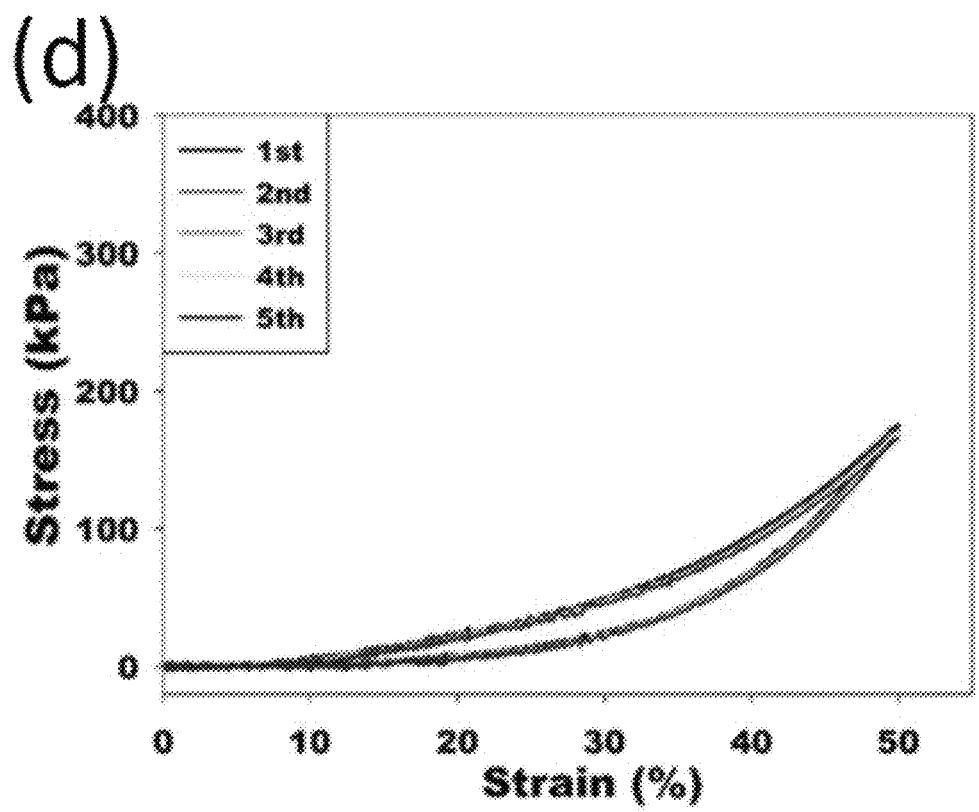
Figure 5E:
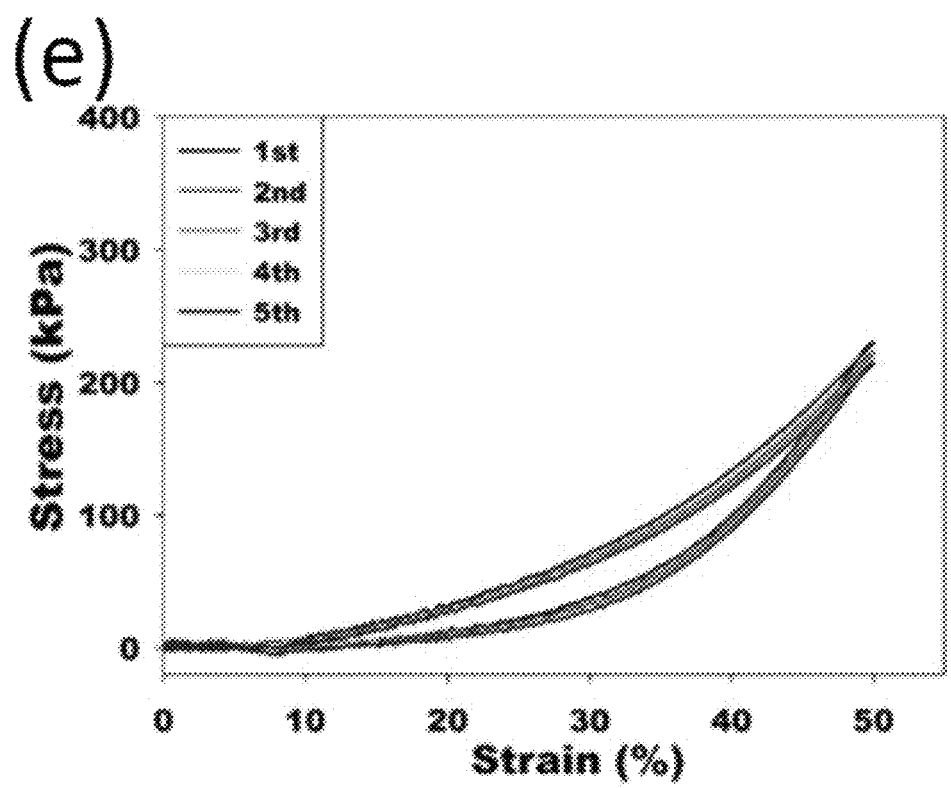
Figure 5F:
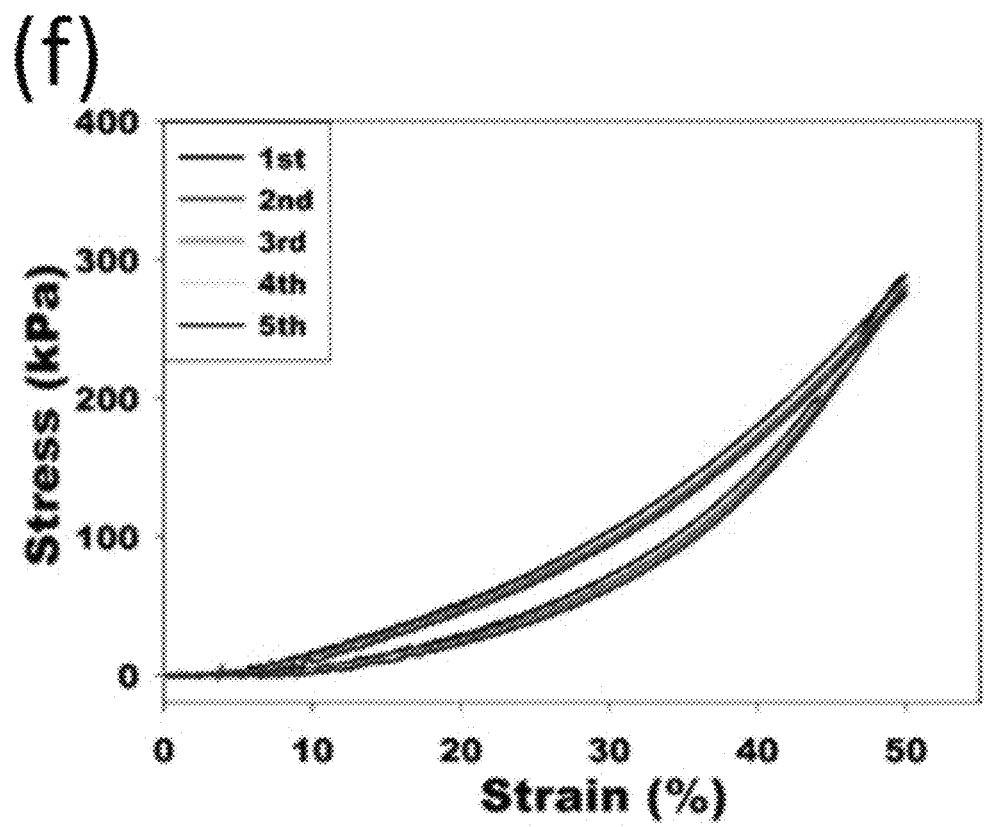
Figure 5G:
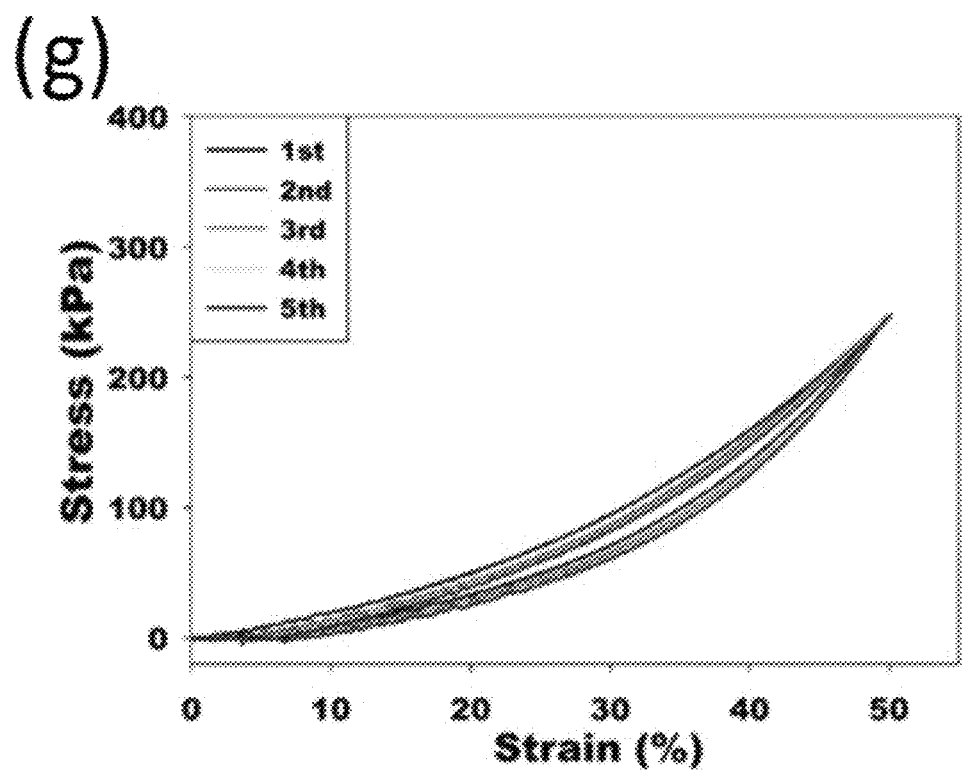
Figure 5H:
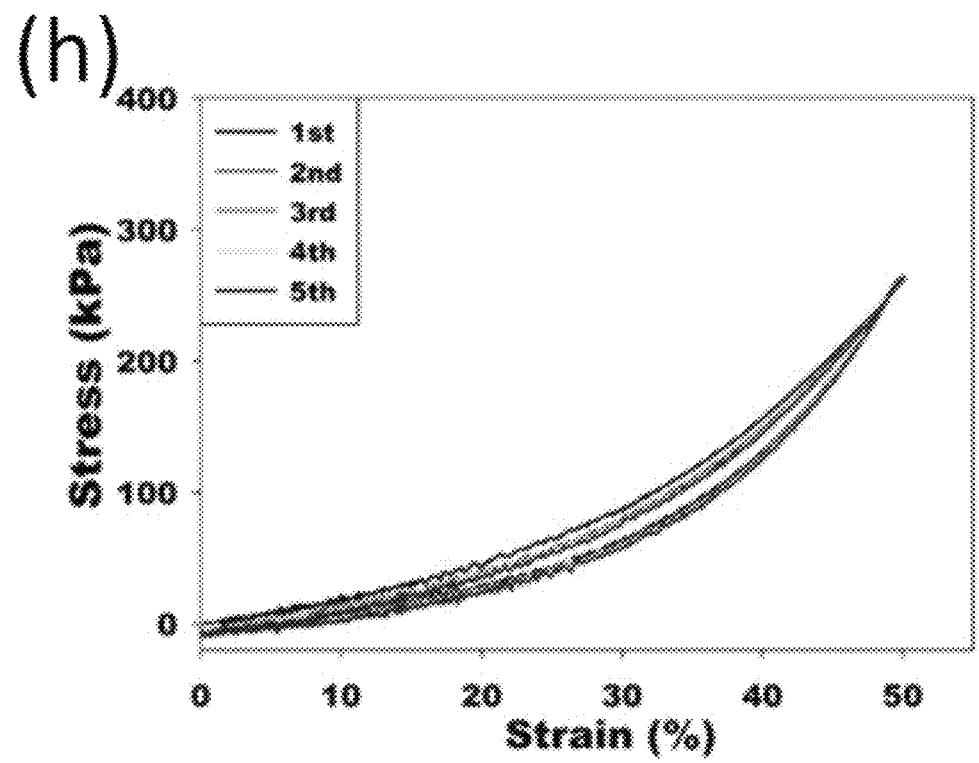
Figure 5I:
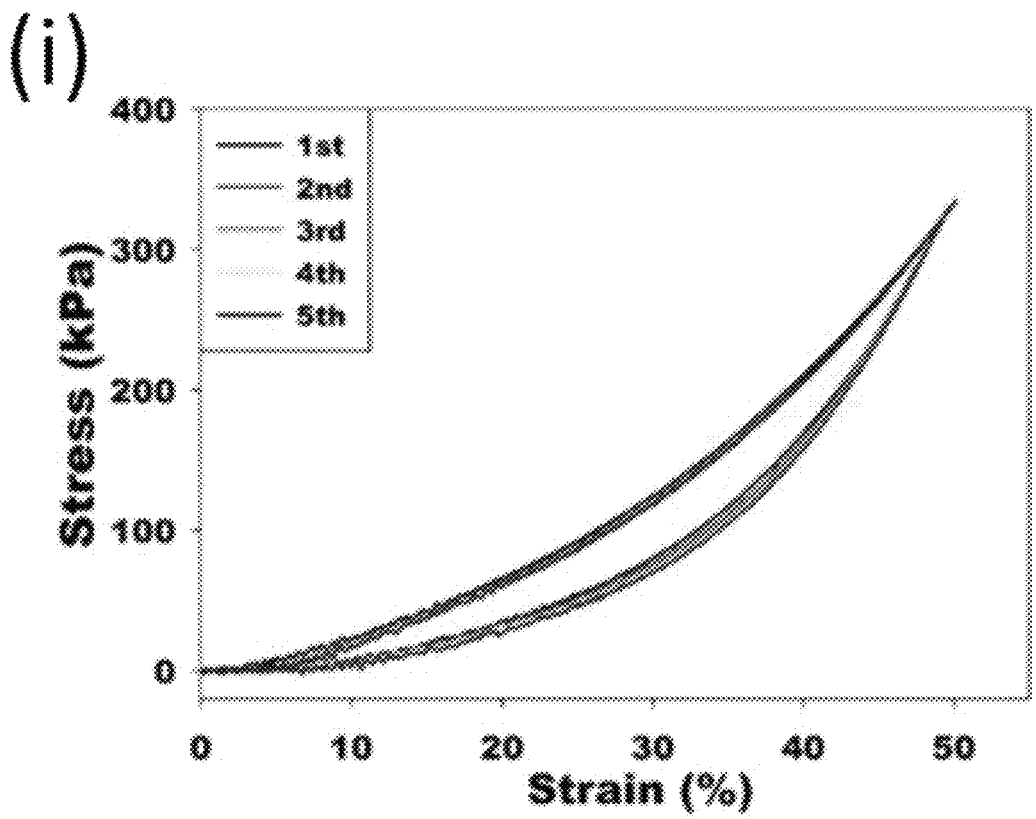

Although photocrosslinked OMA hydrogels have been extensively investigated as biomaterial scaffolds to encapsulate stem cells, these alginate hydrogels permanently deformed and broke under cyclic mechanical stimulation due to their low elasticity (FIG. 1). Since the nanocomposite hydrogels have been shown the high elasticity and toughness, we also utilized the nanocomposite hydrogels using OMAs by incorporation of nHA. The development of highly elastic tough nanocomposite hydrogels requires the interactions between nanoparticles and the macromer molecules. As shown in FIG. 2, methacrylate groups of OMA and/or GelMA can be photocrosslinked under UV light (FIG. 2B) while the carboxylic groups of OMA backbone can form reversible physical crosslinks by interaction with calcium ions of hydroxyapatite nanoparticles (FIG. 2C). Breaking (FIG. 2D) and healing (FIG. 2C) of this reversible physical crosslinking would improved the elasticity and toughness of the nanocomposite hybrid hydrogels.

While photocrosslinked OMA hydrogels exhibited the low elasticity (FIG. 1), the nanocomposite OMA hydrogels were tough and highly elastic (FIG. 3 and FIG. 11). When the elastic properties of hydrogels were evaluated by unconfined cyclic compression testing up to 50% strain, all nanocomposite OMA hydrogels fully recovered their original thickness immediately after each unloading. By varying the macromer and nHA concentration, we could control the mechanical properties of the nanocomposite OMA hydrogels without any loss of the elasticity (FIGS. 3A-C and FIG. 11). To further investigate the long-term resilience and fatigue properties of the nanocomposite OMA hydrogels, unconfined cyclic compression tests at 50% strain for up to 20000 cycles were performed with the OMA55 nanocomposite hydrogel. Similar to the photocrosslinked OMA hydrogels, the nanocomposite OMA hydrogel permanently deformed after 10000 and 20000 cycles of loading and unloading (FIG. 3D). These results indicate that nanocomposite OMA hydrogels have limited long-term resilience and fatigue properties. To overcome this limitation, GelMA was chosen because of its high elasticity under long-term cyclic mechanical loading as well as high cell binding affinity. As shown in FIG. 4, photocrosslinked GelMA hydrogels (FIGS. 4A and B) and nanocomposite GelMA hydrogels (FIG. 4C-H) exhibited high elasticity. They all fully recovered their original thickness immediately after each unloading. Additionally, mechanical properties of the nanocomposite GelMA hydrogels were enhanced compared to the photocrosslinked GelMA hydrogels.

Figure 6A:
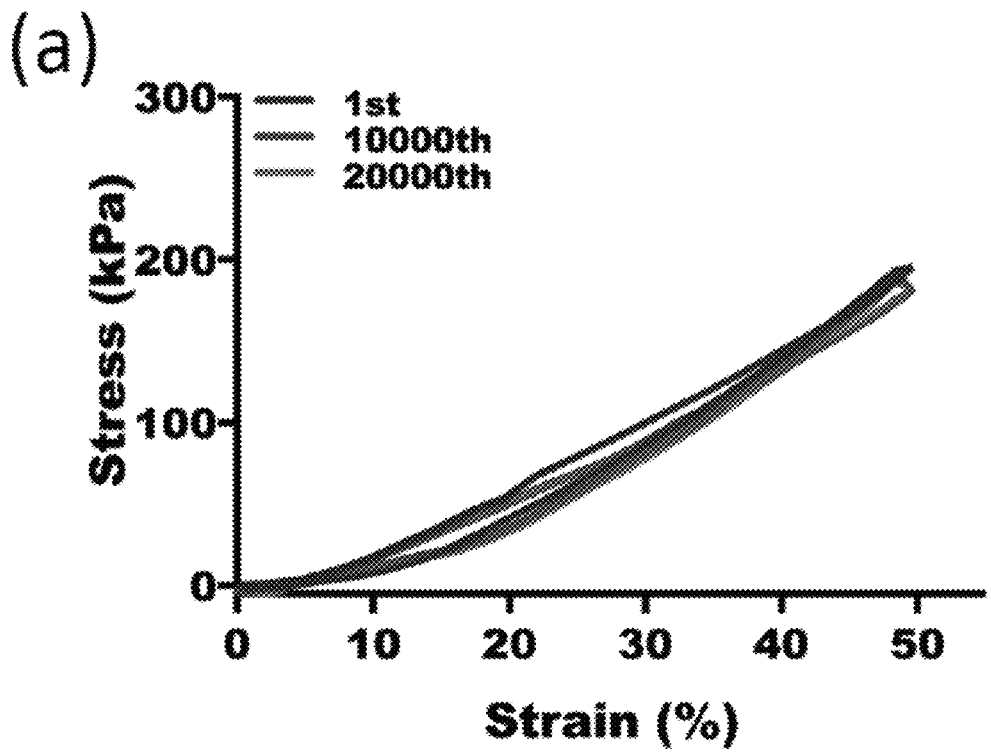
FIGS. 6(A-C) illustrate plots showing the fatigue properties of nanocomposite hybrid hydrogels. Stress-strain plots of nanocomposite (A) OMA55GelMA55, (B) OMA55GelMA105 and (C) OMA55GelMA155 hybrid hydrogels during the 1st, 10000th and 20000th loading and unloading cycles to a strain magnitude of 50%.
Figure 6B:
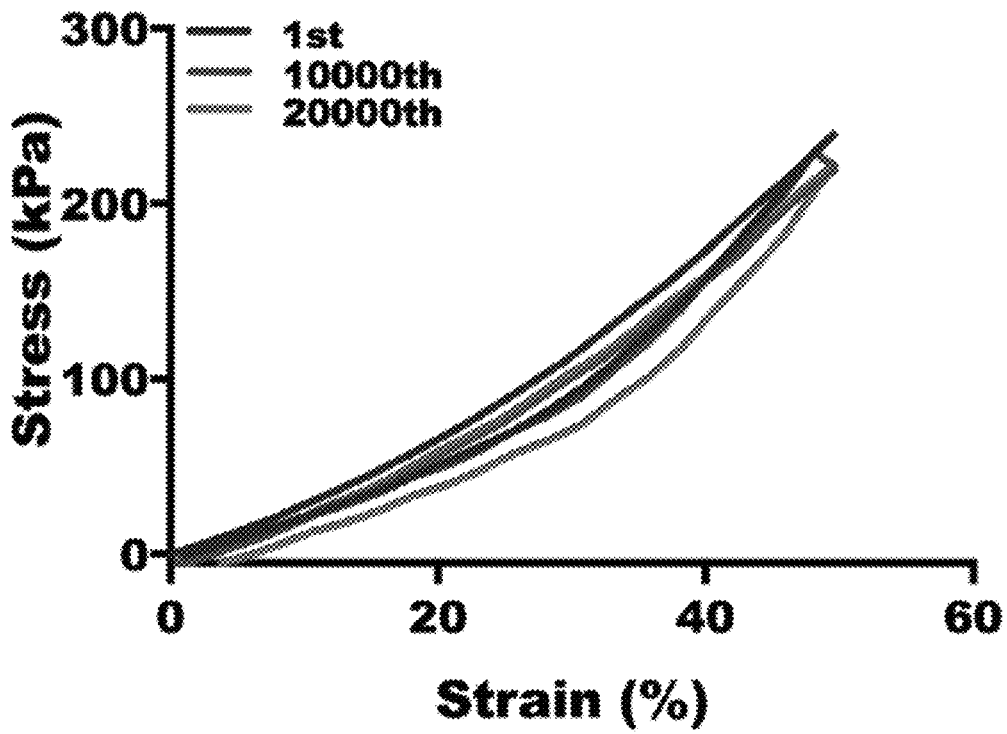
Figure 6C:
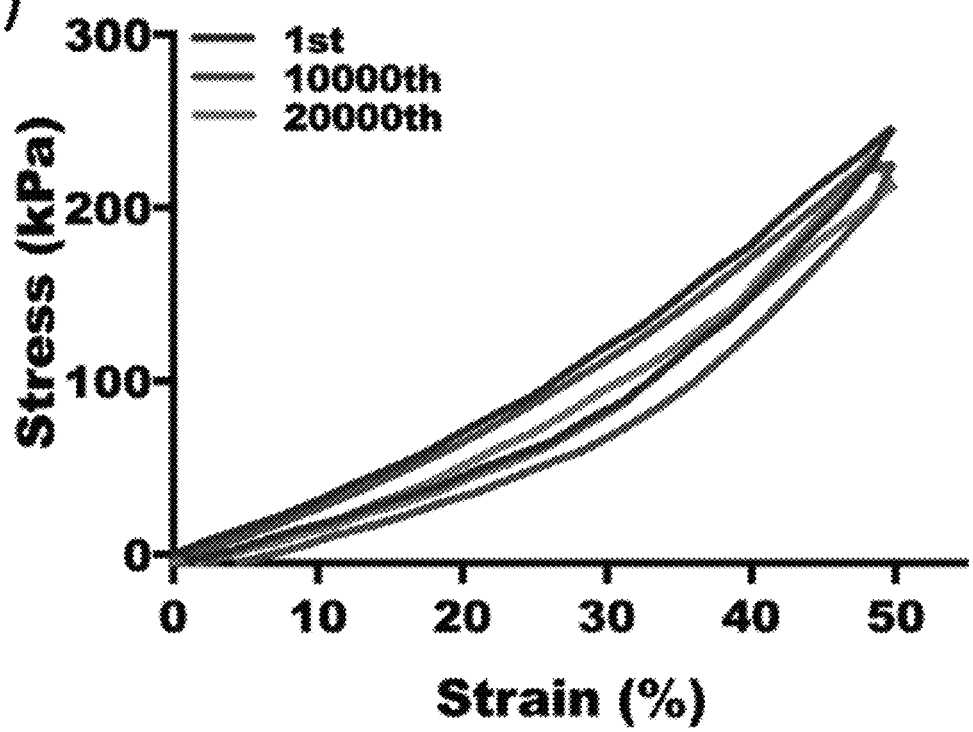

Since the copolymerization of two macromers can affect the elasticity of nanocomposite hydrogels, we also evaluated the elasticity of the nanocomposite OMA/GelMA hybrid hydrogels using unconfined cyclic compression tests (5 cycles). Similar to their parent nanocomposite hydrogels, all nanocomposite OMA/GelMA hybrid hydrogels exhibited the high elasticity (FIG. 5, FIG. 11 and FIG. 12). They fully recovered their original shape immediately after each unloading cycle. The mechanical properties of the nanocomposite OMA/GelMA hybrid hydrogels were also controllable by changing the concentrations of macromers and nHA. To further investigate the long-term fatigue and resilience properties of the nanocomposite OMA/GelMA hybrid hydrogels, unconfined cyclic compression tests at 50% strain for up to 20000 cycles were performed. Similar to the photocrosslinked OMA hydrogels, the nanocomposite OMA hydrogel permanently deformed after 10000 and 20000 cycles of loading and unloading. Unlike the nanocomposite OMA hydrogels, the nanocomposite OMA/GelMA hybrid hydrogels exhibited extraordinarily high resistance to fatigue. All these nanocomposite hybrid hydrogels fully recovered their original thickness even after 10000 and 20000 cycles of loading and unloading (FIG. 6). These results indicate that these nanocomposite hybrid hydrogels have great potential as biomaterials for biomedical applications that require full recovery from large strains and/or long-term mechanical stimulation.

Figure 7A:
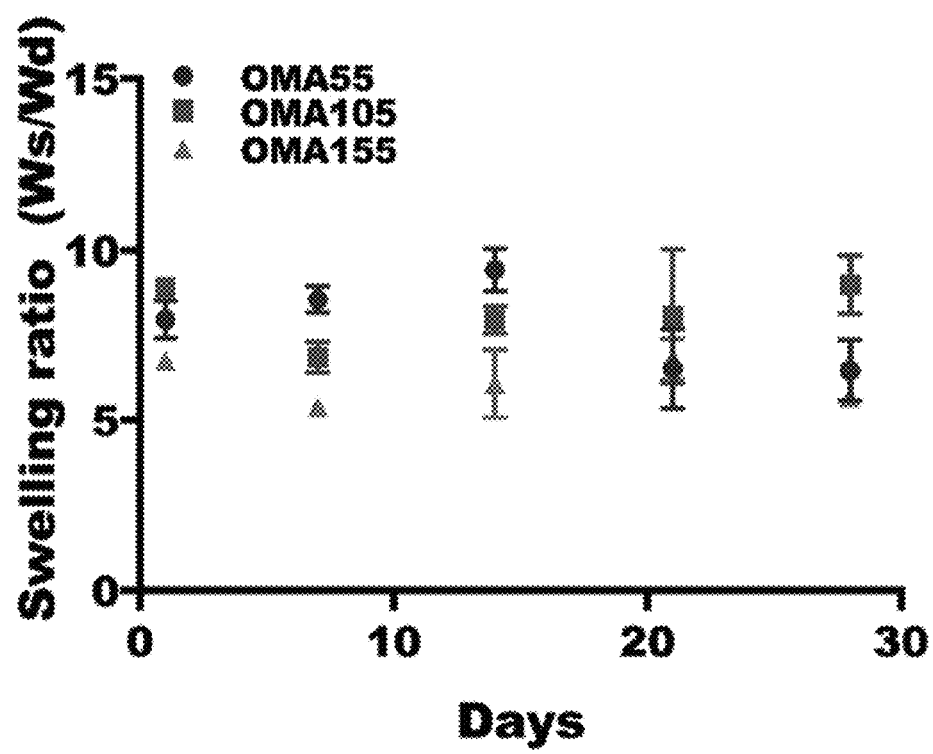
FIGS. 7(A-D) illustrate plots showing hydrogel physical property changes over time. Swelling ratio changes of (A) nanocomposite OMA hydrogels and (B) nanocomposite GelMA hydrogels. Degradation of (C) nanocomposite OMA hydrogels and (D) nanocomposite GelMA hydrogels.
Figure 7B:
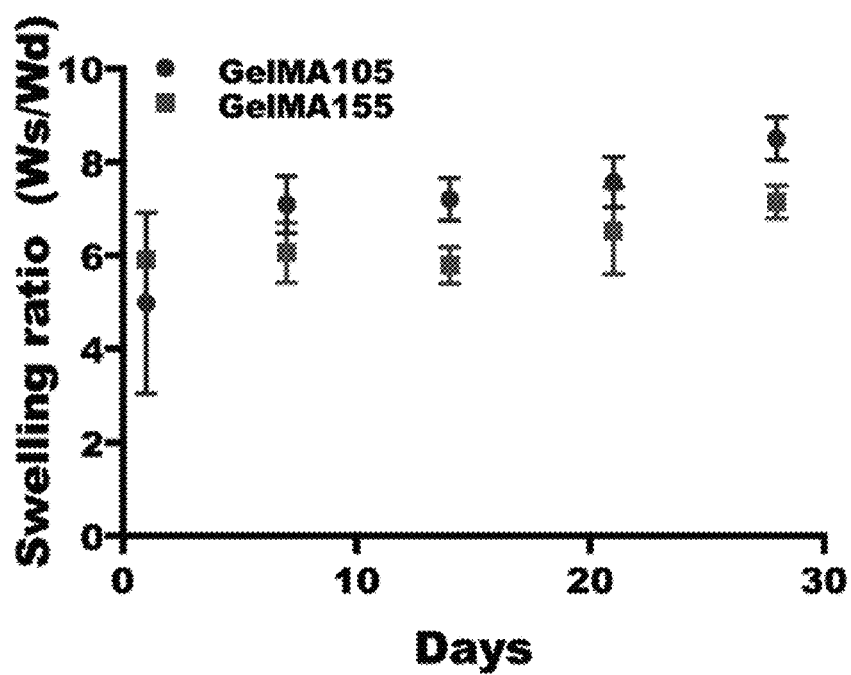
Figure 7C:
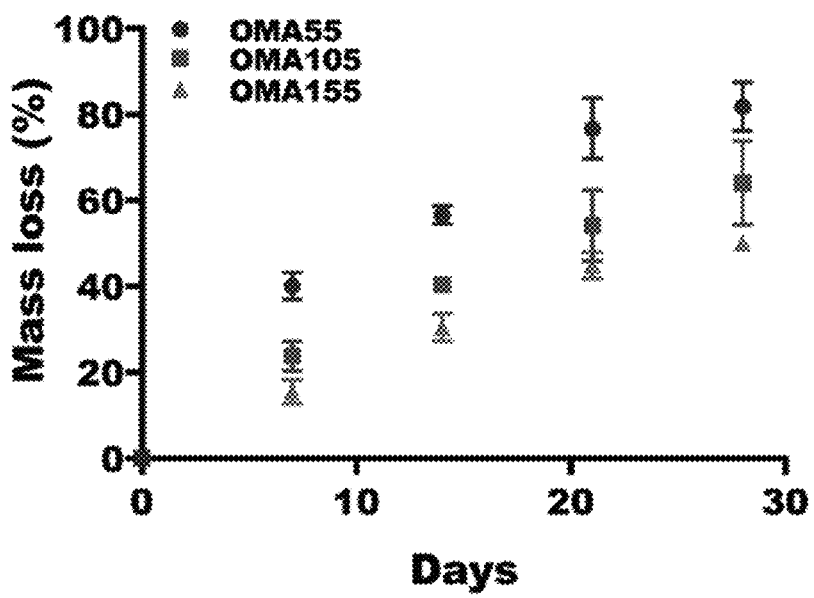
Figure 7D:
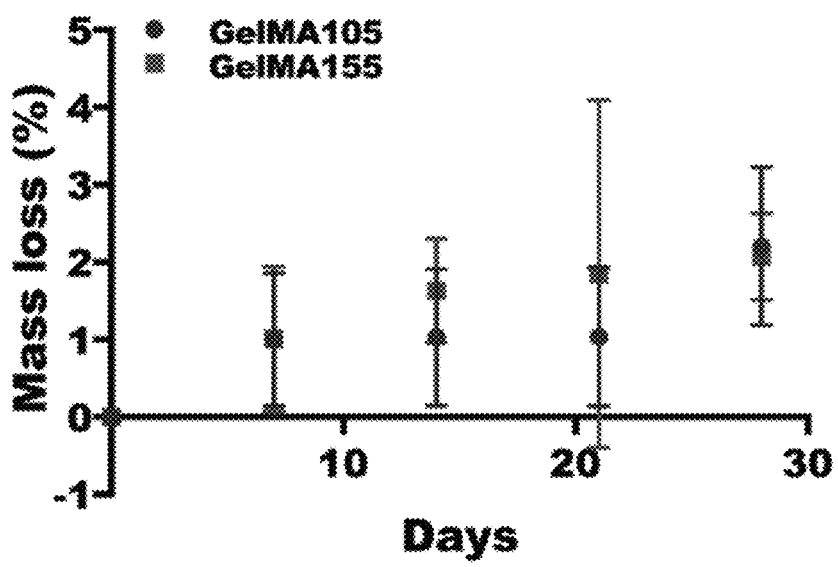

Since swelling ratio changes and degradation of hydrogels can alter their elasticity over time, the effect of oxidation level on swelling ratio changes and degradation profiles of nanocomposite hydrogels DMEM was investigated for 28 days. There were no significant changes in swelling ratio of three different nanocomposite OMA hydrogels for 28 days (FIG. 7A). Similar to the nanocomposite OMA hydrogels, there were no significant swelling ratio changes of nanocomposite GelMA hydrogel after 28 day of incubation (FIG. 7B). The mass loss (%) of nanocomposite hydrogels over time was determined as a measure of degradation. Compared to the nanocomposite OMA155 hybrid hydrogels, nanocomposite OMA55 and OMA105 hydrogels exhibited faster degradation (FIG. 7C). Due to the lower OMA concentration in the nanocomposite OMA55 hydrogels, the degradation rate of nanocomposite OMA55 hydrogels was faster than that of the nanocomposite OMA105 hydrogels. However, both of the nanocomposite GelMA55 and GelMA55 hydrogels exhibited much slower degradation rate compared to the nanocomposite OMA hydrogels (FIG. 7D).

Figure 8A:
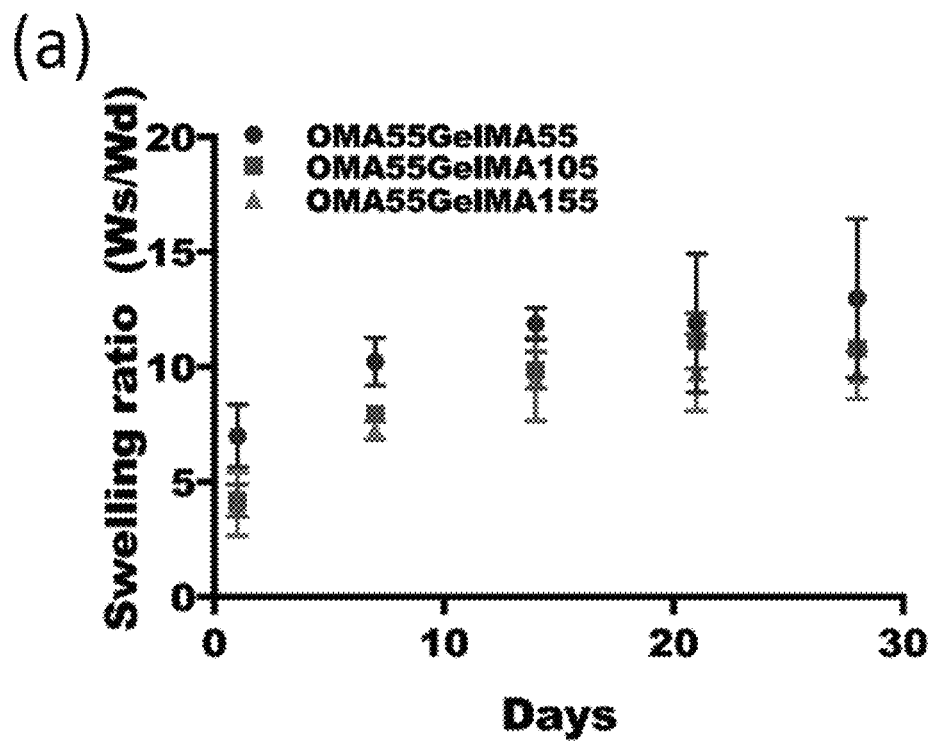
FIGS. 8(A-E) illustrate plots showing hydrogel physical property changes over time. Swelling ratio changes of nanocomposite (A) OMA55 and (B) OMA105 hybrid hydrogels made with various GelMA concentration. Degradation of nanocomposite (C) OMA55 and (D) OMA105 hybrid hydrogels made with various GelMA concentration. (e) Modulus changes of nanocomposite OMA55 hybrid hydrogels made with various GelMA concentration.
Figure 8B:
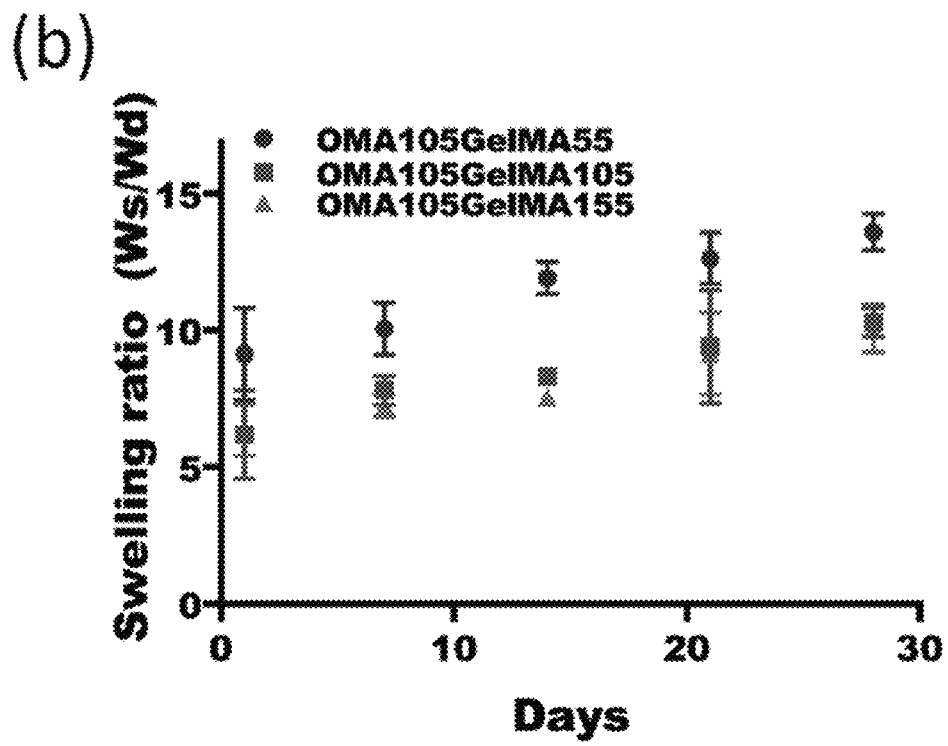
Figure 8C:
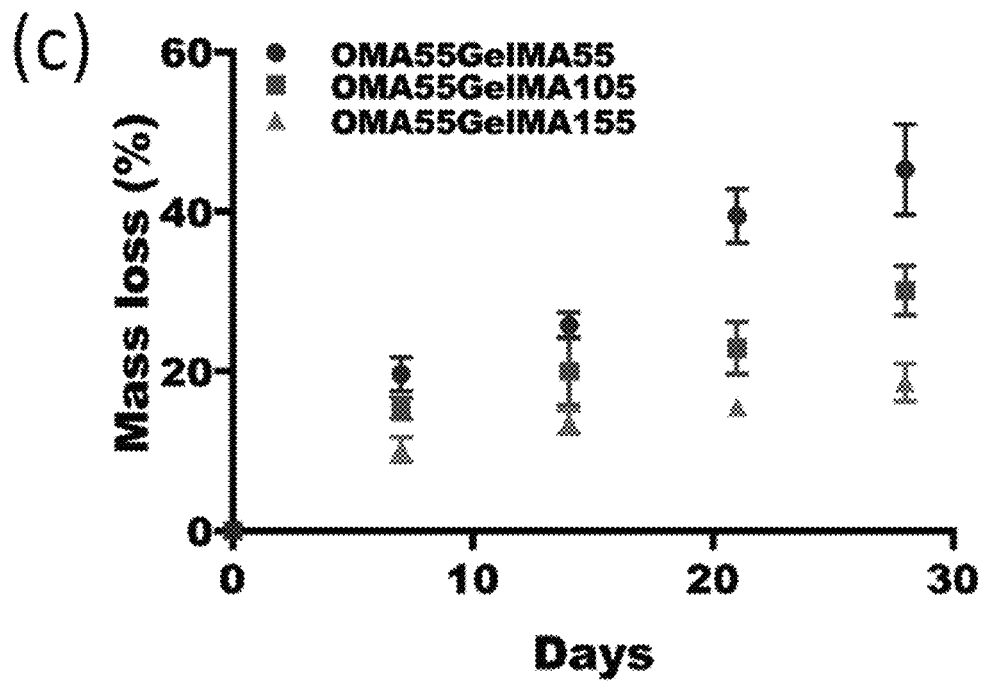
Figure 8D:
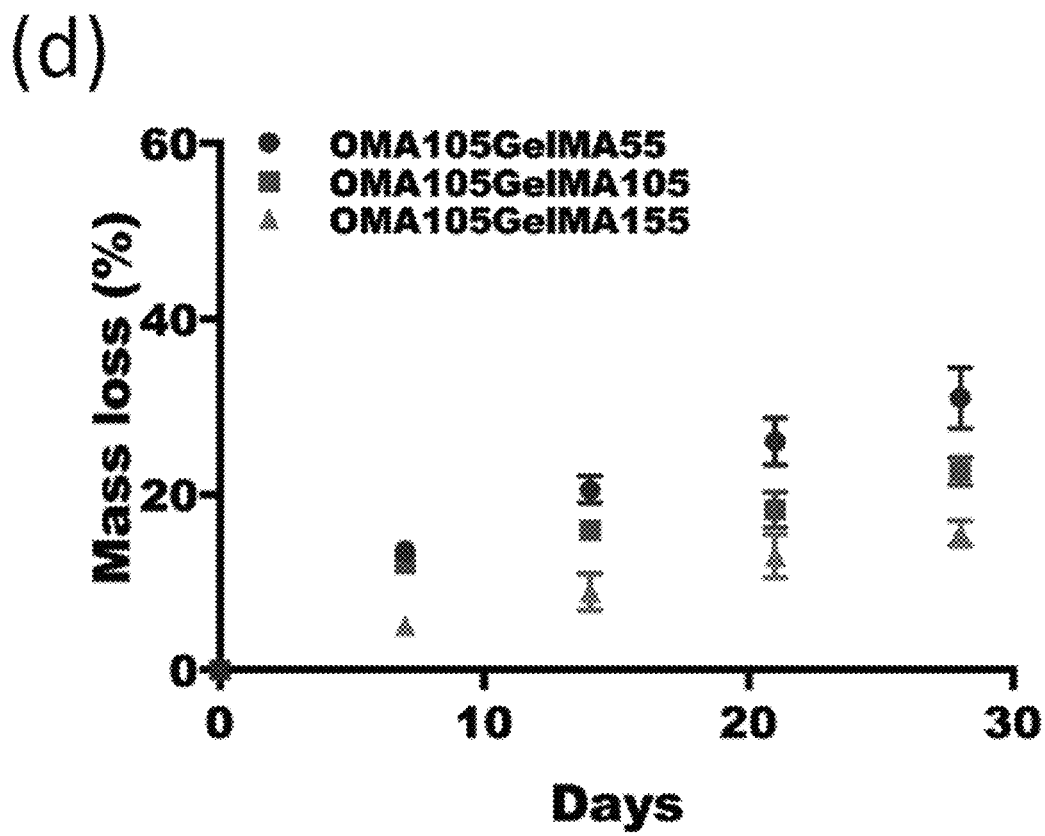
Figure 8E:
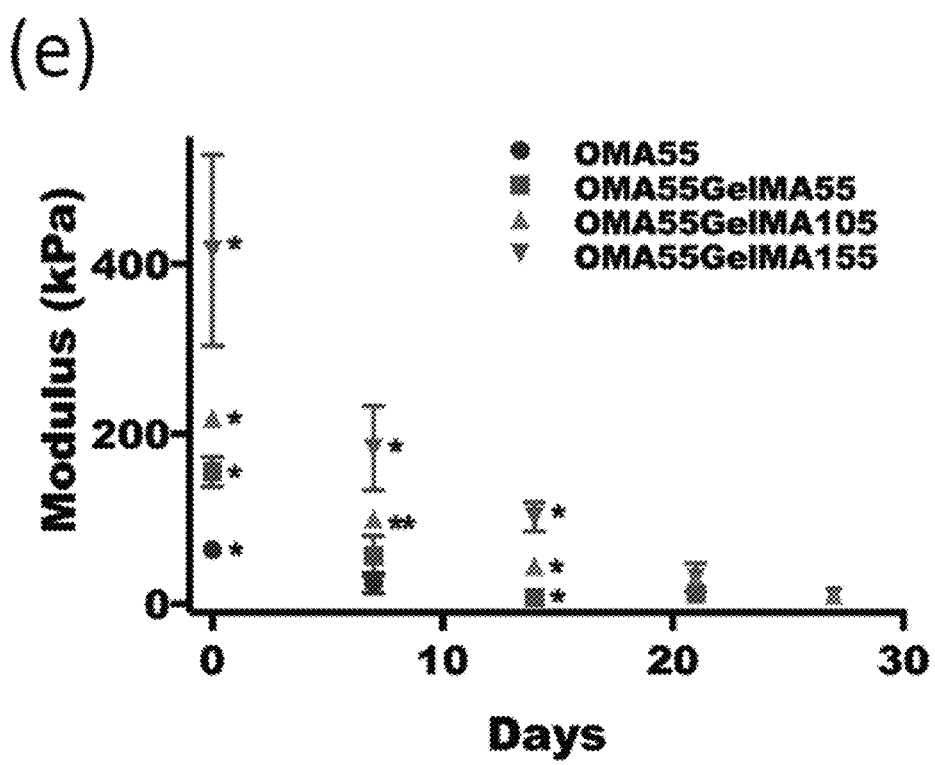

The swelling ratio change and degradation of nanocomposite OMA/GelMA hybrid hydrogels were also measure to evaluate the effect of copolymerization of OMA and GelMA. The swelling ratios of the nanocomposite OMA55 with GelMA hybrid hydrogels were slightly increase up to 28 days and there was no significant difference among three nanocomposite hybrid hydrogels (FIG. 8A). A similar trend of swelling was observed in the nanocomposite OMA105 with GelMA hybrid hydrogels (FIG. 8B). However, the nanocomposite OMA105GelMA55 hybrid hydrogels exhibited higher swelling ratio compared to the nanocomposite OMA105GelMA105 and OMA105 and GelMA115 hybrid hydrogels (FIG. 8B). Compared to the nanocomposite OMA105 with GelMA hybrid hydrogels (FIG. 8D), the nanocomposite OMA55 with GelMA hybrid hydrogels exhibited faster degradation (FIG. 8C). As the concentration of GelMA increased in the nanocomposite hybrid hydrogels, the degradation rate of the nanocomposite hybrid hydrogels was decreased. Since hydrogel degradation can affect the mechanical properties of materials, unconfined compression tests were performed over time to evaluate the modulus changes of the nanocomposite hydrogels. The elastic modulus of the nanocomposite hydrogels decreased during the course of degradation (FIG. 8E). The moduli of the nanocomposite hybrid hydrogels were significantly higher than that of the nanocomposite OMA hydrogels due to the slower degradation of the nanocomposite hybrid hydrogels. As the GelMA concentration increased in the nanocomposite hybrid hydrogel, the moduli of the nanocomposite hybrid hydrogels were increased.

Figure 9A:
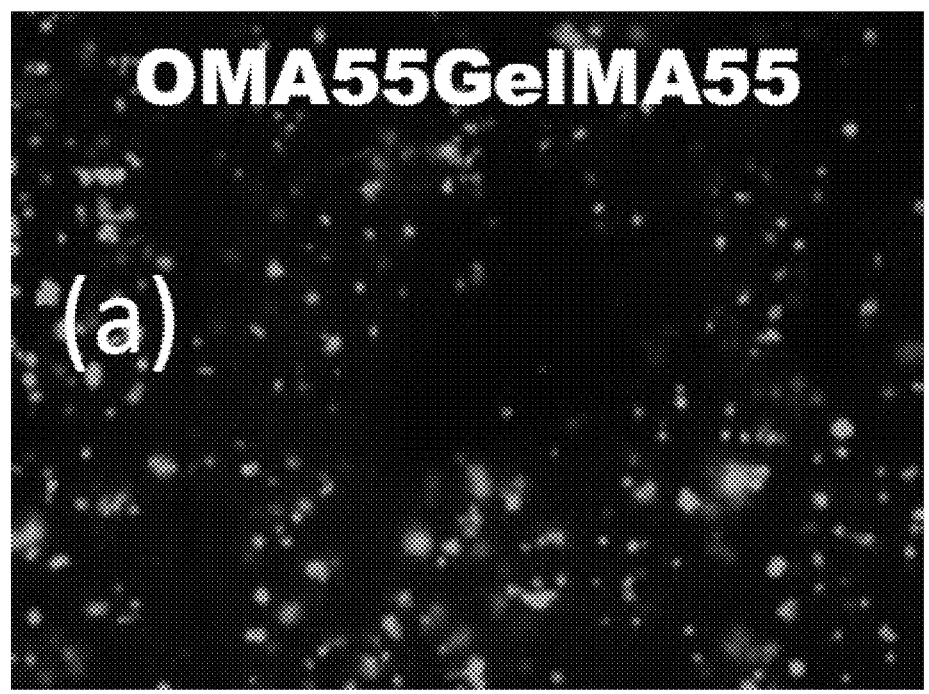
FIGS. 9(A-D) illustrate plots showing cytocompatibility of nanocomposite OMA/GelMA hybrid hydrogels and cell behavior. Live/Dead staining of encapsulated hMSCs in nanocomposite (A) OMA55GelMA55, (B) OMA55GelMA105 and (C) OMA55GelMA155 hybrid hydrogels. (D) Quantification of DNA content of nanocomposite OMA/GelMA hybrid hydrogels/hMSC constructs over time.
Figure 9B:
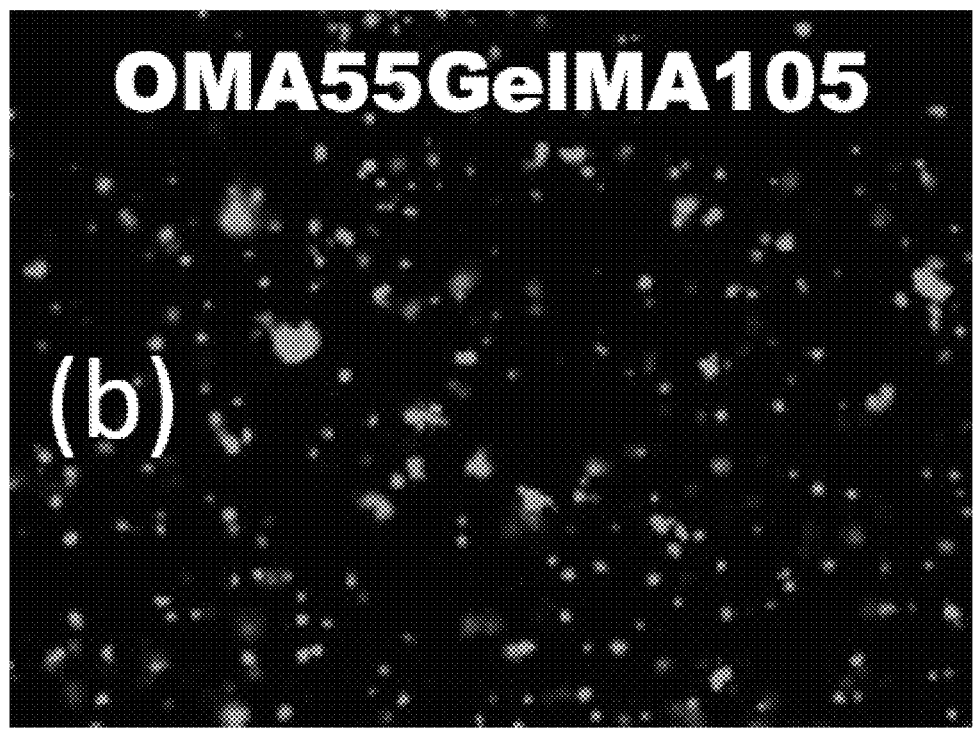
Figure 9C:
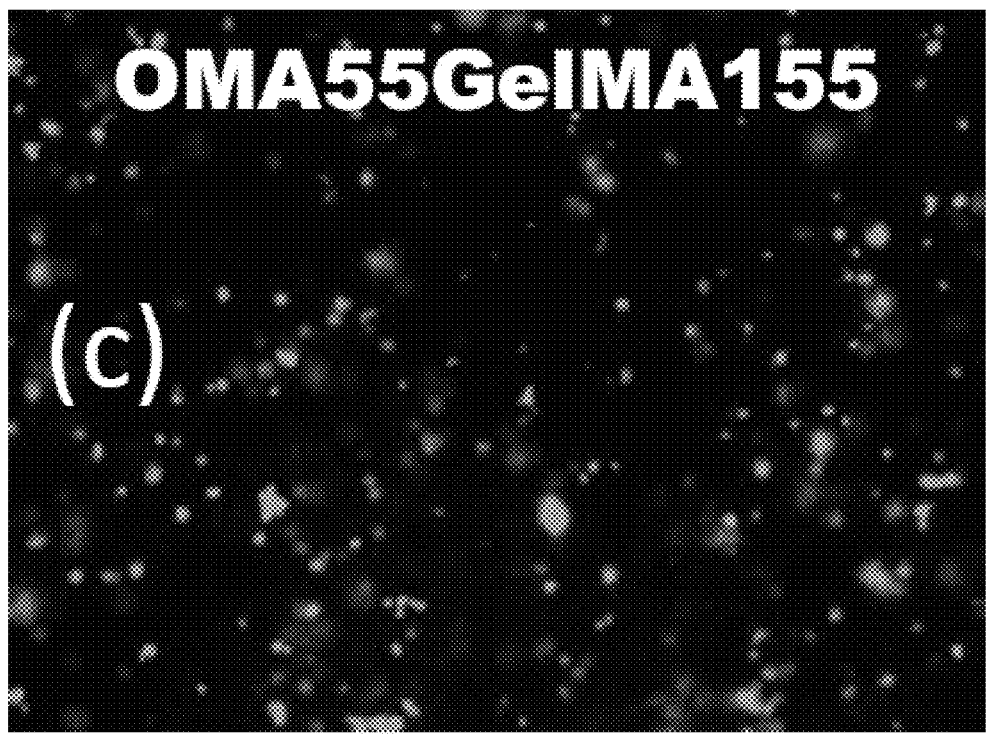
Figure 9D:
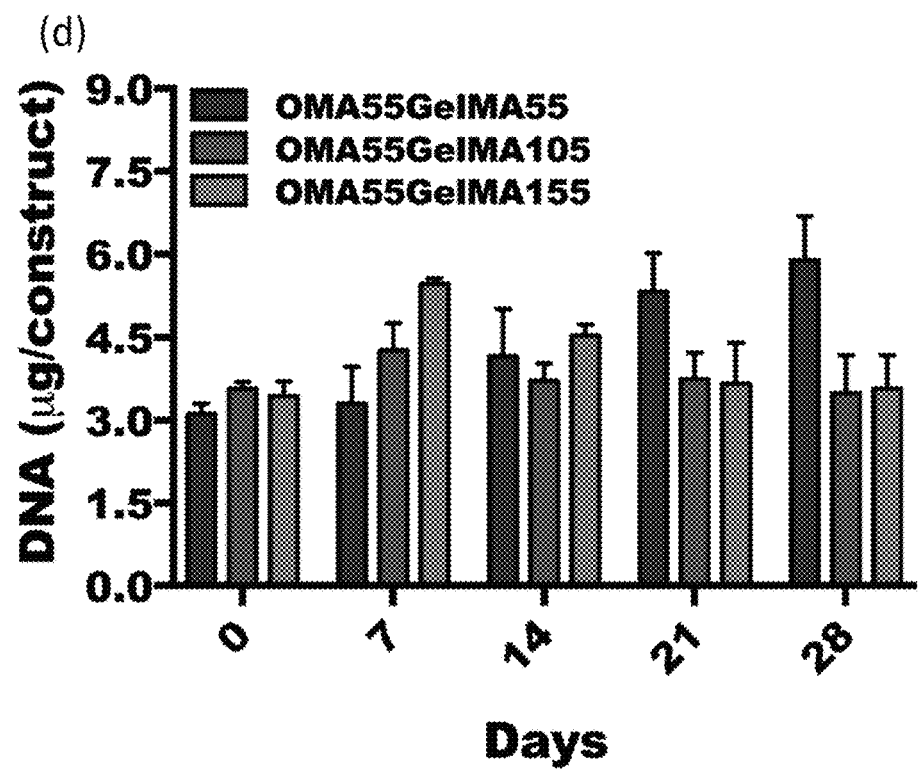

To verify that the nanocomposite OMA/GelMA hybrid hydrogels would be cytocompatible and could be used as 3D matrices for long-term culture of viable encapsulated cells, hMSCs were encapsulated within them and cultured in serum containing media. All nanocomposite hybrid hydrogels exhibited the high hMSC viability, indicating that the photocrosslinking process, the macromers, nHAs and the nanocomposite hybrid hydrogels themselves are non-toxic to the cells (FIG. 9A-C). Quantifying DNA content of the hMSC-laden nanocomposite hybrid hydrogels demonstrated that hMSCs proliferated within the nanocomposite OMA55GelMA55 hybrid hydrogels for 28 days (FIG. 9D). However, the DNA contents of the nanocomposite OMA55GelMA105 and OMA55GelMA155 reached the maximum at day 7 after then slightly decreased likely due to their slower degradation rate.

Figure 10A:
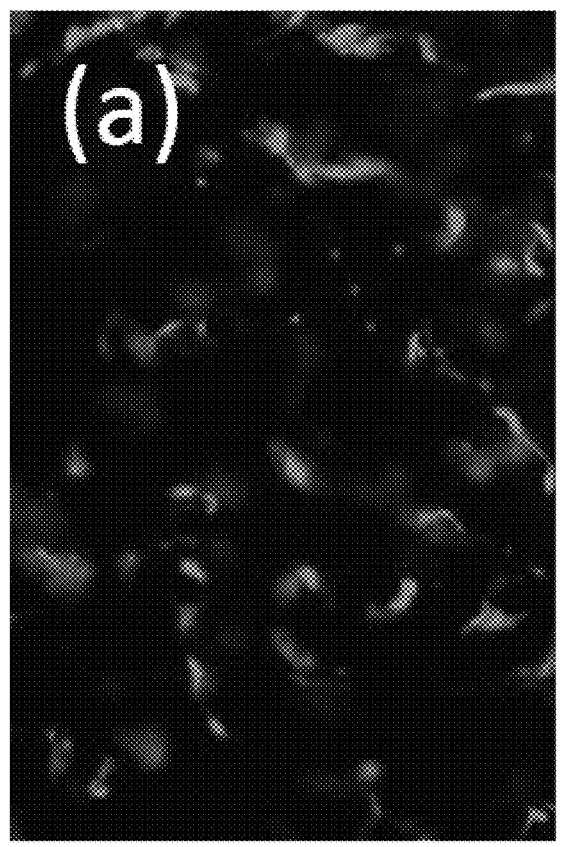
FIGS. 10(A-J) illustrate images and plots showing mechanical stimulation on osteogenesis of hMSC encapsulated in nanocomposite OMA/GelMA hybrid hydrogels. Live/Dead staining of encapsulated hMSCs in nanocomposite OMA55GelMA55 hybrid hydrogels (A) with mechanical stimulation and (B) without mechanical stimulation. Quantification of (C) DNA, (D) ALP, (E) calcium, (F) ALP/DNA and (G) calcium/DNA in hMSCs encapsulated within nanocomposite hybrid hydrogels after 28 days culture in osteogenic differentiation media. (H) Compressive moduli of nanocomposite OMA/GelMA hybrid hydrogel/hMSC constructs after 28 days. Stress-strain plots of nanocomposite constructs after 28-days osteogenesis (I) with and (J) without mechanical stimulation under the five cycles of deformation at 50% strain.
Figure 10B:
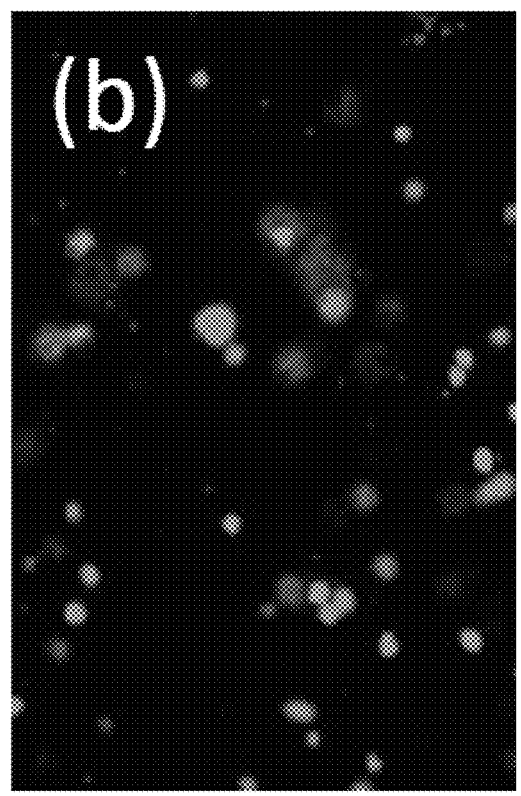
Figure 10C:
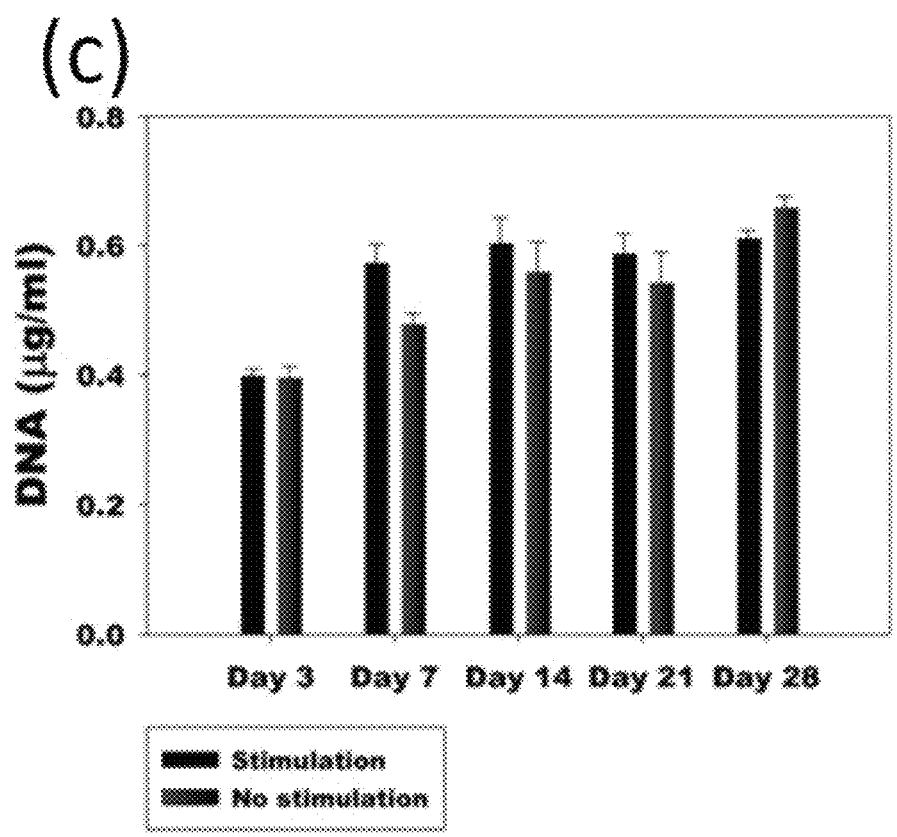
Figure 10D:
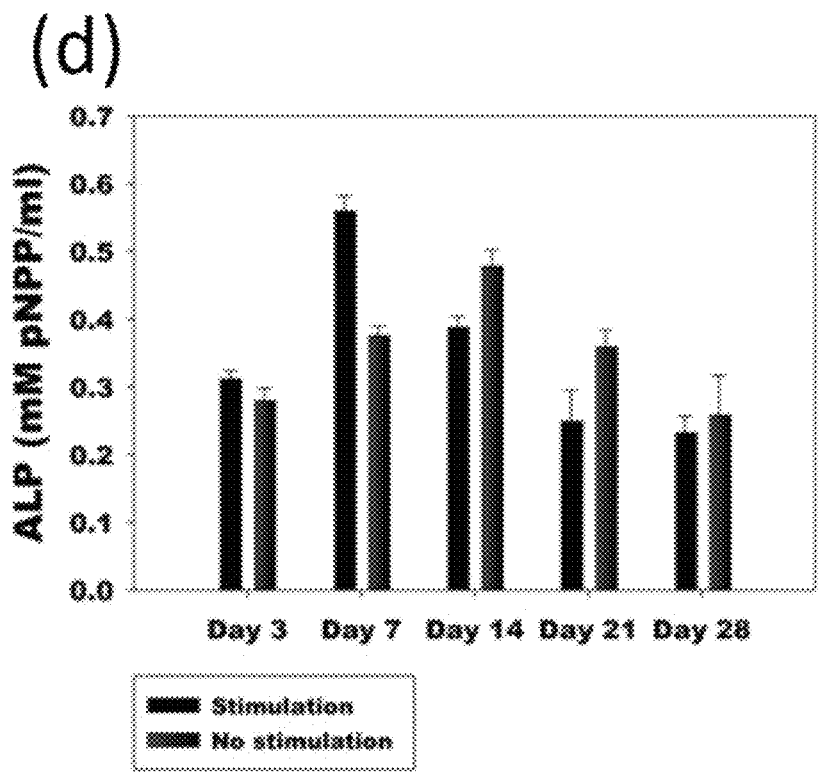
Figure 10E:
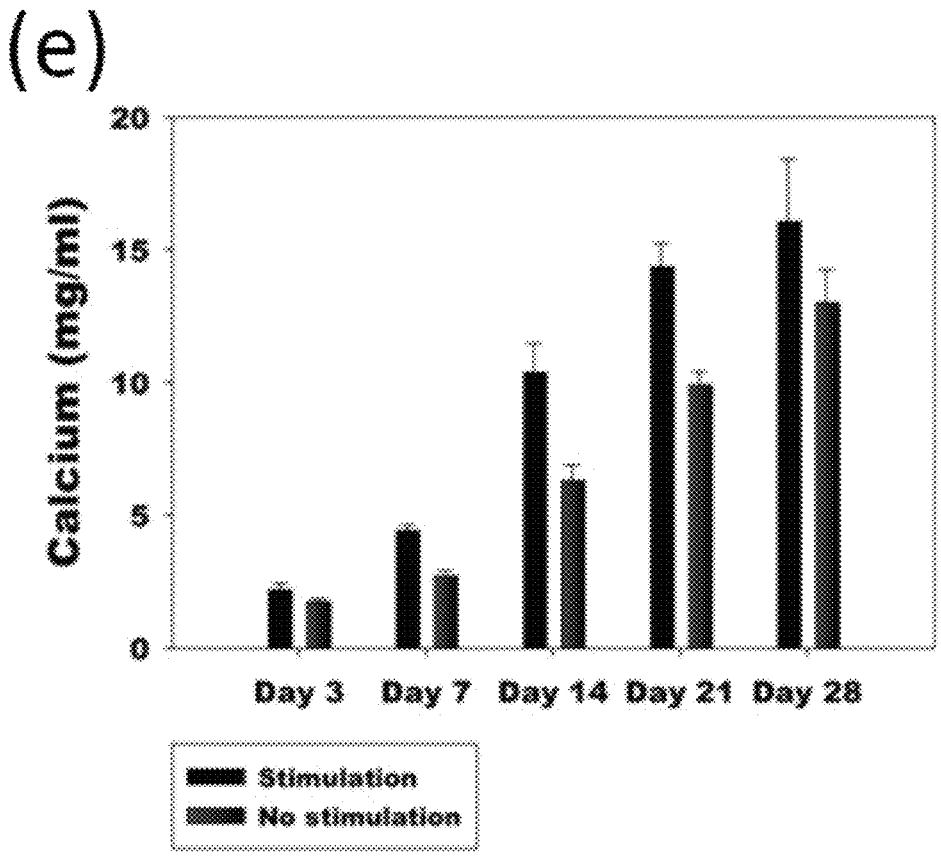
Figure 10F:
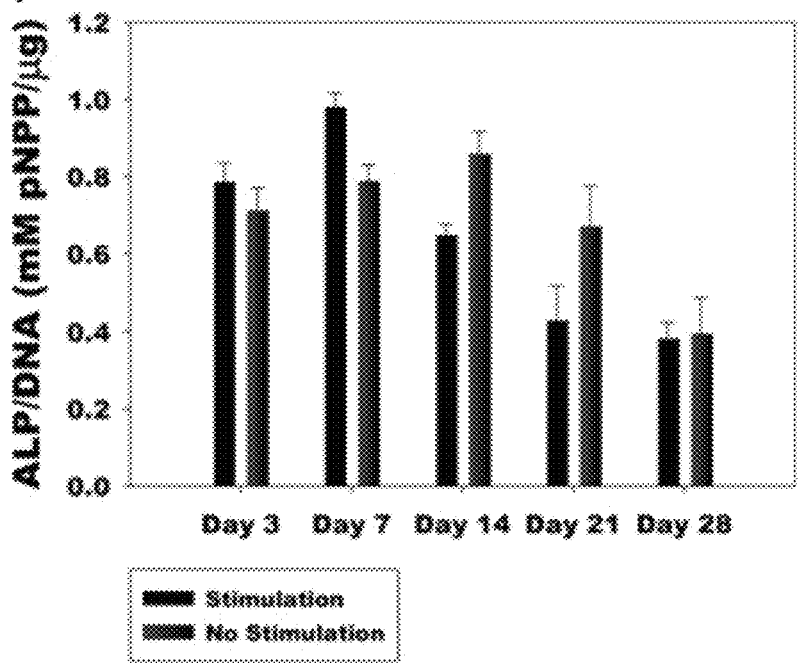
Figure 10G:
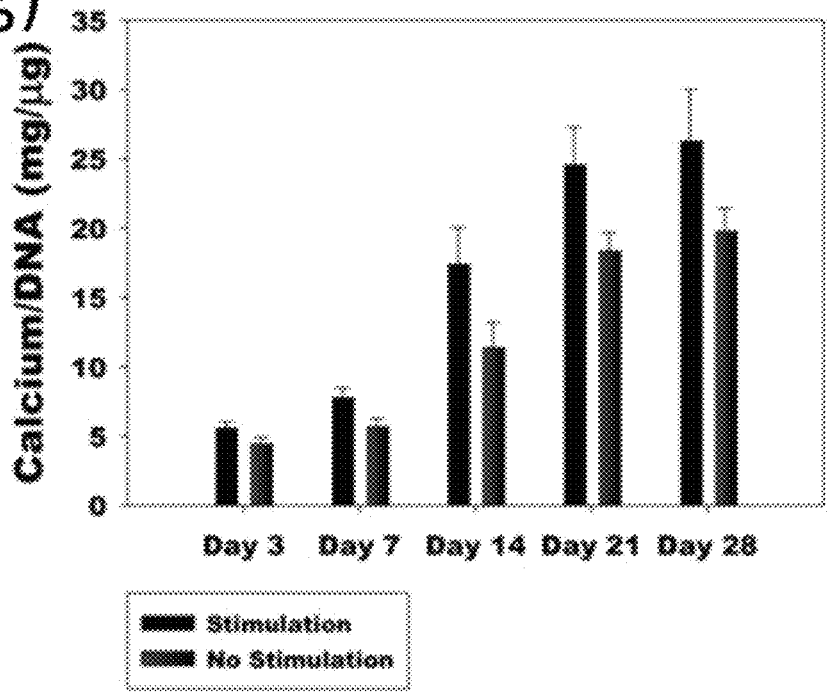
Figure 10H:
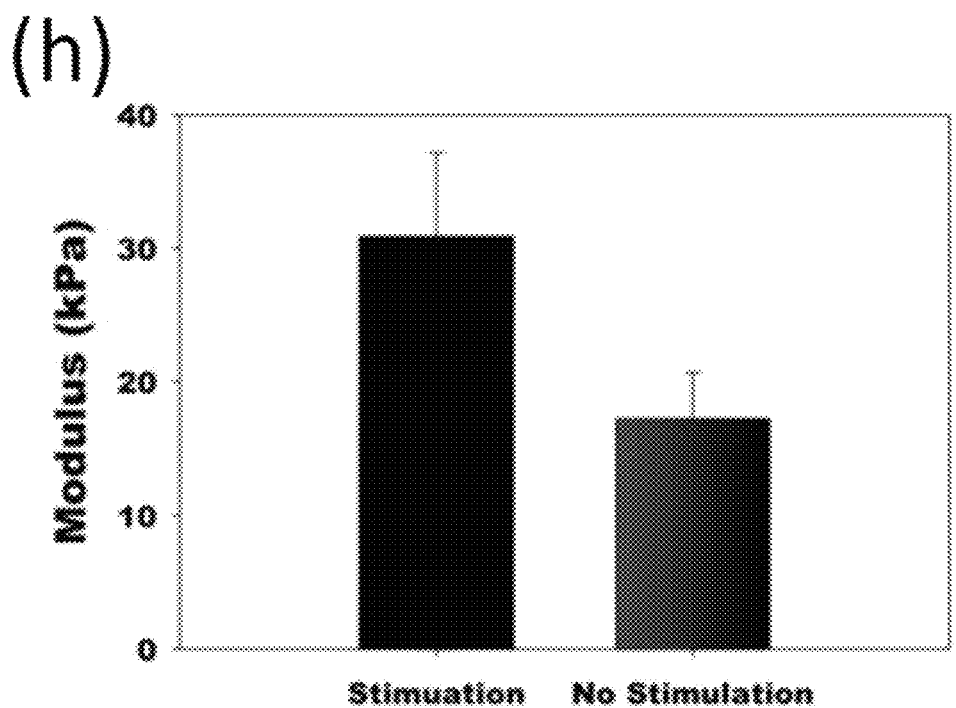
Figure 10I:
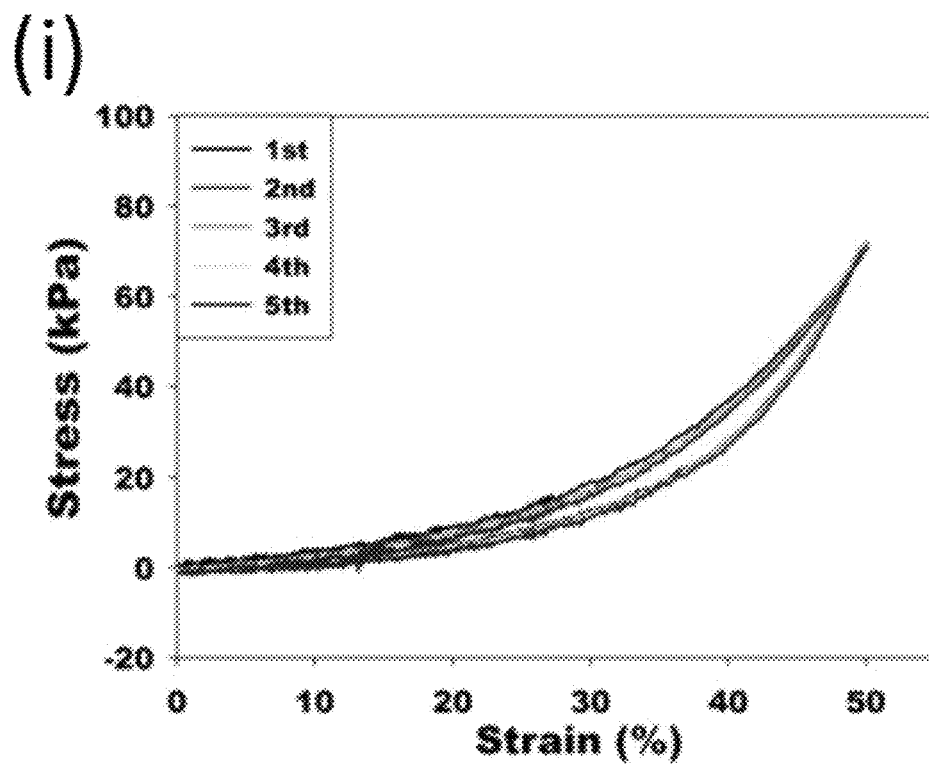
Figure 10J:
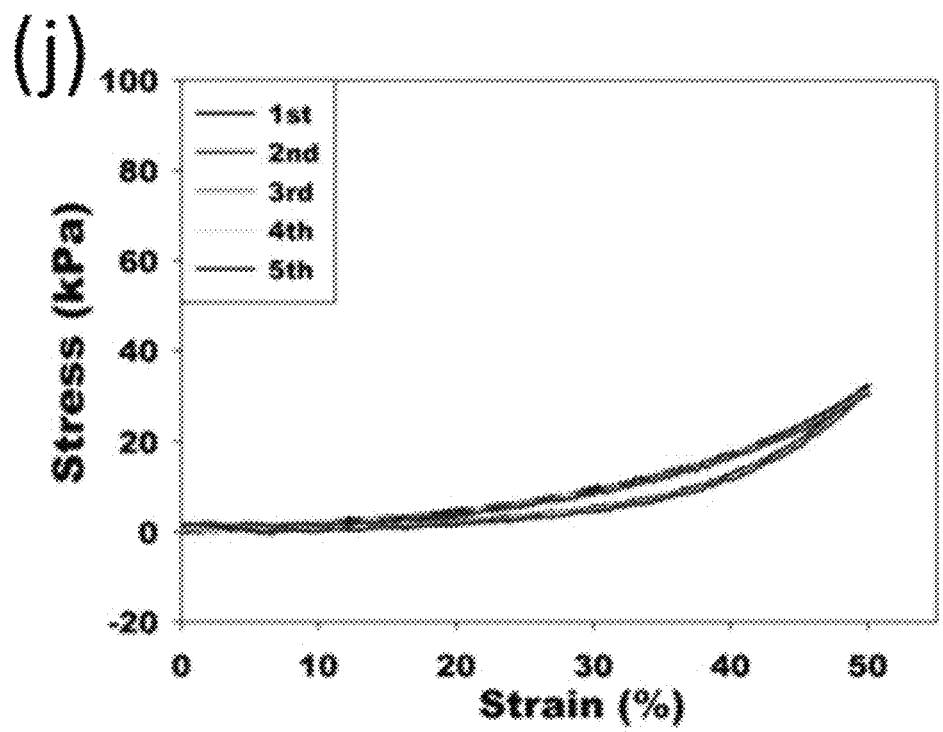
Figure 11A:
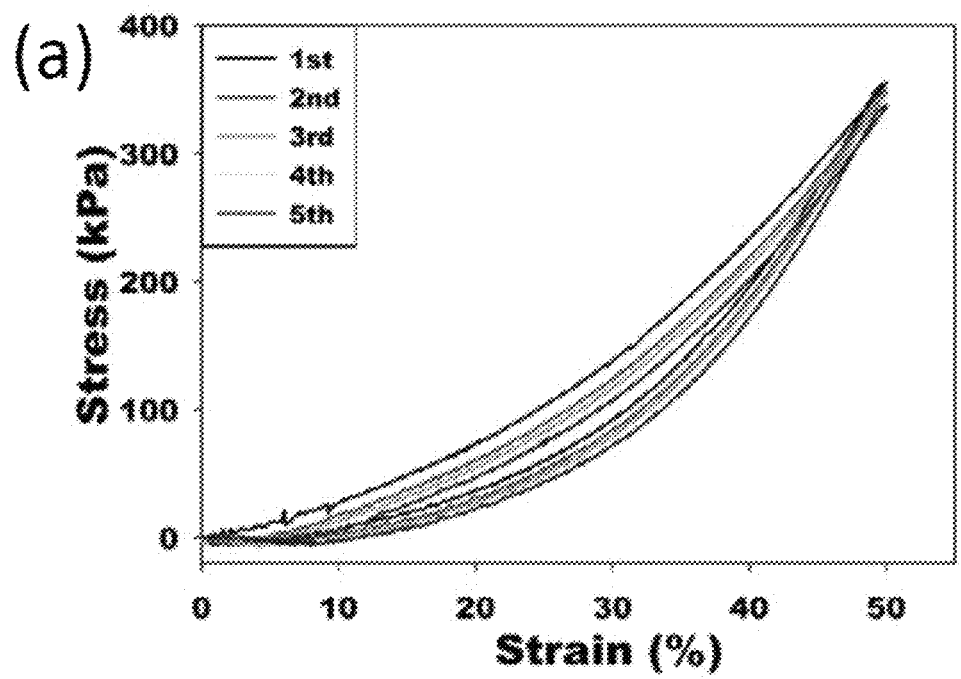
FIGS. 11(A-F) illustrate plots showing elasticity of nanocomposite OMA hydrogels. Stress-strain plots of nanocomposite (A) OMA105, (B) OMA1010, (C) OMA1015, (D) OMA155, (E) OMA1510 and (F) OMA1515 hydrogels under the five cycles of deformation at 50% strain.
Figure 11B:
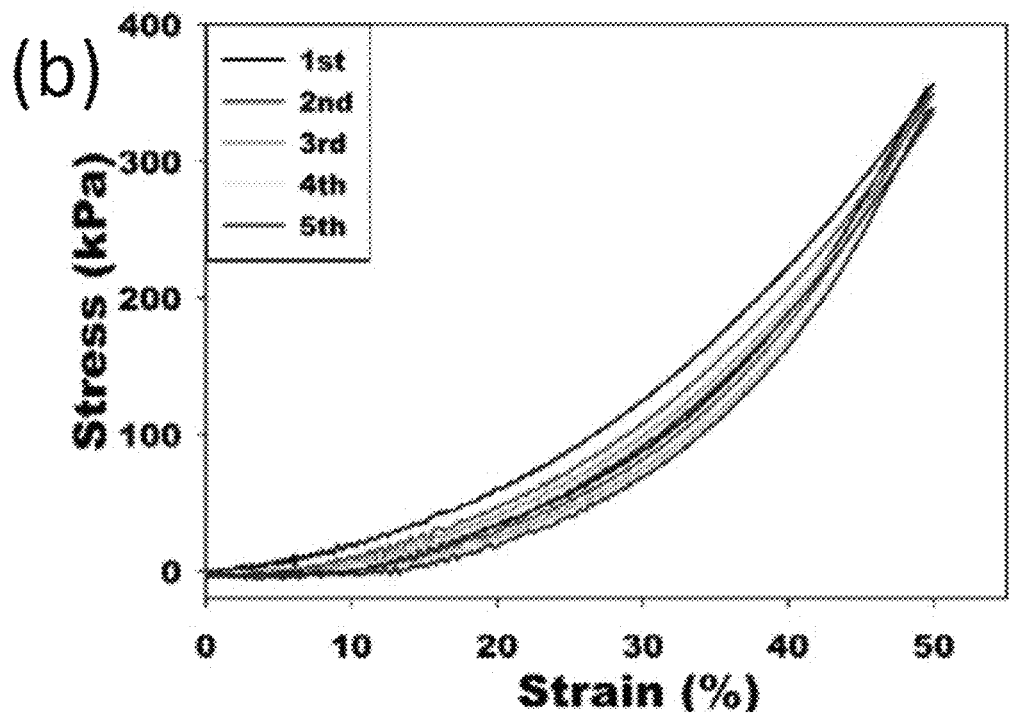
Figure 11C:
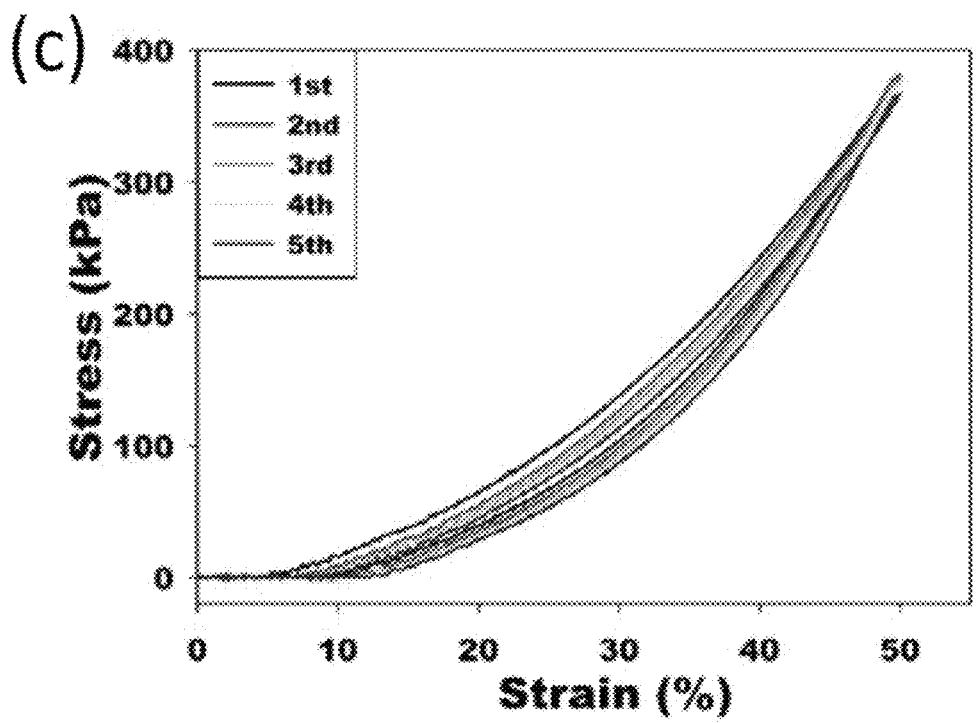
Figure 11D:
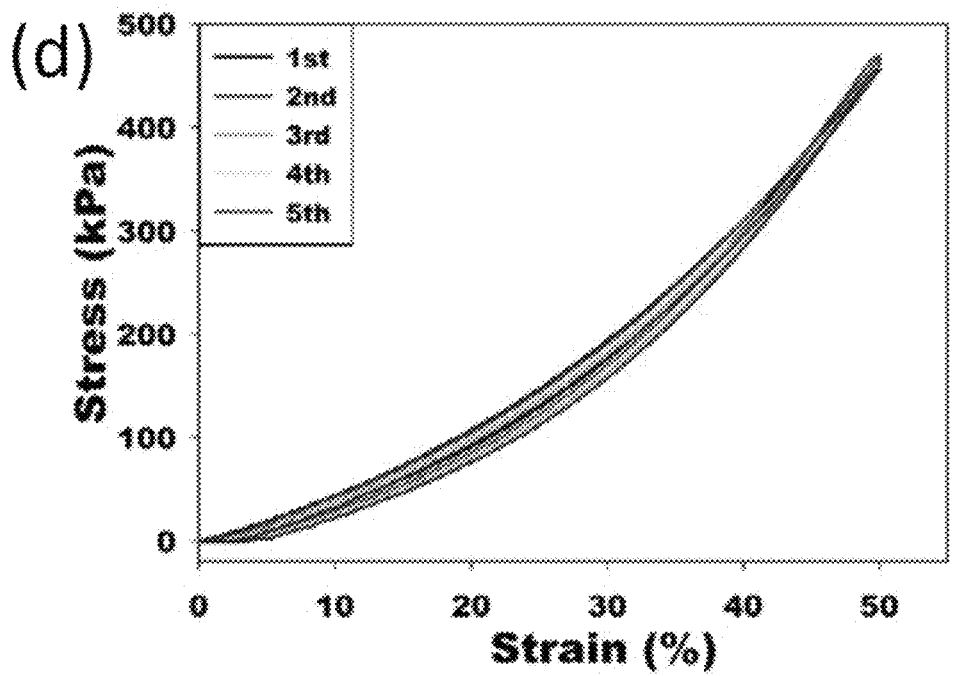
Figure 11E:
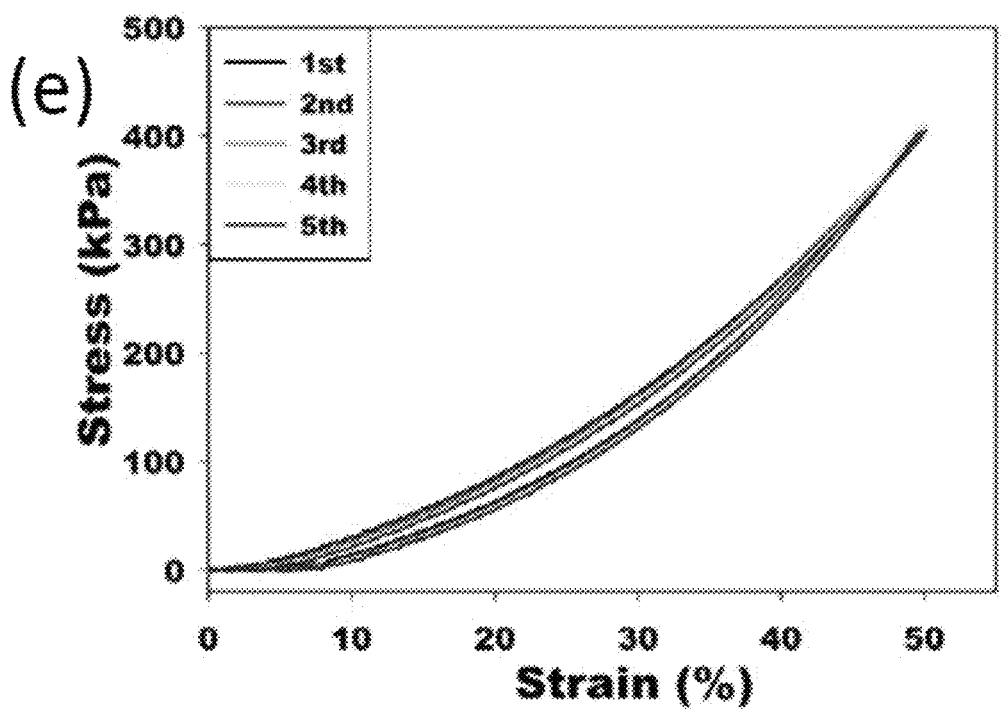
Figure 11F:
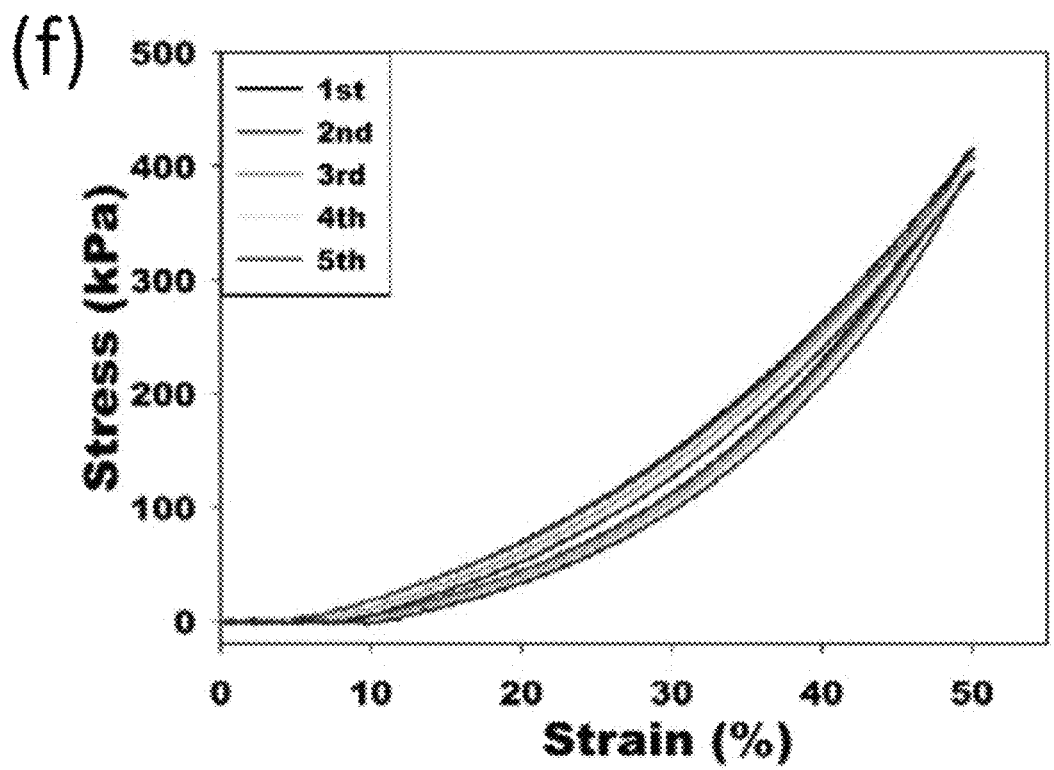
Figure 12A:
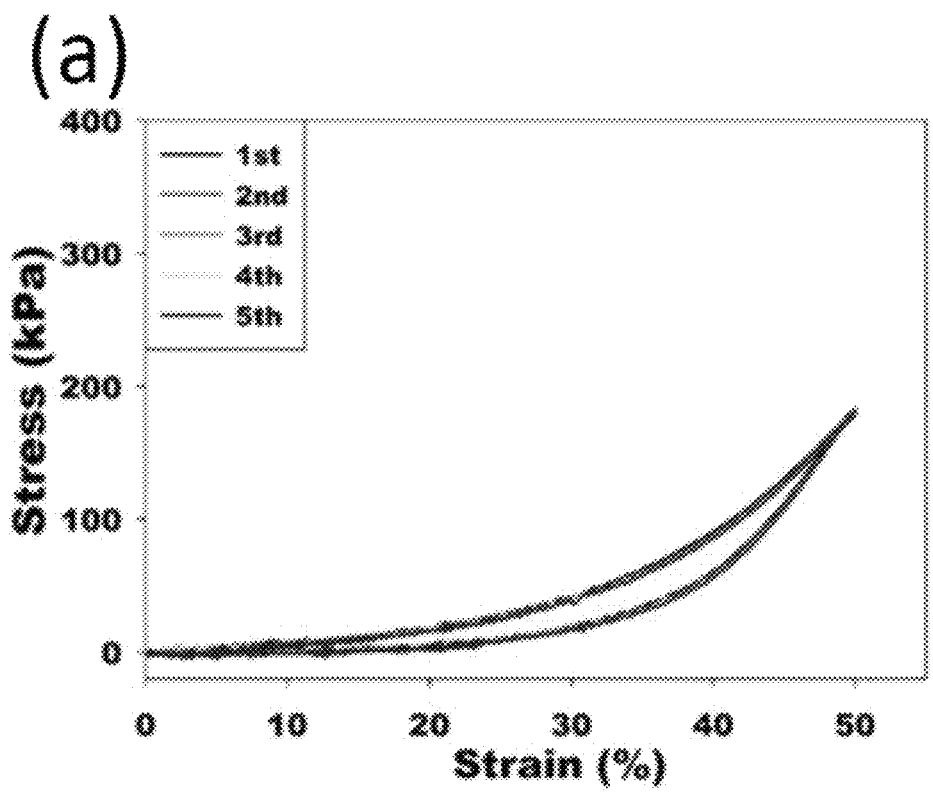
FIGS. 12(A-I) illustrate plots showing the elasticity of nanocomposite OMA/GelMA hybrid hydrogels. Stress-strain plots of photocrosslinked (A) OMA510GelMA510, (B) OMA510GelMA1010, (C) OMA510GelMA1510, (D) OMA1010GelMA510, (E) OMA1010GelMA1010, (F) OMA1010GelMA1510, (G) OMA1510GelMA510, (H) OMA1510GelMA1010 and (I) OMA1510GelMA1510 hydrogels under the five cycles of deformation at 50% strain.
Figure 12B:
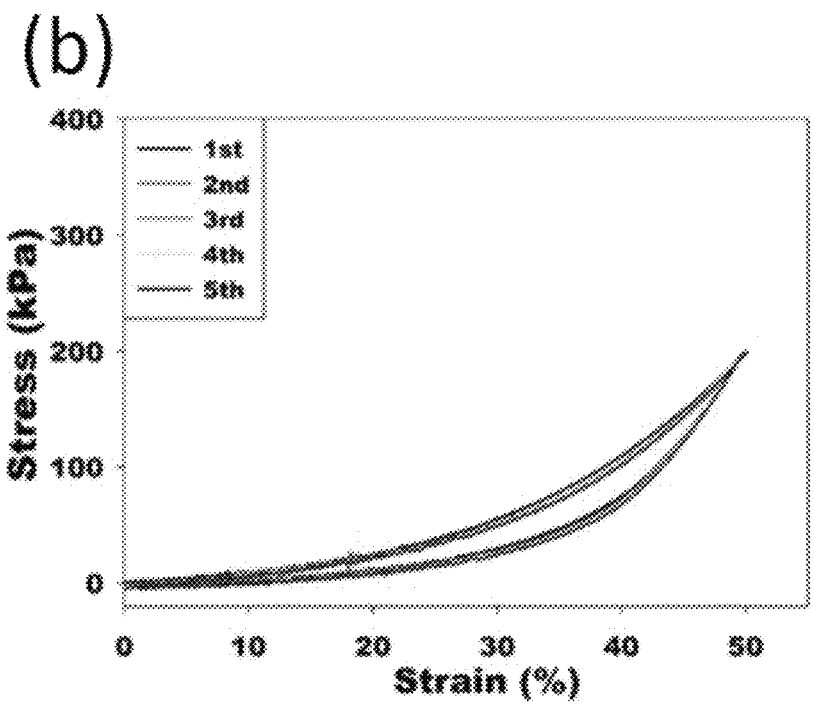
Figure 12C:
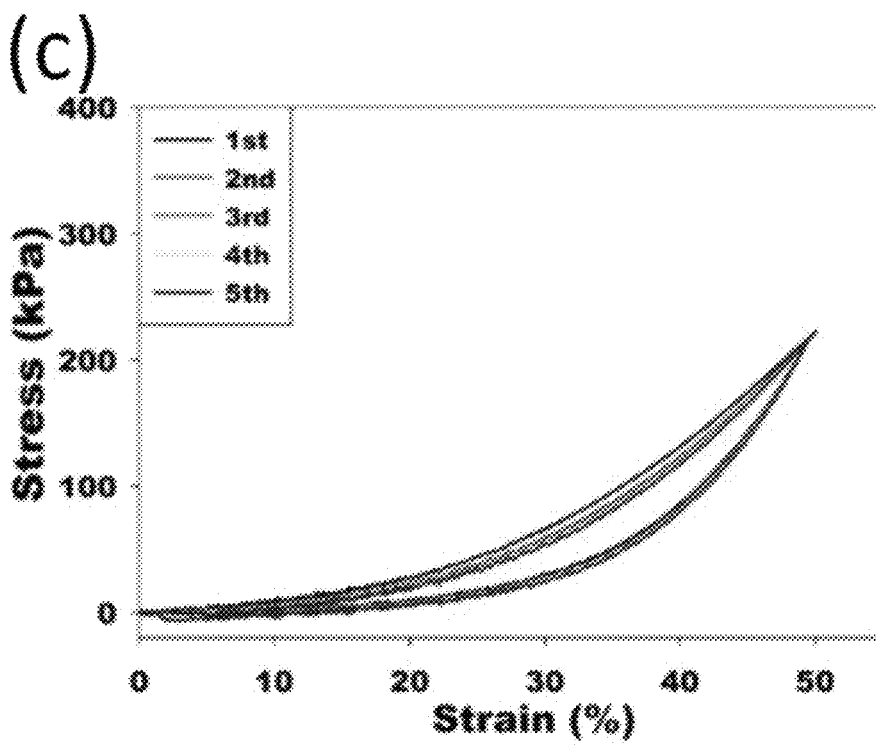
Figure 12D:
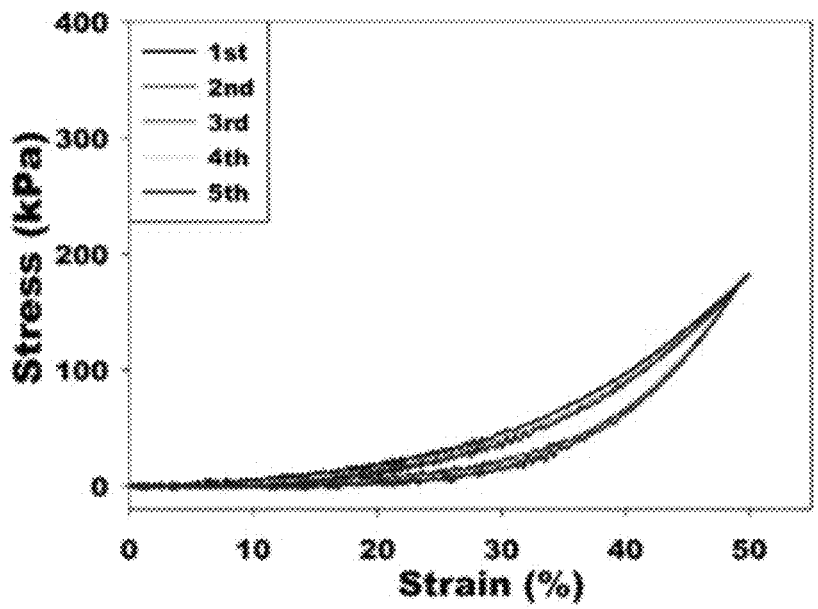
Figure 12E:
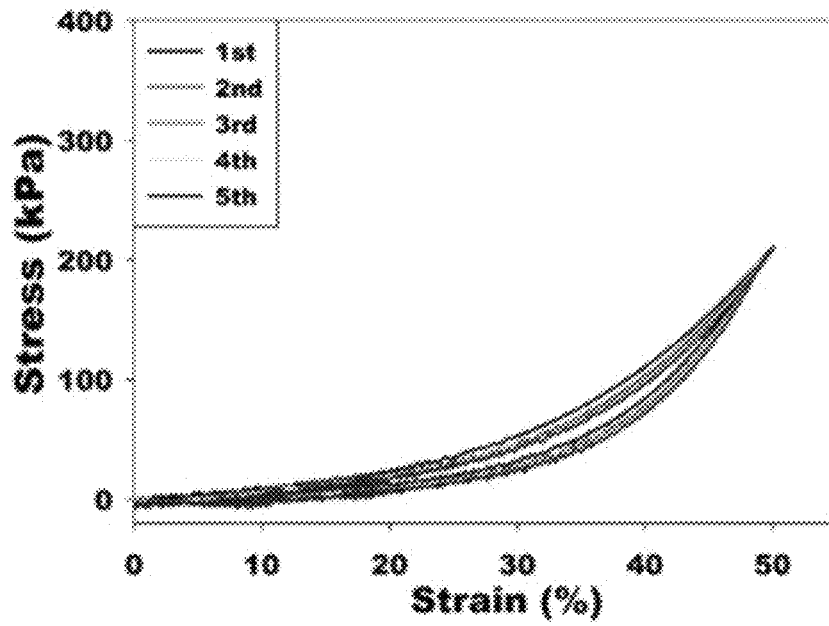
Figure 12F:
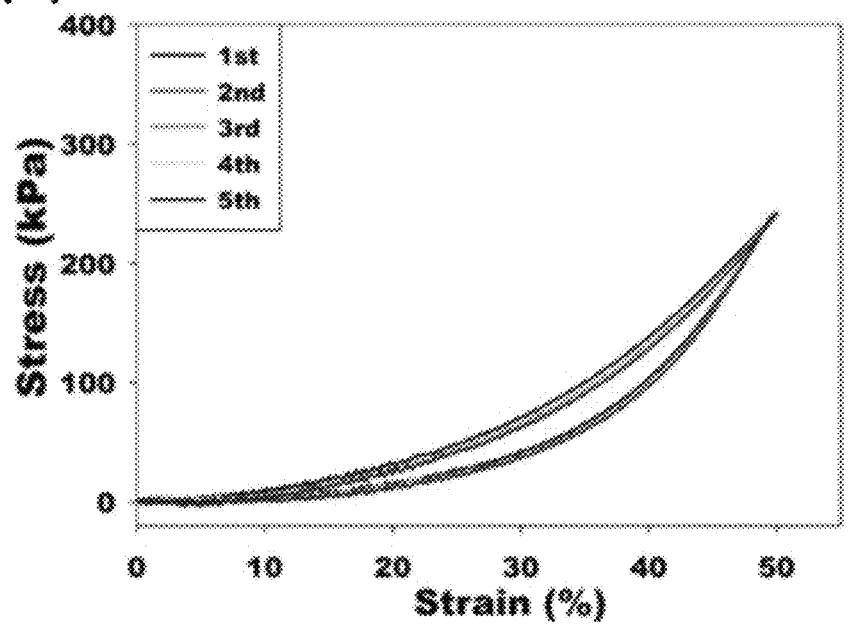
Figure 12G:
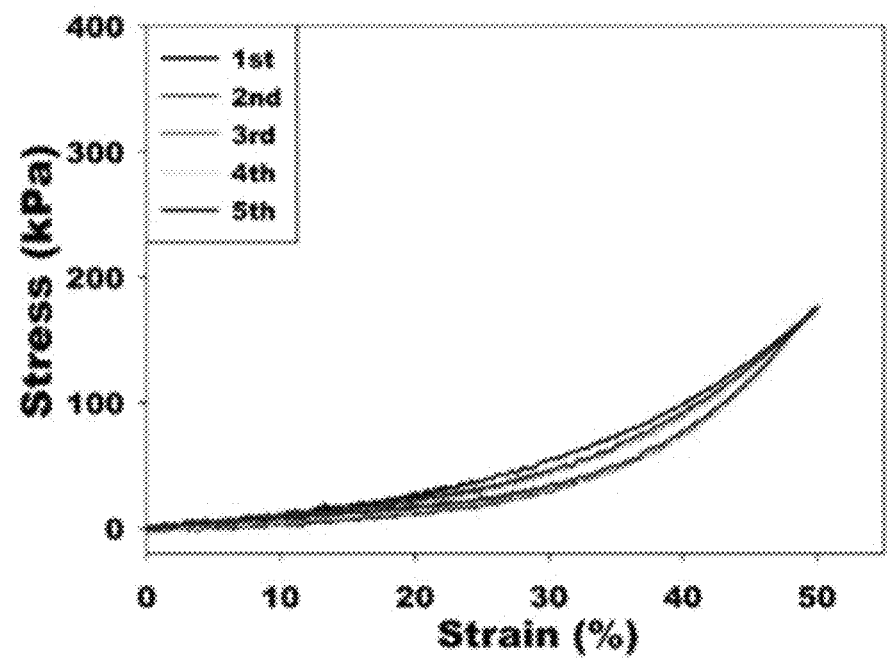
Figure 12H:
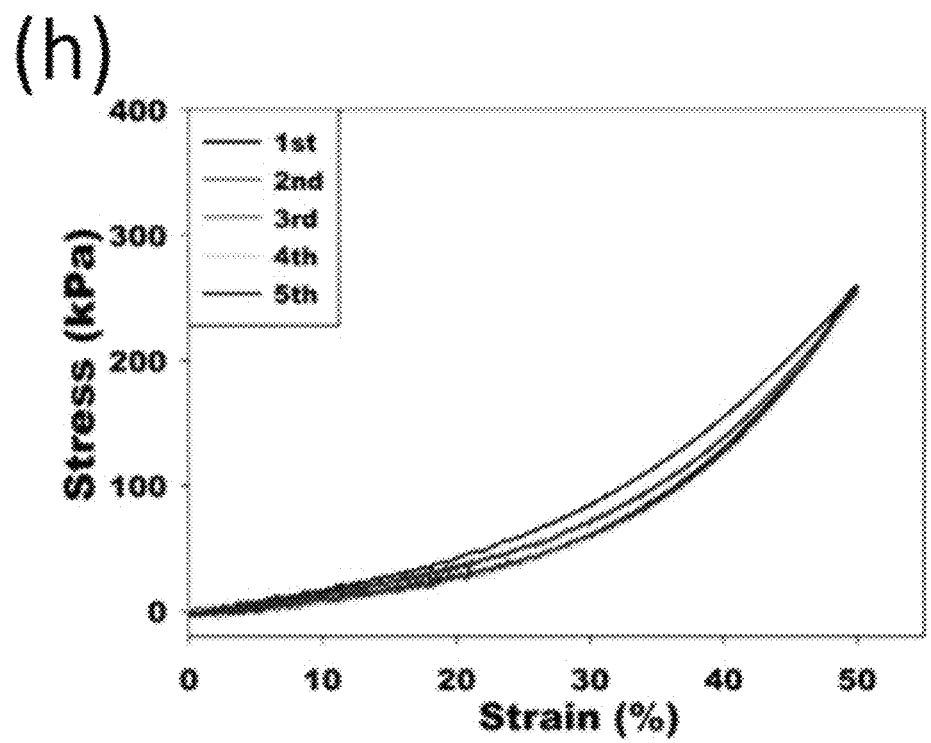
Figure 12I:
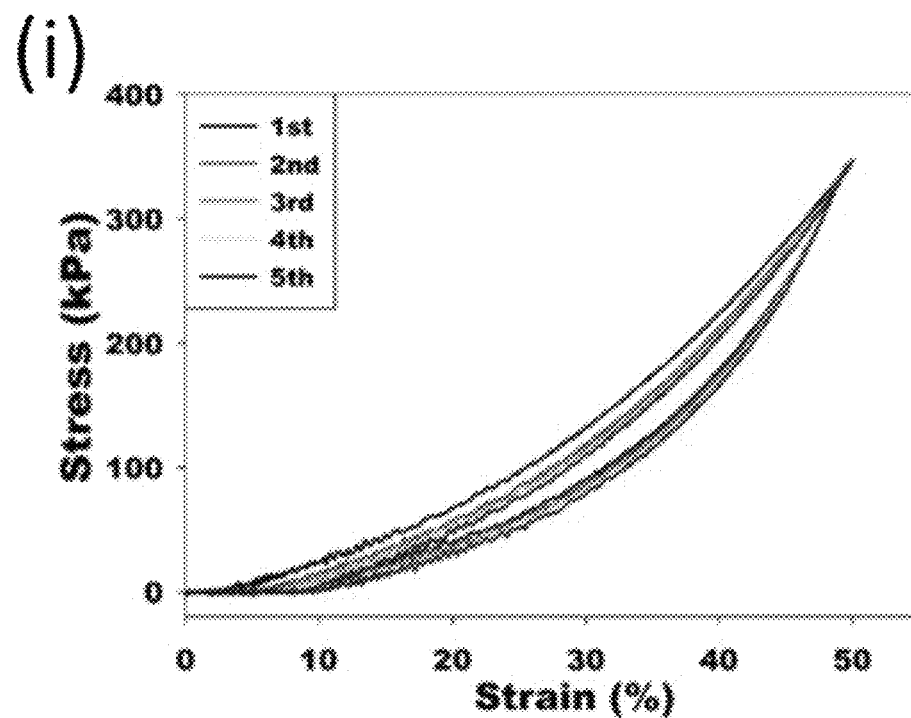
Figure 13A:
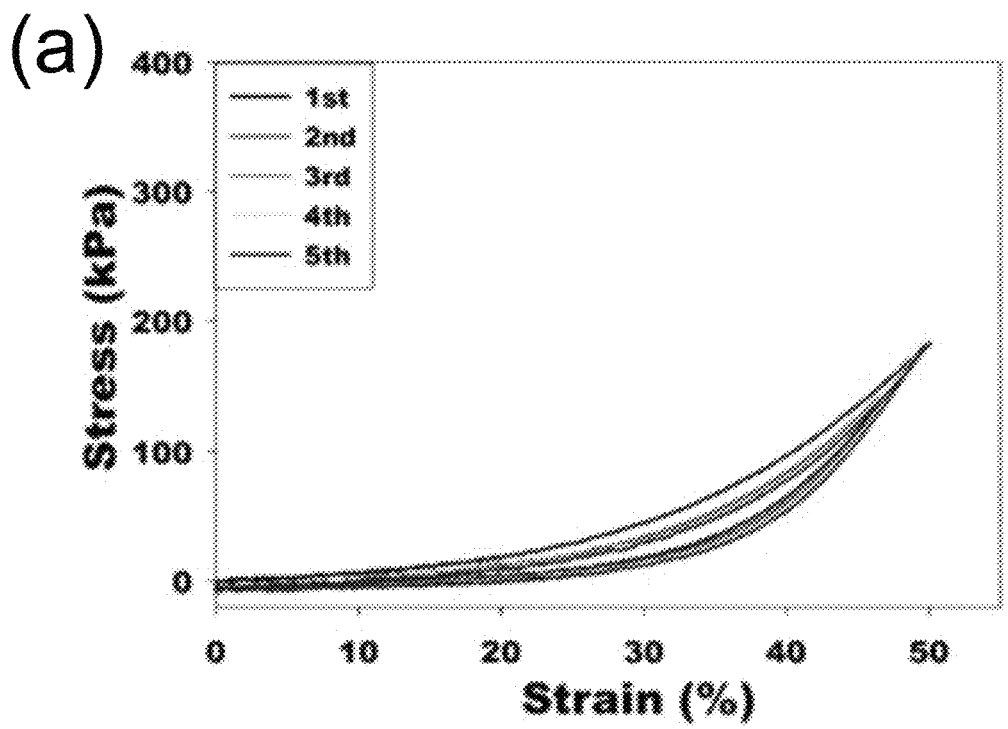
FIG. 13(A-I) illustrate plots showing the elasticity of nanocomposite OMA/GelMA hybrid hydrogels. Stress-strain plots of photocrosslinked (A) OMA515GelMA515, (B) OMA515GelMA1015, (C) OMA515GelMA1515, (D) OMA1015GelMA515, (E) OMA1015GelMA1015, (F) OMA1015GelMA1515, (G) OMA1515GelMA515, (H) OMA1515GelMA1015 and (I) OMA1515GelMA1515 hydrogels under the five cycles of deformation at 50% strain.
Figure 13B:
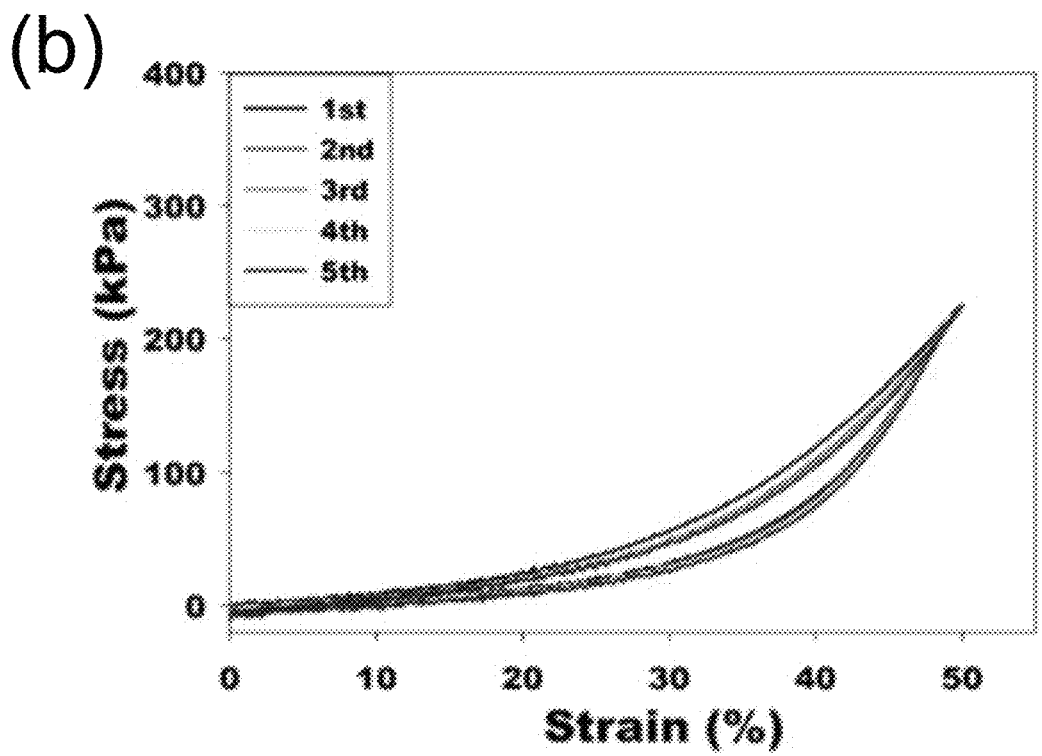
Figure 13C:
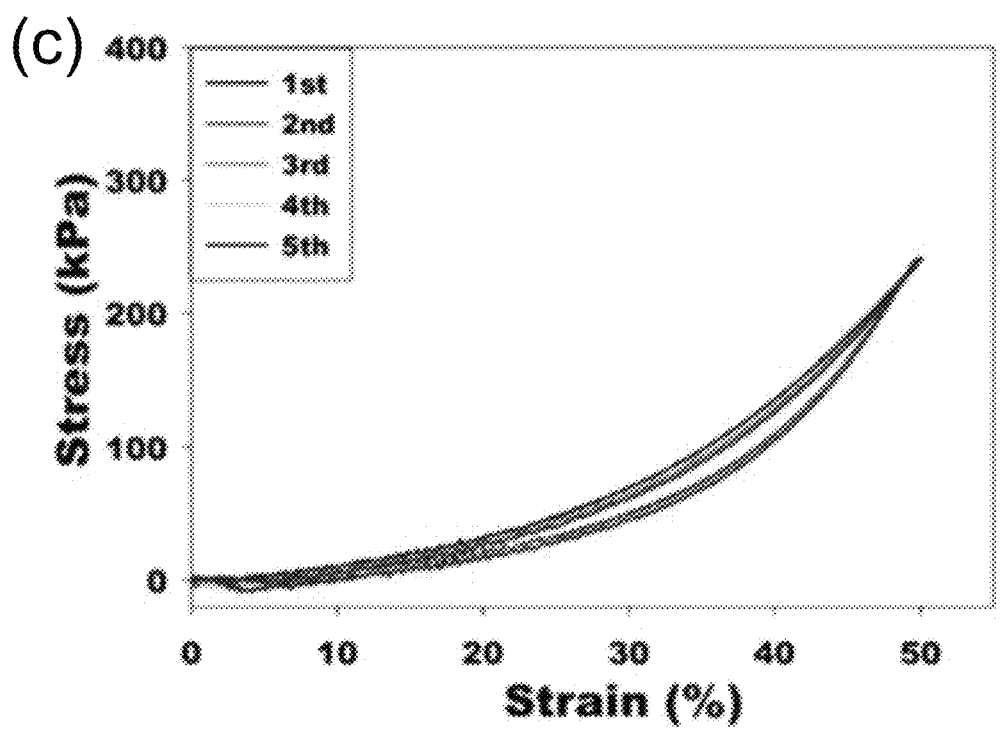
Figure 13D:
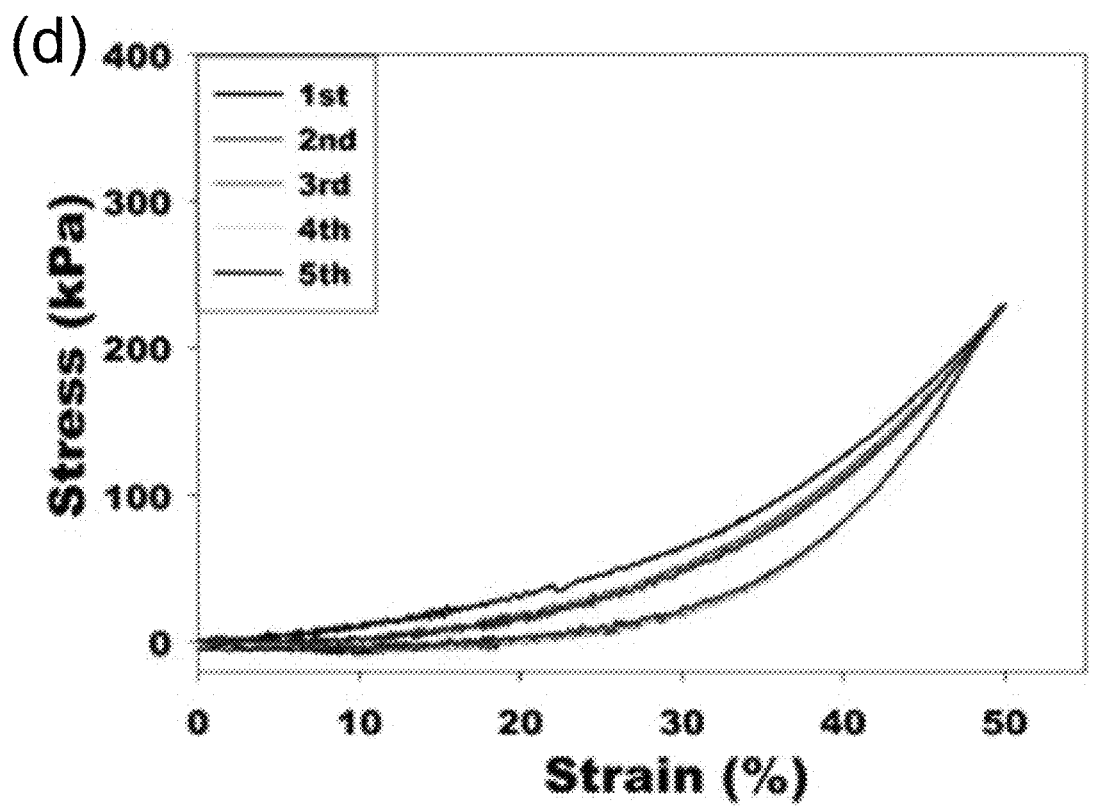
Figure 13E:
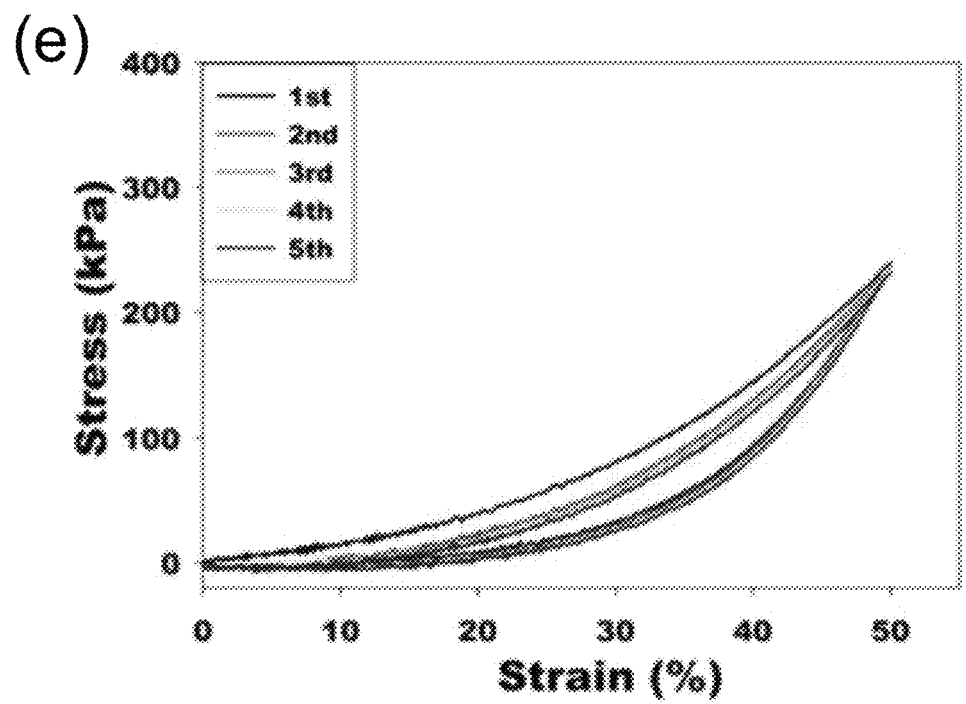
Figure 13F:
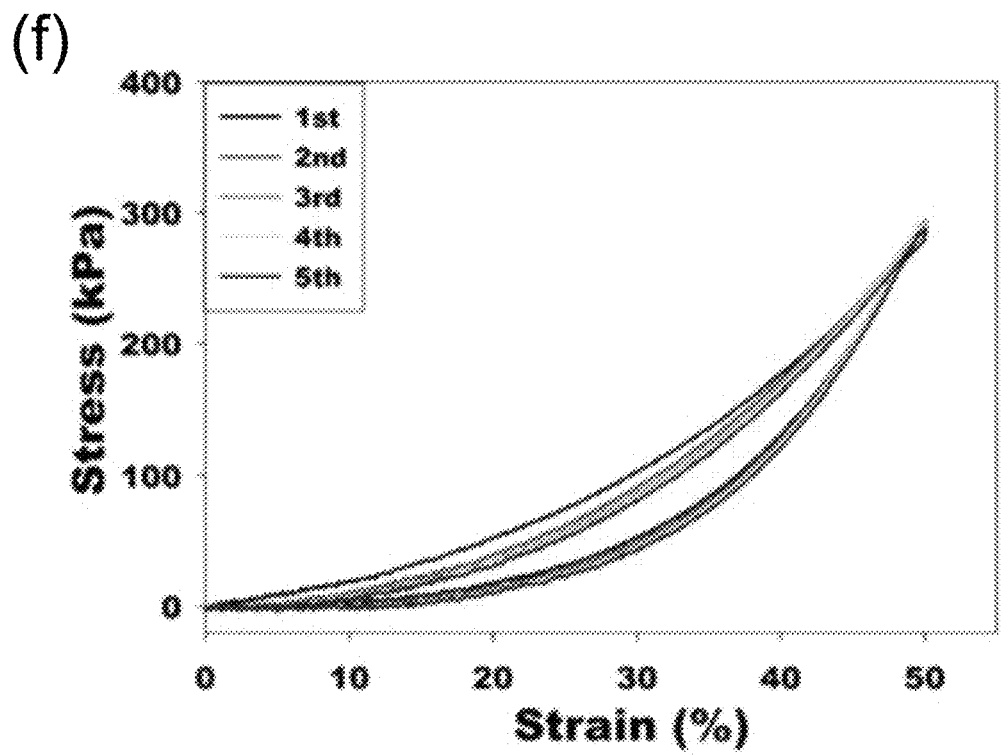
Figure 13G:
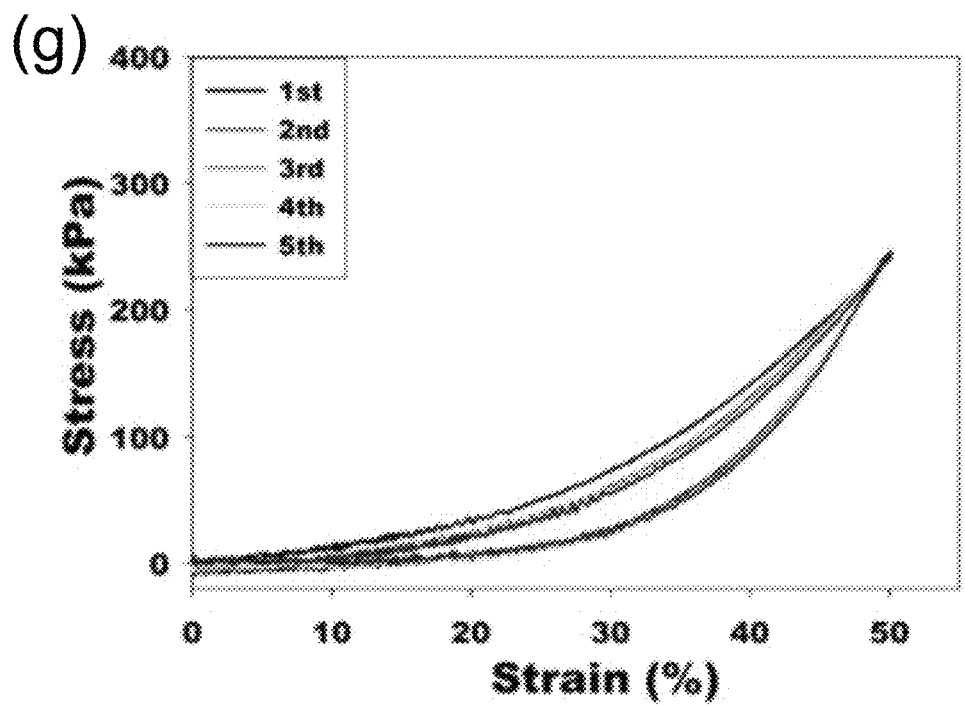
Figure 13H:
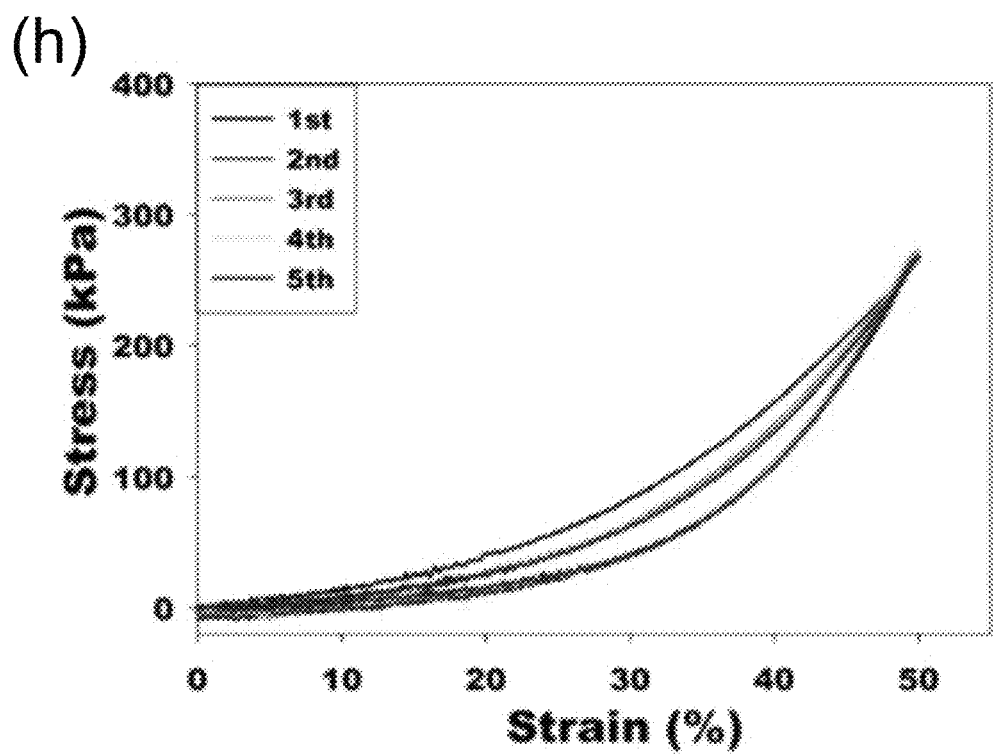
Figure 13I:
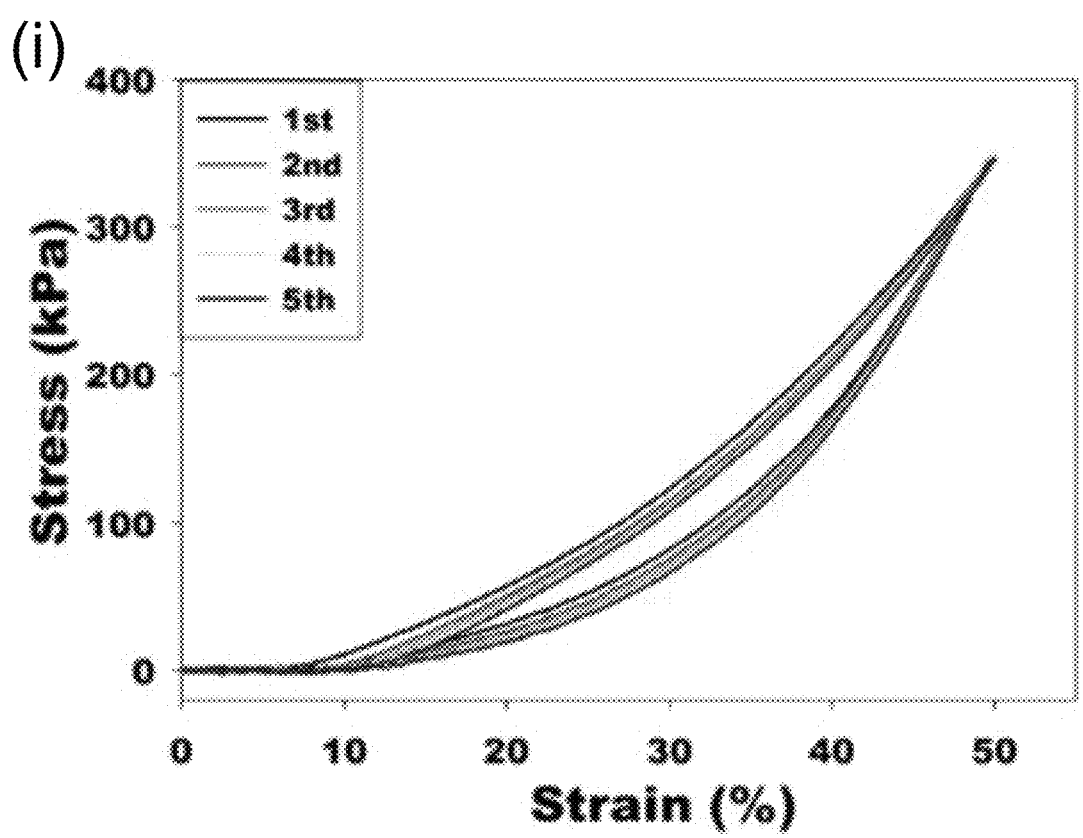

Cells are exposed to a variety of mechanical stimulation in vivo, and the mechanical stimulation plays a key role in controlling cellular behaviors, such as migration, growth, apoptosis and differentiation. Therefore, mechanical stimulation of cells in biomaterials is an area of increasing interest for biomedical engineering applications. When mechanical stimulation is applied to hydrogels, the simulation is transmitted to encapsulated cells and transduced into biochemical signals that can alter cell gene expression and cell function. For example, dynamic mechanical stimulations have been demonstrated to induce osteogenic differentiation of hMSCs within hydrogels and modulate bone-specific extracellular matrix synthesis, resulting in improved mechanical properties of engineered bone. Due to the non-elastomeric nature of most hydrogels, they may not be able to completely recover from deformation and effectively transmit the defined mechanical stimulation to encapsulated cells. In our previous study, hMSCs were encapsulated in IPN-structured elastomeric alginate/GelMA hybrid hydrogels and cultured in osteogenic differentiation media under dynamic cyclic compression. Encapsulated hMSCs maintained long-term high viability in the IPN-structured hydrogels, and mechanical stimulation enhanced their proliferation and osteogenic differentiation. In this study, hMSCs were encapsulated in the nanocomposite hybrid hydrogels and cultured in osteogenic differentiation media under dynamic cyclic compression to investigate the effect of mechanical stimulation on the osteogenic differentiation of hMSCs. As shown in FIGS. 10A and B, the hMSCs exhibited the high cell viability while the mechanical stimulation increased cell spreading. The proliferation of hMSCs significantly increased over 7 days as a result of mechanical stimulation of the nanocomposite hybrid hydrogels compared to the No stimulation group as measured by DNA content (FIG. 10C). Cyclic compression may enhance the supply of nutrients and oxygen and waste removal to the encapsulated hMSCs by perfusing media resulting in the increased cell proliferation. hMSC/nanocomposite hybrid hydrogel constructs were then evaluated for hMSC osteogenic differentiation by measuring ALP activity, an early osteogenic differentiation marker. Compared to the No stimulation group, the ALP activity of encapsulated hMSCs in the Stimulation group was significantly higher at early time points (day 3 and 7), however, No stimulation group was significantly higher at later time points (day 14 and 21, FIGS. 10D and F). It is possible that ALP activity peeked in the Stimulation group at day 7, as this osteogenic differentiation marker was higher in the No Stimulation group at the latter time point. Since calcium deposition of tissue engineered bone constructs is the ultimate marker of osteogenic differentiation of stem cells, calcium content in the hMSC/nanocomposite hybrid hydrogel constructs was quantified. Calcium deposition increased over time in both groups and was significantly higher in the Stimulation group compared to the No Stimulation group (FIGS. 10E and G). As a result of the higher mineralization in the Stimulation group, the modulus of the Stimulation group was significantly higher than that of No stimulation group (FIG. 10H). These findings demonstrate that mechanical stimulation of the nanocomposite hybrid hydrogels enhances osteogenic differentiation of encapsulated stem cells and resulted in bone-like mineralization of the extracellular environment. Since mineralization of hydrogel constructs can affect the mechanical properties of the tissue engineered bone constructs, unconfined cyclic compression tests (5 cycles) were performed to evaluate potential changes in the elasticity and the mechanical property of the osteogenically differentiated hMSC/nanocomposite hybrid hydrogel constructs. Although the calcium ions deposited in the constructs and hydrogels degraded, osteogenically differentiated nanocomposite hydrogel constructs exhibited excellent resilience. Regardless of mechanical stimulation, both of osteogenically differentiated hMSC/nanocomposite hybrid hydrogel constructs recovered from applied compressive strain (50%) to their original thickness as evidenced by representative cyclic loading/relaxation curves taken after 28 days (FIGS. 10I and J).

We have engineered cytocompatible, biodegradable, elastomeric and tough nanocomposite hybrid hydrogels based on photocrosslinked OMA and GelMA by incorporation of nHAs. While the nanocomposite OMA hydrogels exhibited the high elasticity at low number of cycles, the high elasticity of the nanocomposite OMA/GelMA hybrid hydrogels was maintained even after 20000 loading/unloading cycles. Encapsulated hMSCs maintained long-term high viability in the nanocomposite hybrid hydrogels, and mechanical stimulation enhanced their spreading and osteogenic differentiation. The mechanical property of the osteogenically differentiated hMSCs/nanocomposite hybrid hydrogel was increased by mechanical stimulation and their high elasticity was preserved during osteogenic differentiation. This nanocomposite hybrid hydrogel system is an exciting new platform for understanding the influence of mechanical stimulation on cell proliferation, migration and differentiation as the biomaterial can fully recover from large strains and long-term cyclic loading, and it may broaden the application of this class of hydrogels in tissue engineering.

TABLE 1 composition of nanocomposite hydrogels

| Code | OMA concentration (w/v %) | GelMA concentration (w/v %) | nHA concentration (w/v %) |
|---|---|---|---|
| OMA5 | 5 | | 0 |
| OMA10 | 10 | | 0 |
| OMA15 | 15 | | 0 |
| OMA55 | 5 | | 5 |
| OMA510 | 5 | | 10 |
| OMA515 | 5 | | 15 |
| OMA105 | 10 | | 5 |
| OMA1010 | 10 | | 10 |
| OMA1015 | 10 | | 15 |
| OMA155 | 15 | | 5 |
| OMA1510 | 15 | | 10 |
| OMA1515 | 15 | | 15 |
| GelMA10 | | 10 | |
| GelMA15 | | 15 | |
| GelMA105 | | 10 | 5 |
| GelMA1010 | | 10 | 10 |
| GelMA1015 | | 10 | 15 |
| GelMA155 | | 15 | 5 |
| GelMA1510 | | 15 | 10 |
| GelMA1515 | | 15 | 15 |

TABLE 2

Composition of hybrid nanocomposite hydrogels

| Code | Composition [OMA/GelMA = 1/1 (volume ratio)] | | nHA concentration (w/v %) |
|---|---|---|---|
| OMA55GelMA55 | OMA5 | GelMA5 | 5 |
| OMA55GelMA105 | OMA5 | GelMA10 | 5 |
| OMA55GelMA155 | OMA5 | GelMA15 | 5 |
| OMA105GelMA55 | OMA10 | GelMA5 | 5 |
| OMA105GelMA105 | OMA10 | GelMA10 | 5 |
| OMA105GelMA155 | OMA10 | GelMA15 | 5 |
| OMA155GelMA55 | OMA15 | GelMA5 | 5 |
| OMA155GelMA105 | OMA15 | GelMA10 | 5 |
| OMA155GelMA155 | OMA15 | GelMA15 | 5 |
| OMA510GelMA510 | OMA5 | GelMA5 | 10 |
| OMA510GelMA1010 | OMA5 | GelMA10 | 10 |
| OMA510GelMA1510 | OMA5 | GelMA15 | 10 |
| OMA1010GelMA510 | OMA10 | GelMA5 | 10 |
| OMA1010GelMA1010 | OMA10 | GelMA10 | 10 |
| OMA1010GelMA1510 | OMA10 | GelMA15 | 10 |
| OMA1510GelMA510 | OMA15 | GelMA5 | 10 |
| OMA1510GelMA1010 | OMA15 | GelMA10 | 10 |
| OMA1510GelMA1510 | OMA15 | GelMA15 | 10 |
| OMA515GelMA515 | OMA5 | GelMA5 | 15 |
| OMA515GelMA1015 | OMA5 | GelMA10 | 15 |
| OMA515GelMA1515 | OMA5 | GelMA15 | 15 |
| OMA1015GelMA515 | OMA10 | GelMA5 | 15 |
| OMA1015GelMA1015 | OMA10 | GelMA10 | 15 |
| OMA1015GelMA1515 | OMA10 | GelMA15 | 15 |
| OMA1515GelMA515 | OMA15 | GelMA5 | 15 |
| OMA1515GelMA1015 | OMA15 | GelMA10 | 15 |
| OMA1515GelMA1515 | OMA15 | GelMA15 | 15 |

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, we claim:

1. A composition comprising:
    an elastomeric nanocomposite hybrid hydrogel that includes first natural polymer macromers covalently crosslinked with second natural polymer macromers and the first natural polymer macromers are ionically crosslinked with a plurality of inorganic nanoparticles, wherein the plurality of inorganic nanoparticles ionically form reversible physical crosslinks with carboxylic groups of the first natural polymer macromers; the elastomeric nanocomposite hybrid hydrogel being cytocompatible, and, upon degradation, produce substantially non-toxic products;
    wherein the first natural polymer macromers are acrylated and/or methacrylated polysaccharides, which are optionally oxidized and the second natural polymer macromers include an acrylate group and/or methacrylate group; and
    wherein the acrylate and/or methacrylate groups of the first natural polymer macromers react with the acrylate and/or methacrylate groups of the second natural polymer macromers polymers to form the covalent crosslinks.

2. The composition of claim 1, wherein the elasticity of the hydrogel is substantially maintained during degradation.

3. The composition of claim 1, wherein the first natural polymer macromers are photocrosslinked with the second natural polymer macromers.

4. The composition of claim 1, wherein the first natural polymer macromers comprise acrylated and/or methacrylated alginates, which are optionally oxidized.

5. The composition of claim 1, wherein the second natural polymer macromers comprise acrylated and/or methacrylated gelatin.

6. The composition of claim 1, wherein the first natural polymer macromers comprise acrylated and/or methacrylated alginates, which are optionally oxidized, and the second natural polymer macromers comprise acrylated and/or methacrylated gelatin and wherein methacrylate and/or acrylate groups of the optionally oxidized acrylated and/or methacrylated alginates react with methacrylate and/or acrylate groups of the acrylated and/or methacrylated gelatin to form the covalent crosslinks.

7. The composition of claim 1, wherein the inorganic nanoparticles comprise calcium based nanoparticles.

8. The composition of claim 7, wherein the inorganic nanoparticles comprise hydroxyapatite nanoparticles.

9. The composition of claim 1, further comprising at least one bioactive agent.

10. The composition of claim 1, further comprising a plurality of cells dispersed on and/or within the hydrogel.

11. The composition of claim 10, wherein the cells comprise progenitor cells, undifferentiated cells and/or differentiated cells.

12. The composition of claim 11, wherein the cells include mesenchymal stem cells.

13. A composition comprising:
    an elastomeric nanocomposite hybrid hydrogel that includes first natural polymer macromers covalently crosslinked with second natural polymer macromers and the first natural polymer macromers are ionically crosslinked with a plurality of inorganic nanoparticles, wherein the plurality of inorganic nanoparticles ionically form reversible physical crosslinks with carboxylic groups of the first natural polymer macromers; the elastomeric nanocomposite hybrid hydrogel being cytocompatible, and, upon degradation, produce substantially non-toxic products, and wherein the elasticity of the elastomeric nanocomposite hybrid hydrogel is substantially maintained during degradation; and wherein the first natural polymer macromers are acrylated and/or methacrylated polysaccharides, which are optionally oxidized; the second natural polymer macromers are different from the first natural polymer macromers and include an acrylate group and/or methacrylate group; and wherein the acrylate and/or methacrylate groups of the first natural polymer macromers react with the acrylate and/or methacrylate groups of the second natural polymer macromers to form the covalent crosslinks.

14. The composition of claim 13, wherein the first natural polymer macromers comprise acrylated and/or methacrylated alginates, which are optionally oxidized, and the second natural polymer macromers comprise acrylated and/or methacrylated gelatin and wherein methacrylate and/or acrylate groups of optionally oxidized acrylated and/or methacrylated alginates react with methacrylate and/or acrylate groups of the acrylated and/or methacrylated gelatin to form the covalent crosslinks.

15. The composition of claim 13, wherein the inorganic nanoparticles comprise calcium based nanoparticles.

16. The composition of claim 15, wherein the inorganic nanoparticles comprise hydroxyapatite nanoparticles.

17. The composition of claim 13, further comprising at least one bioactive agent.

18. The composition of claim 13, further comprising a plurality of cells dispersed on and/or within the hydrogel.

* * * * *